(12) United States Patent
Nakagawa

(10) Patent No.: US 8,189,275 B2
(45) Date of Patent: May 29, 2012

(54) LENS UNIT AND IMAGE CAPTURING DEVICE

(75) Inventor: Youhei Nakagawa, Neyagawa (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 12/490,870

(22) Filed: Jun. 24, 2009

(65) Prior Publication Data
US 2010/0046095 A1    Feb. 25, 2010

(30) Foreign Application Priority Data
Aug. 22, 2008 (JP) .................. 2008-214597

(51) Int. Cl.
G02B 9/36    (2006.01)
G02B 9/00    (2006.01)
(52) U.S. Cl. ........................... 359/775; 359/740
(58) Field of Classification Search ............... 359/775, 359/739, 740, 771, 772, 776, 784, 785, 786
See application file for complete search history.

(56) References Cited

U.S. PATENT DOCUMENTS

| 6,956,703 | B2 * | 10/2005 | Saito | 359/660 |
| 7,558,006 | B2 * | 7/2009 | Choi et al. | 359/716 |
| 2003/0107824 | A1 * | 6/2003 | Takeuchi | 359/796 |
| 2007/0188887 | A1 * | 8/2007 | Ohtake | 359/687 |

FOREIGN PATENT DOCUMENTS

| JP | 2002-228922 | 8/2002 |
| JP | 2003-255222 | 9/2003 |
| JP | 2005-91666 | 4/2005 |
| JP | 2006-301403 | 11/2006 |

* cited by examiner

Primary Examiner — Jack Dinh
(74) Attorney, Agent, or Firm — Occhiuti Rohlicek & Tsao LLP

(57) ABSTRACT

A lens unit including a first lens, a second lens, a third lens, and a fourth lens arranged in order from an object side toward an image side. The first lens is laminated with the second lens. An aperture stop is held between the first lens and the second lens.

13 Claims, 57 Drawing Sheets

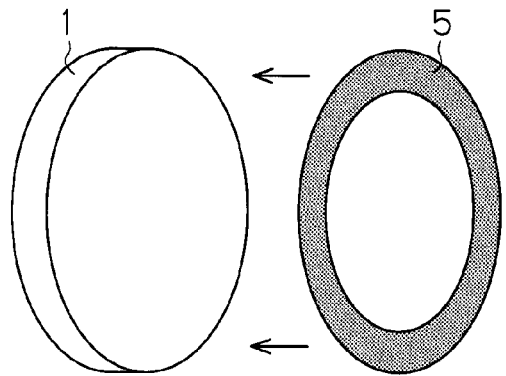
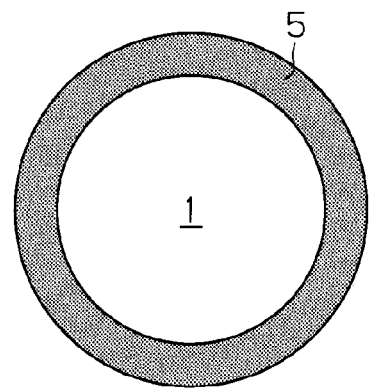
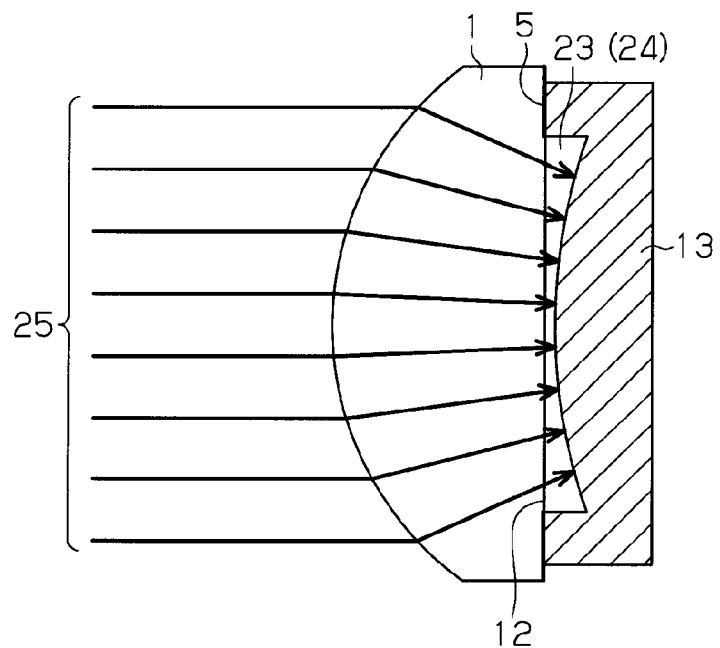

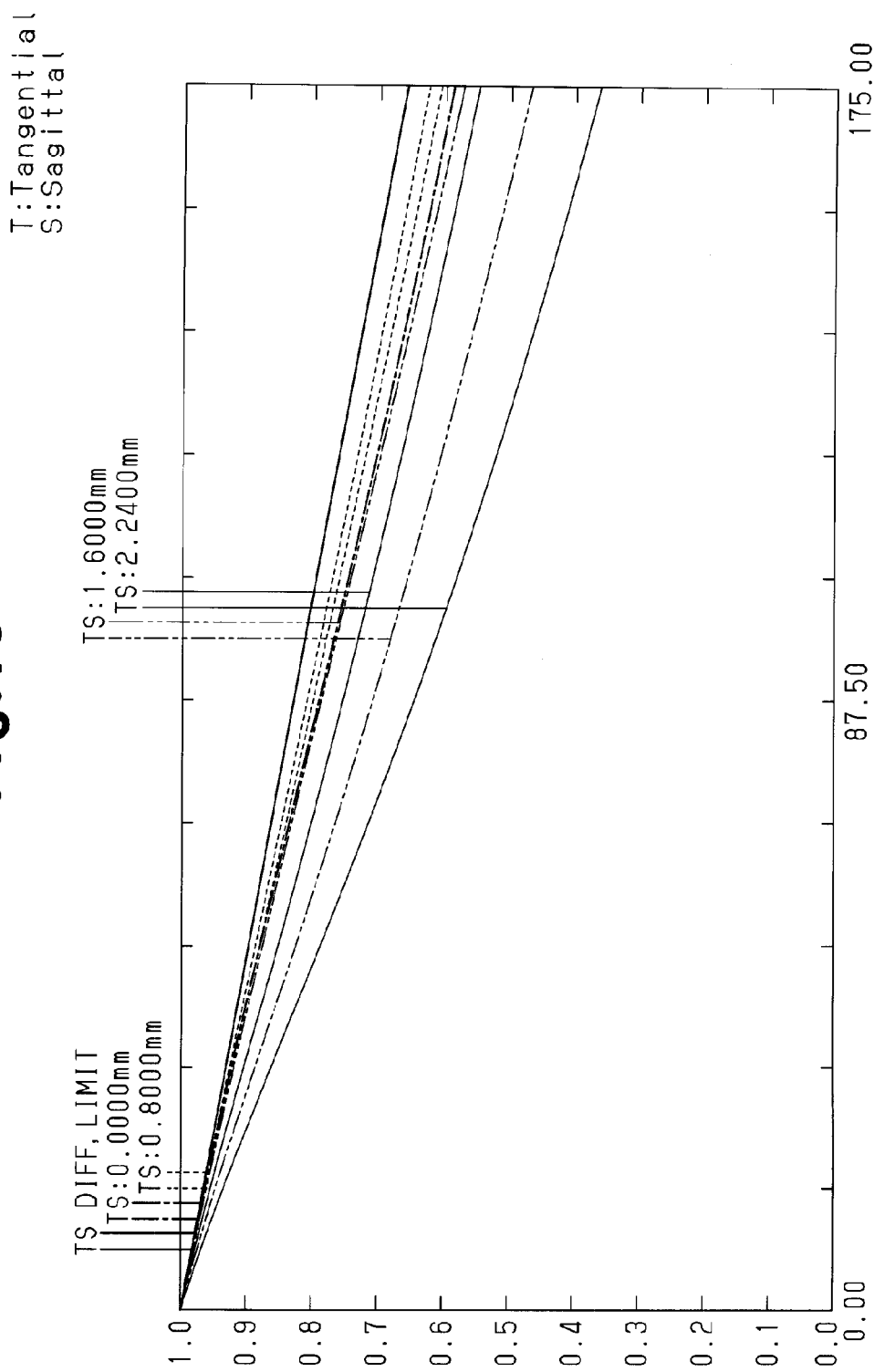

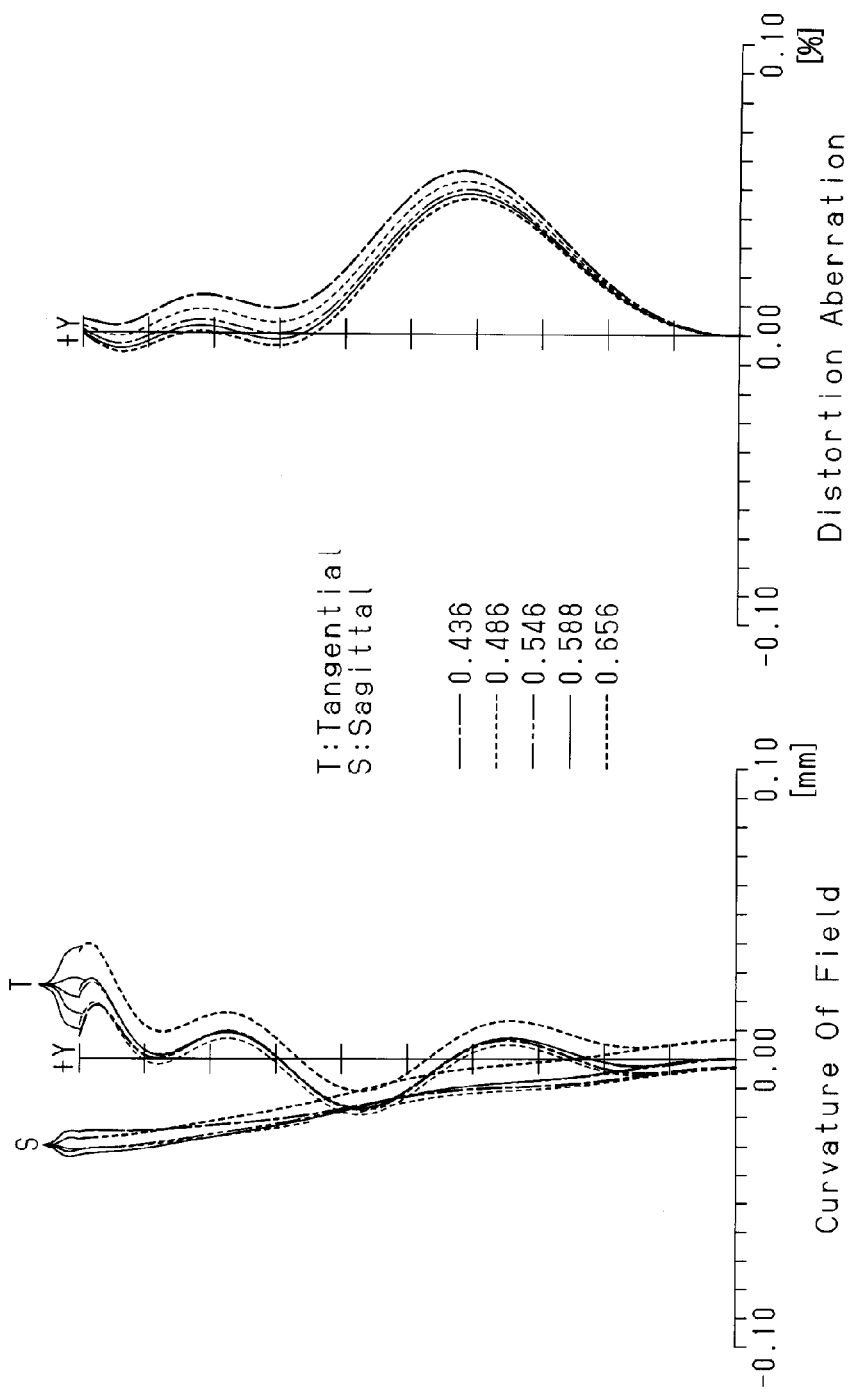
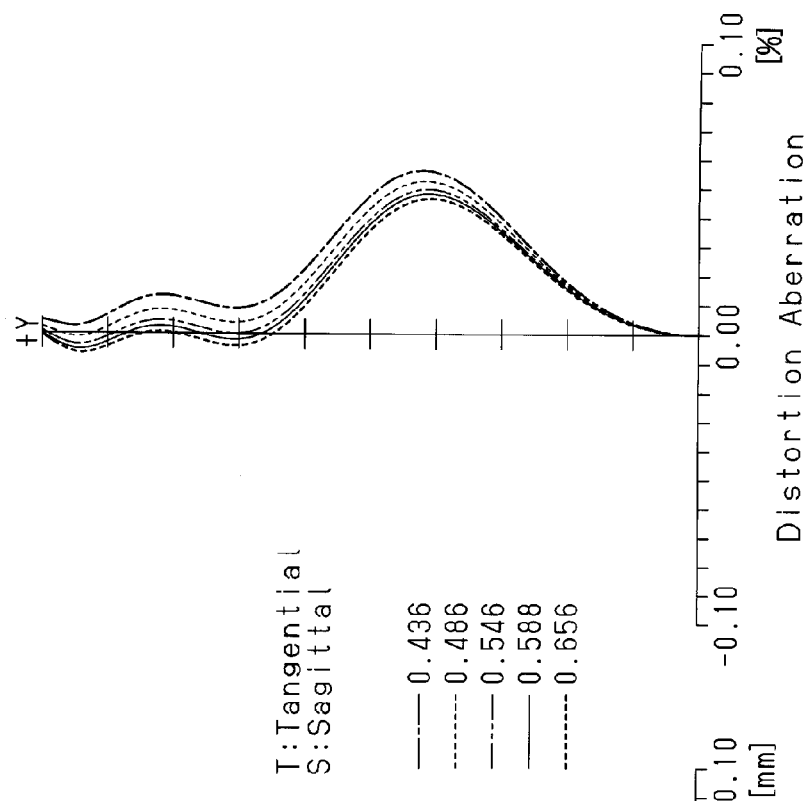

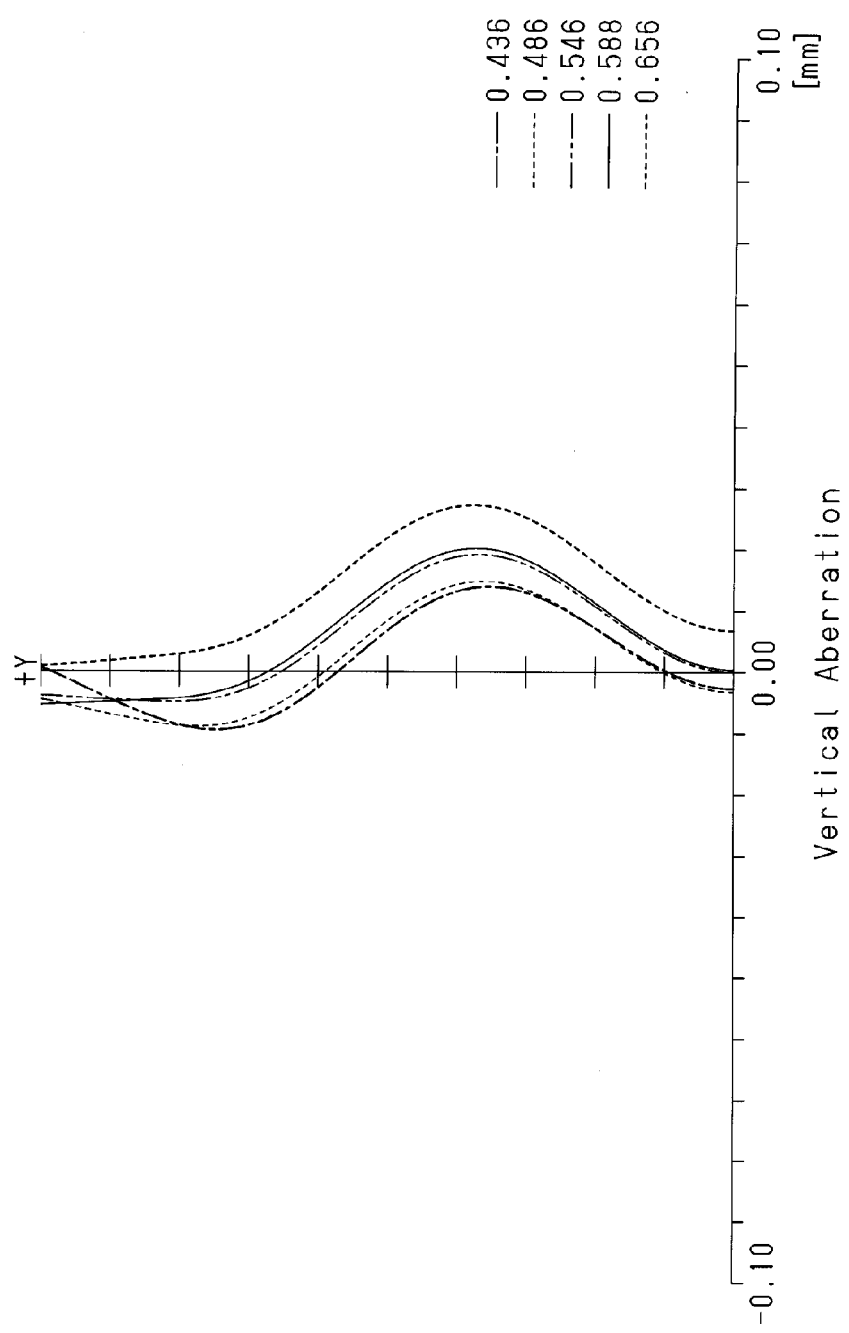

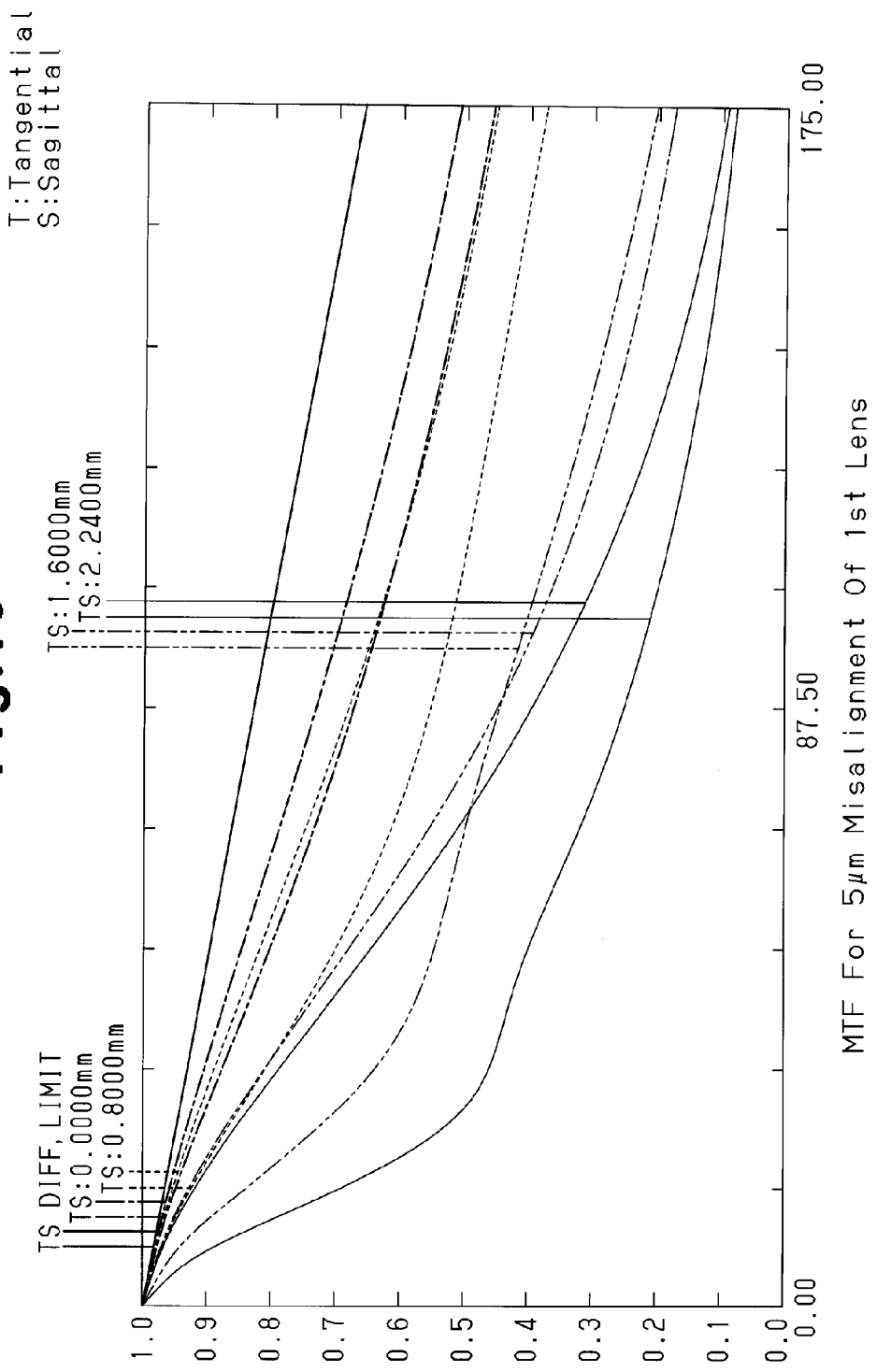

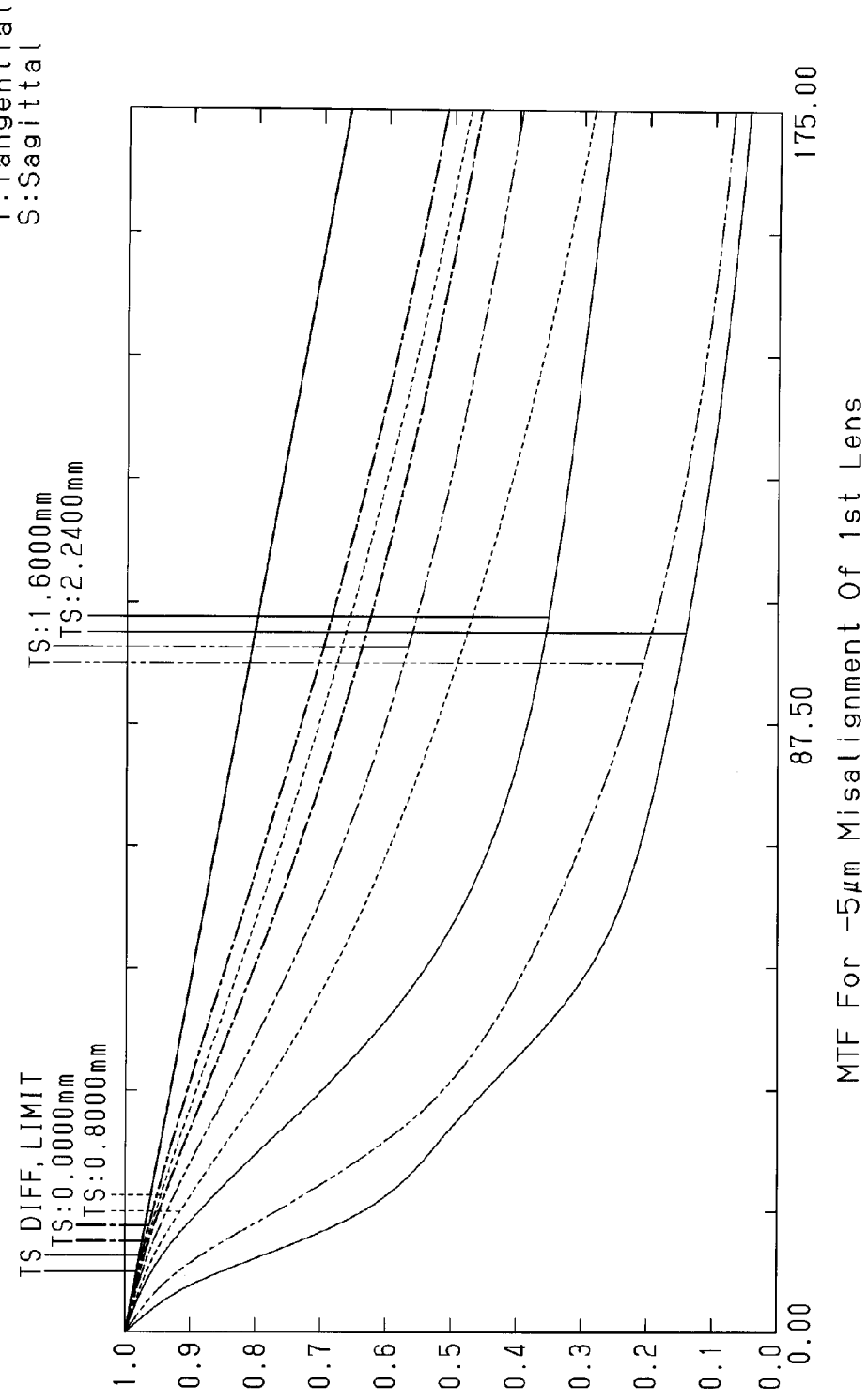

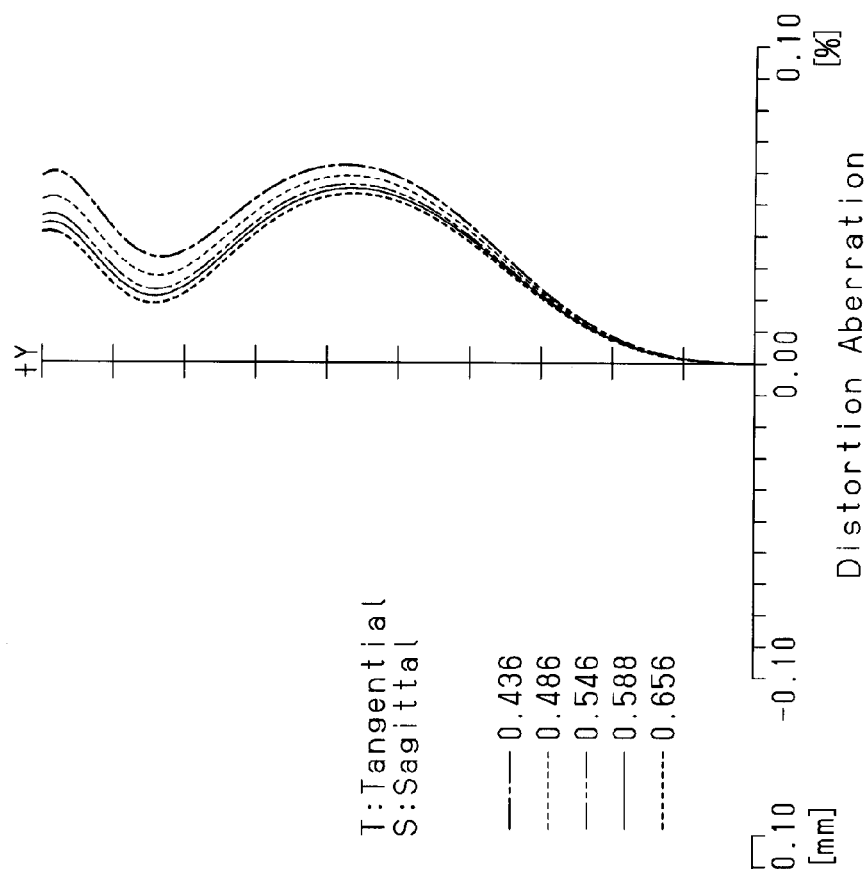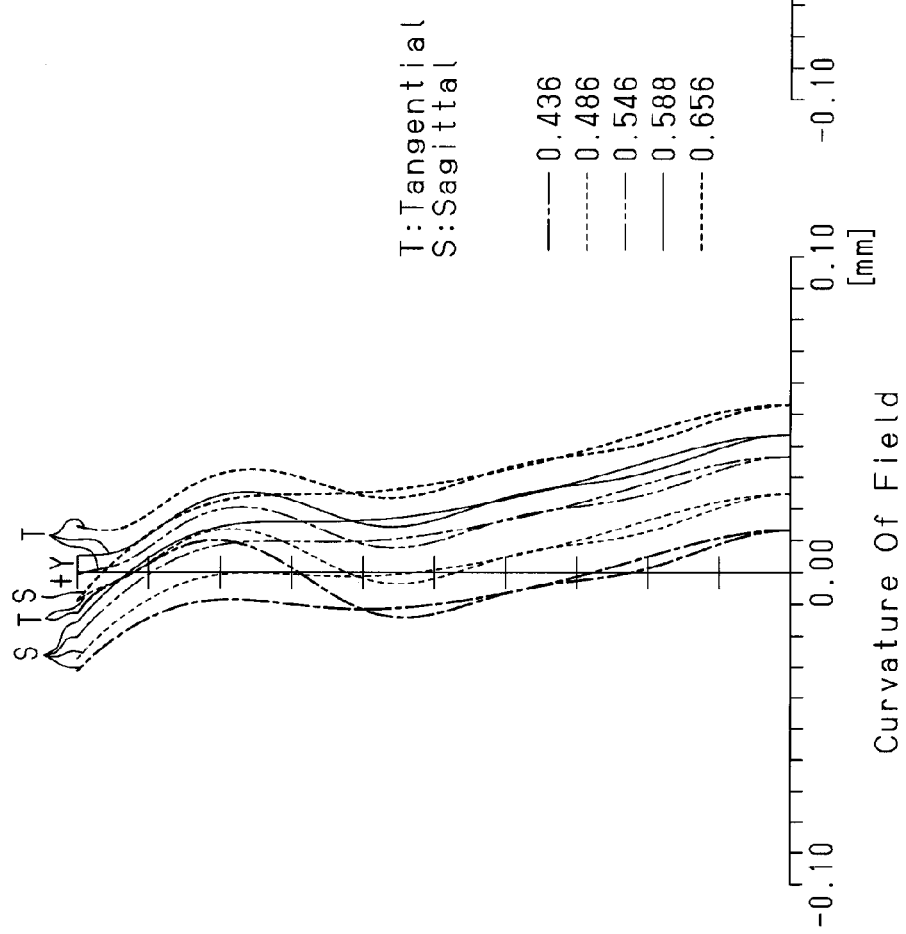

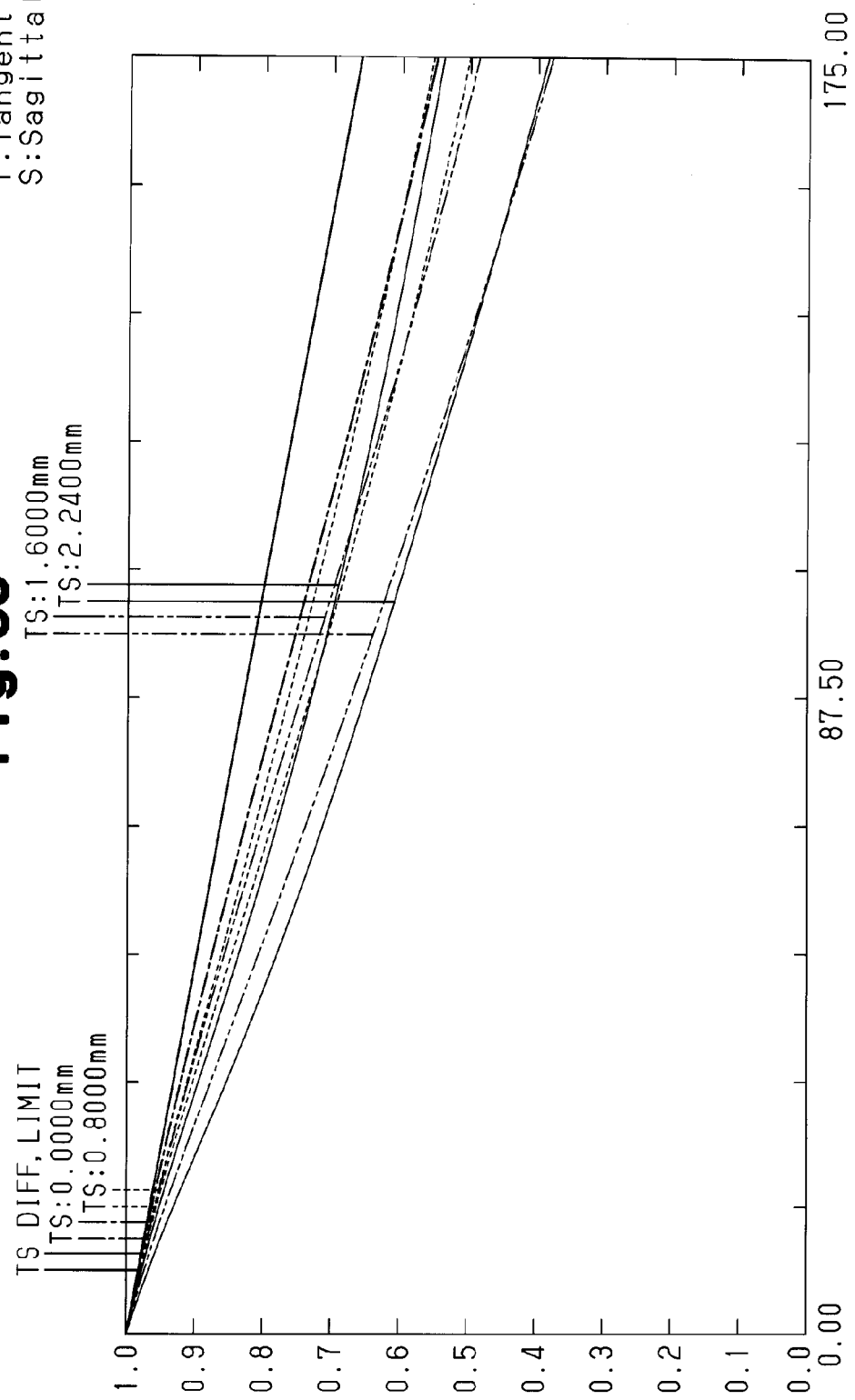

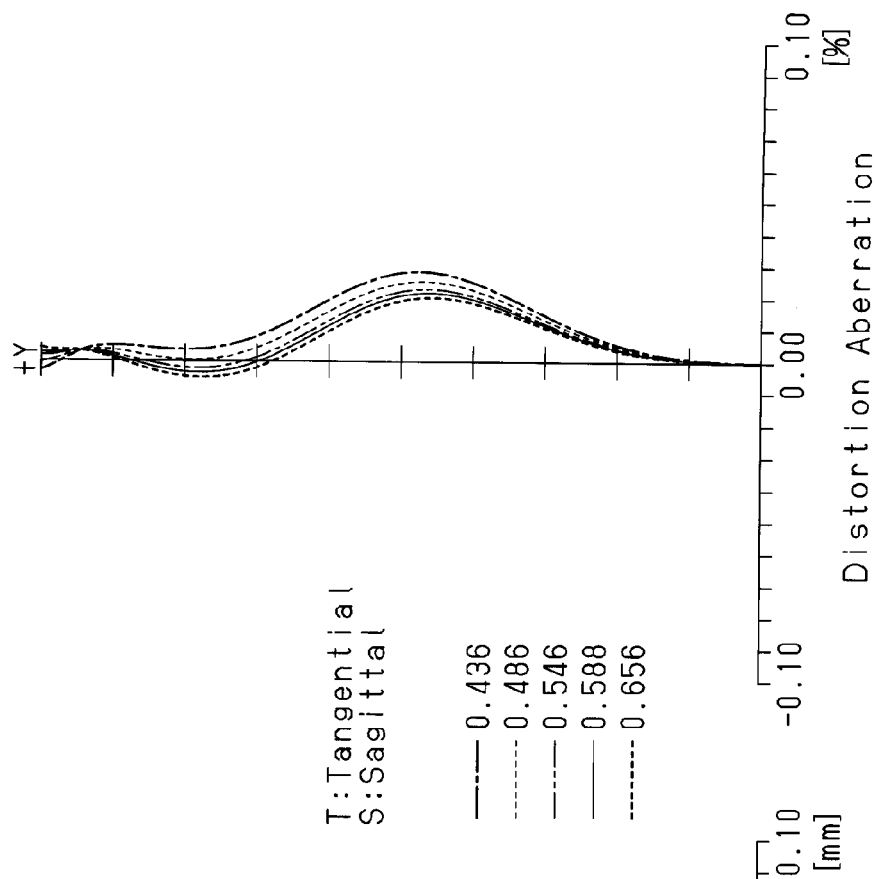
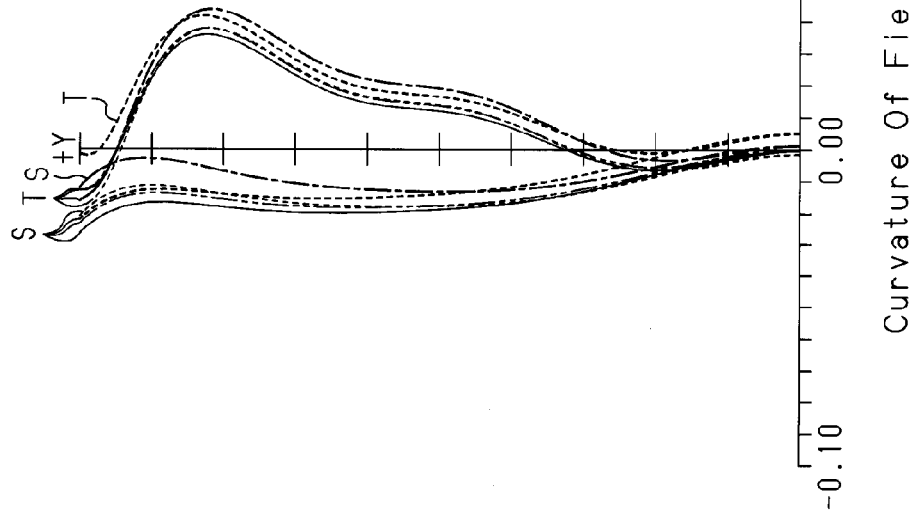

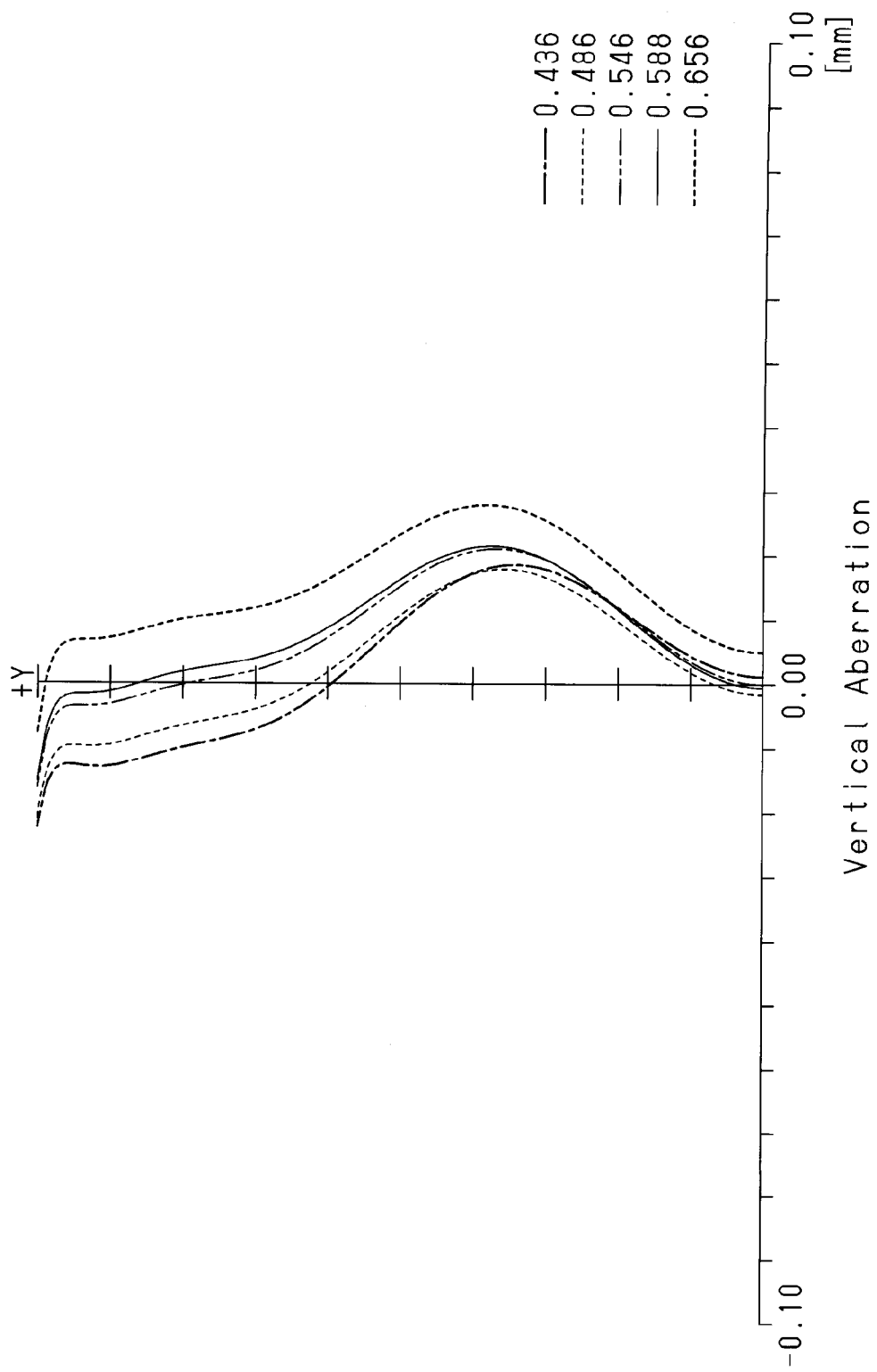

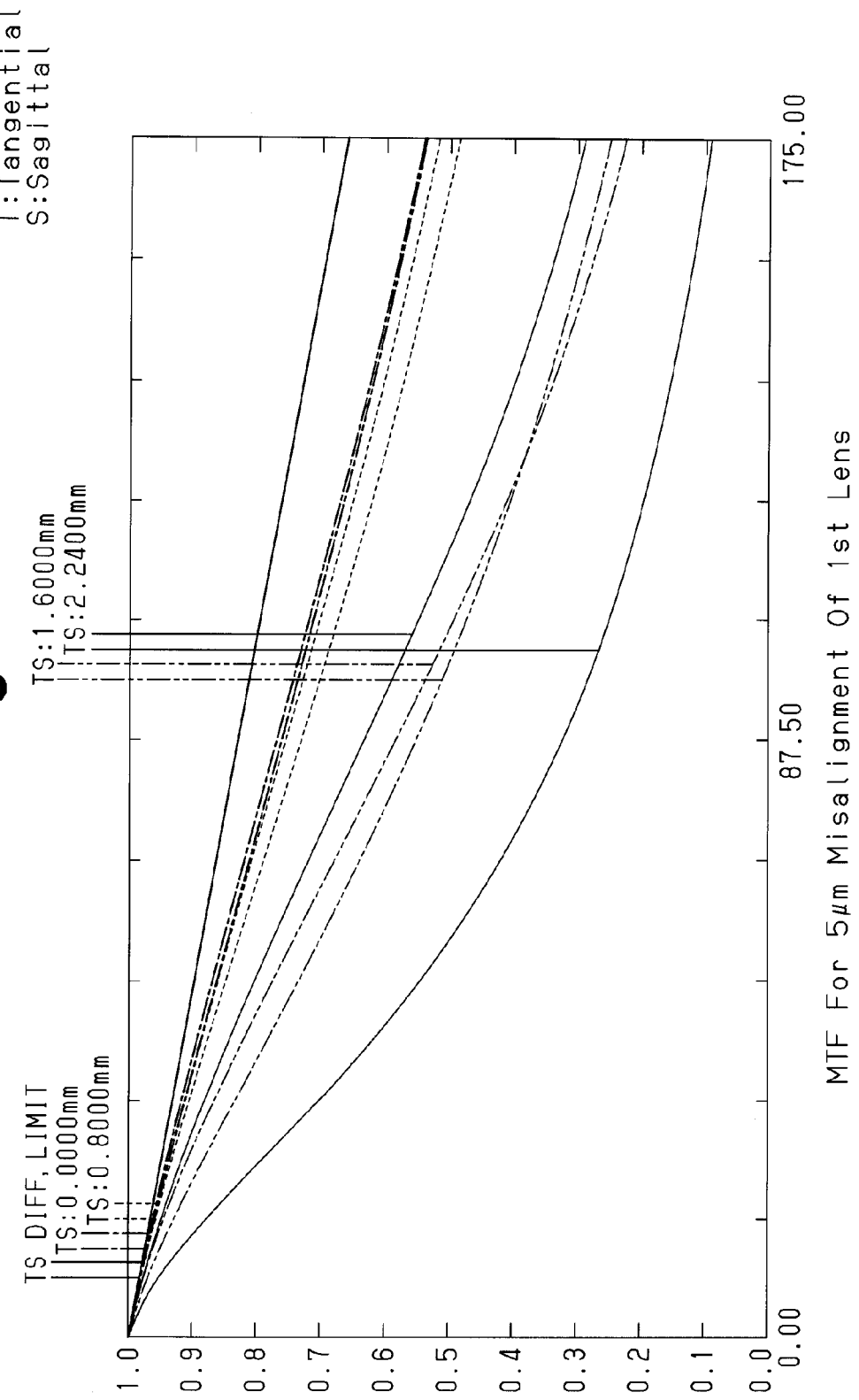

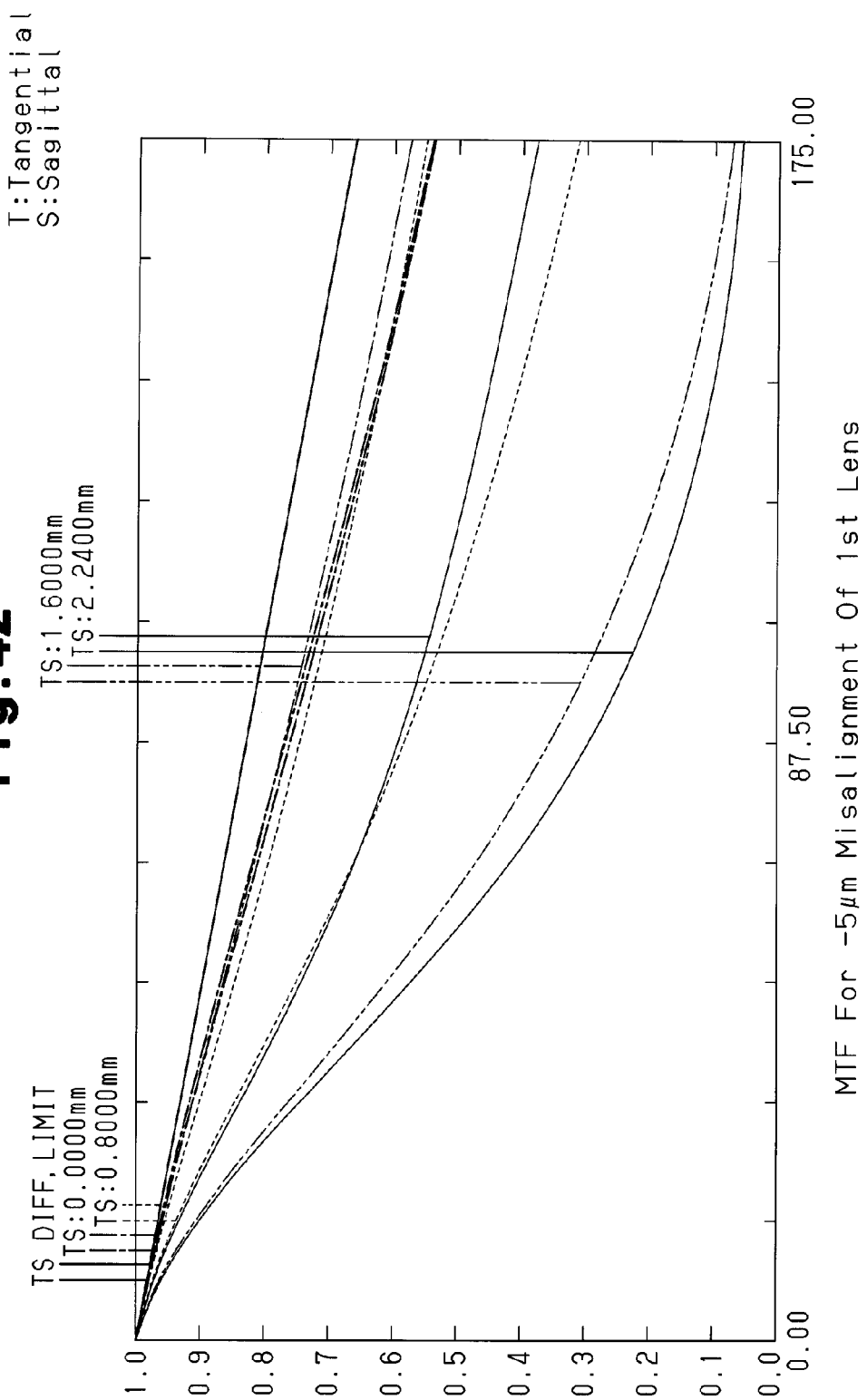

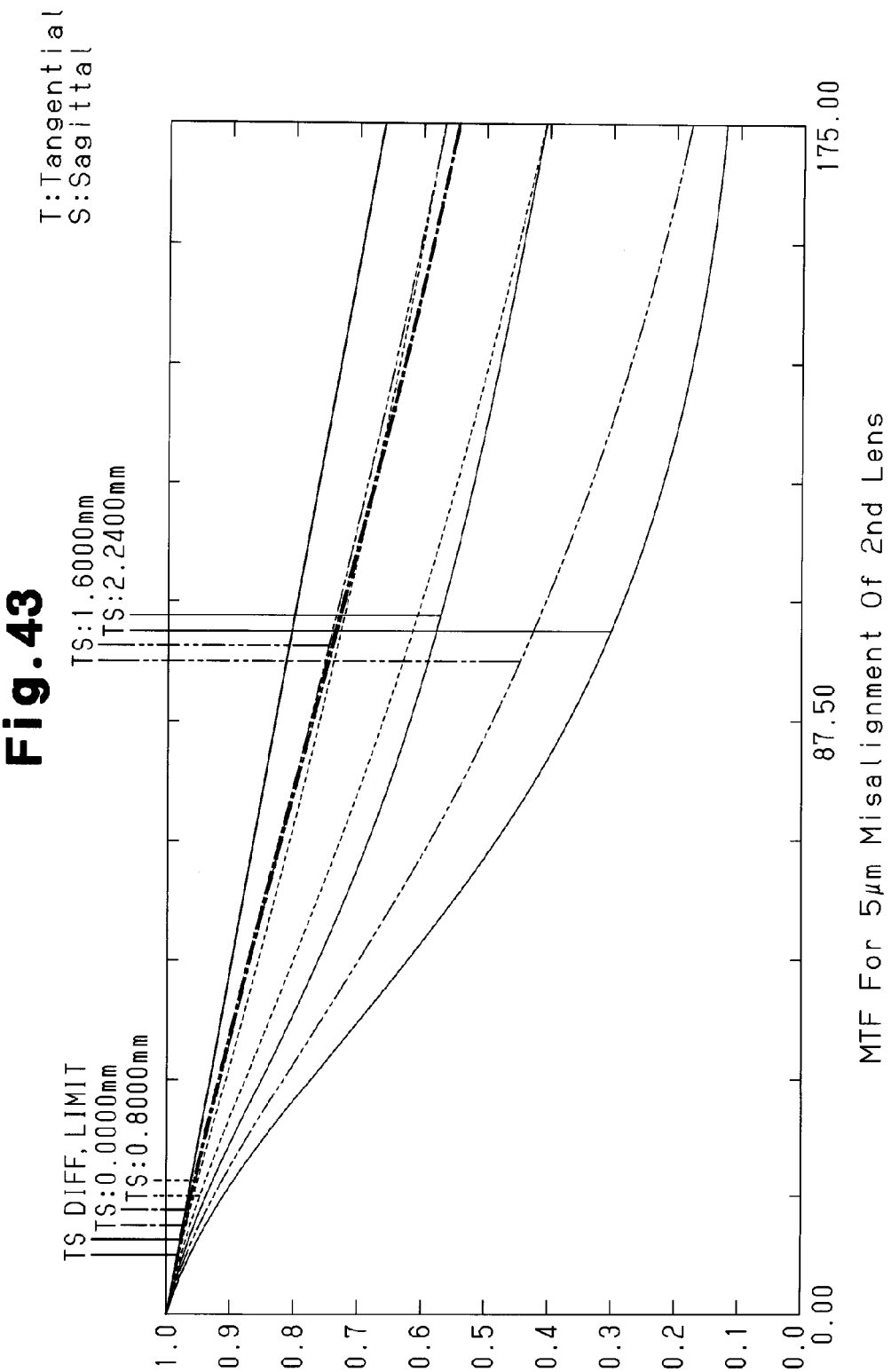

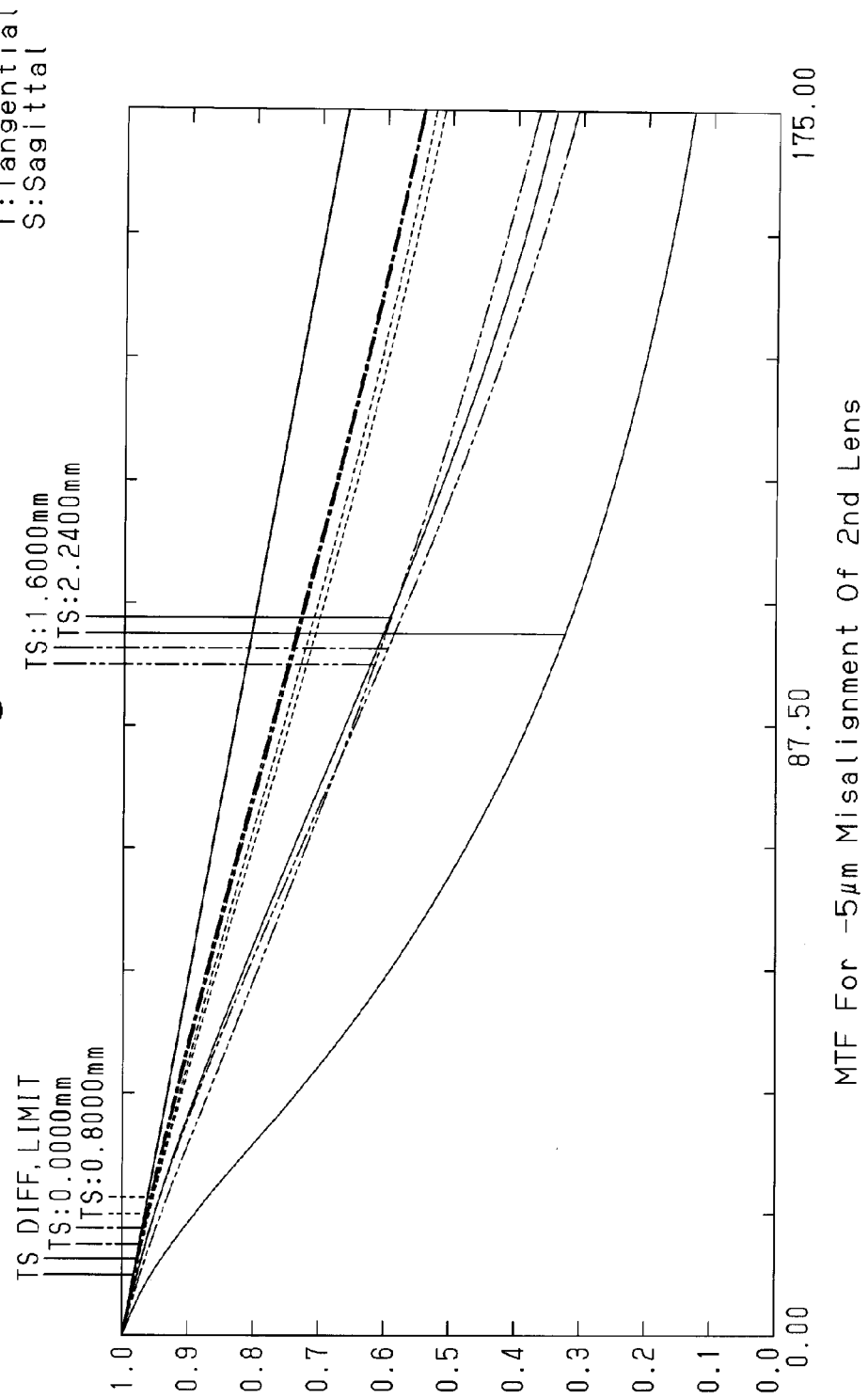

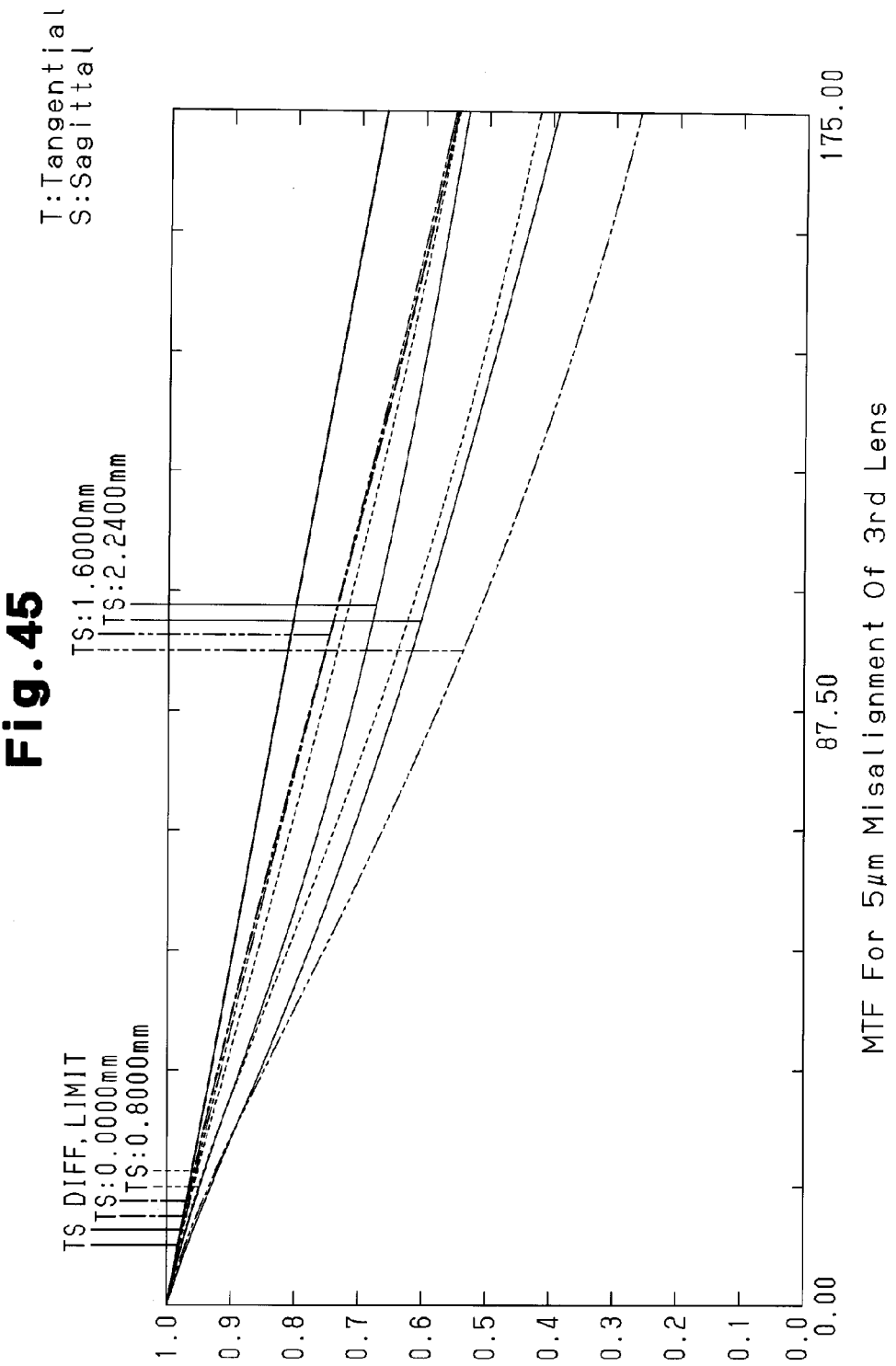

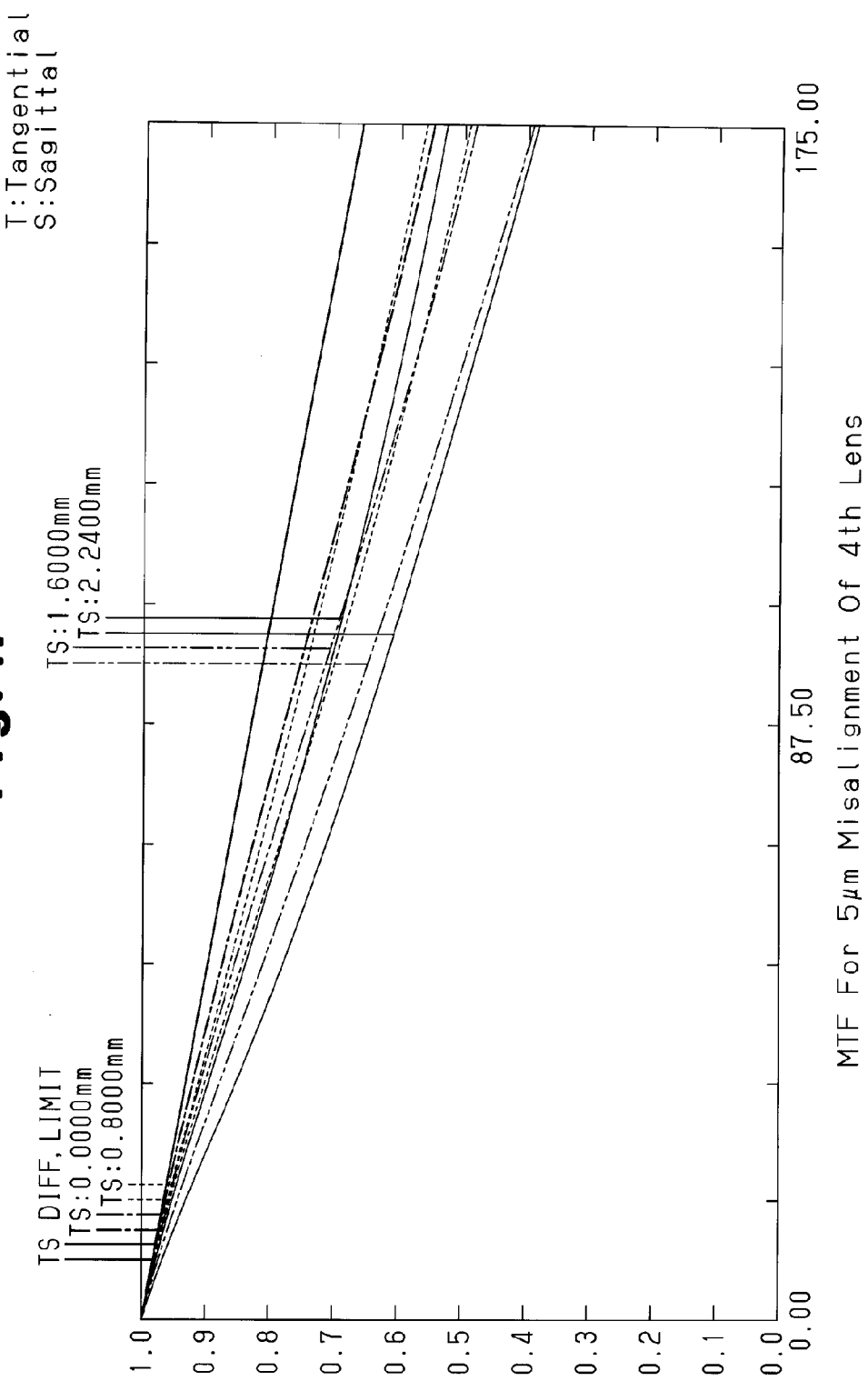

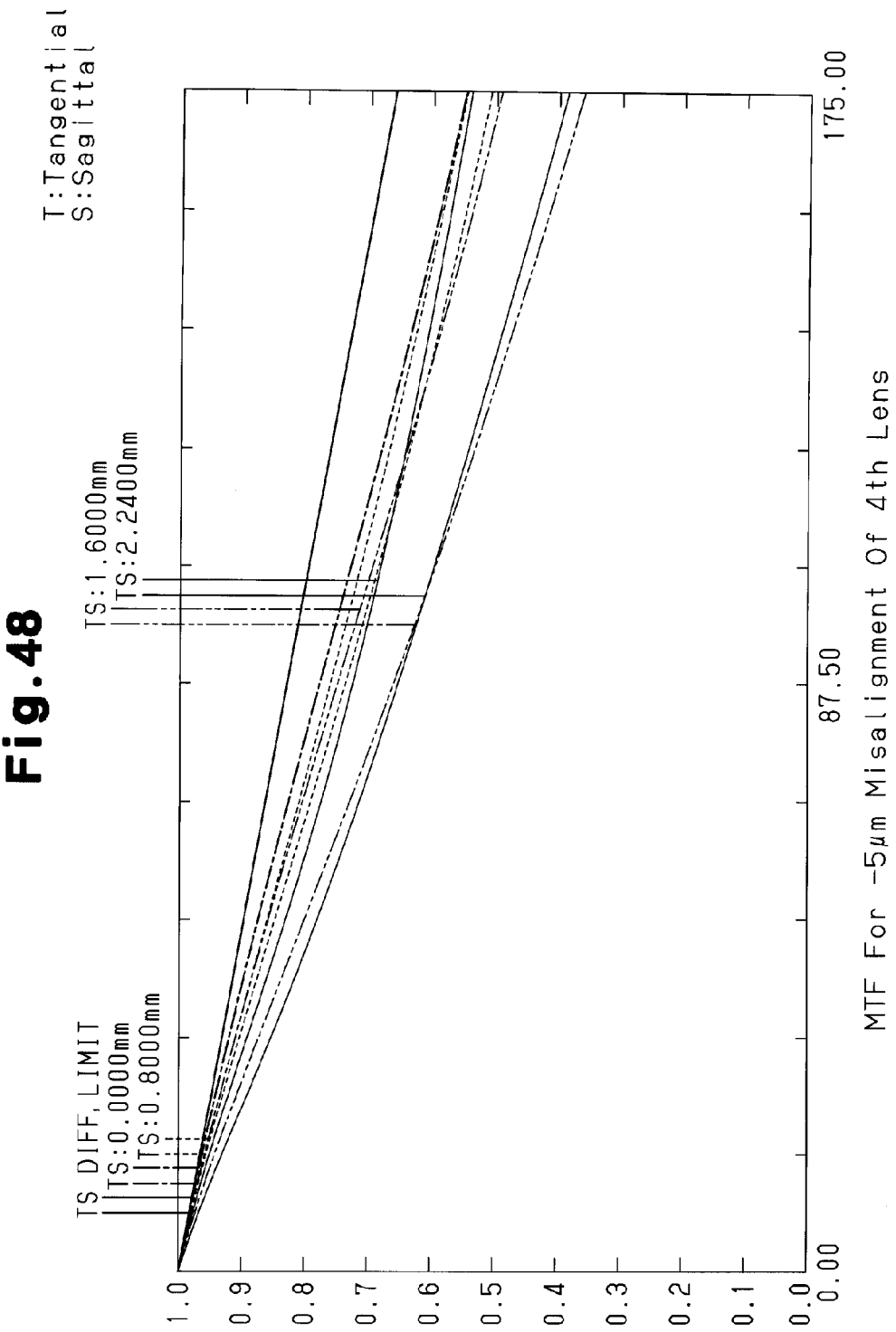

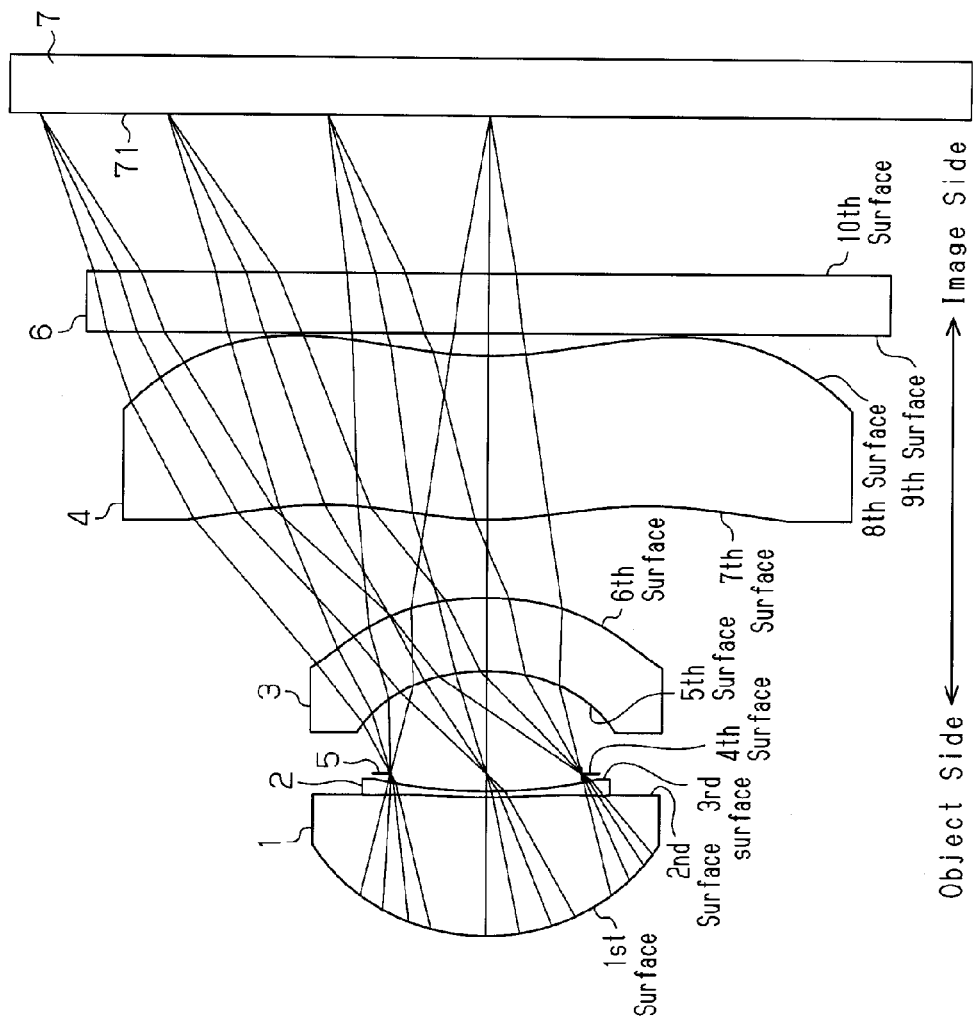

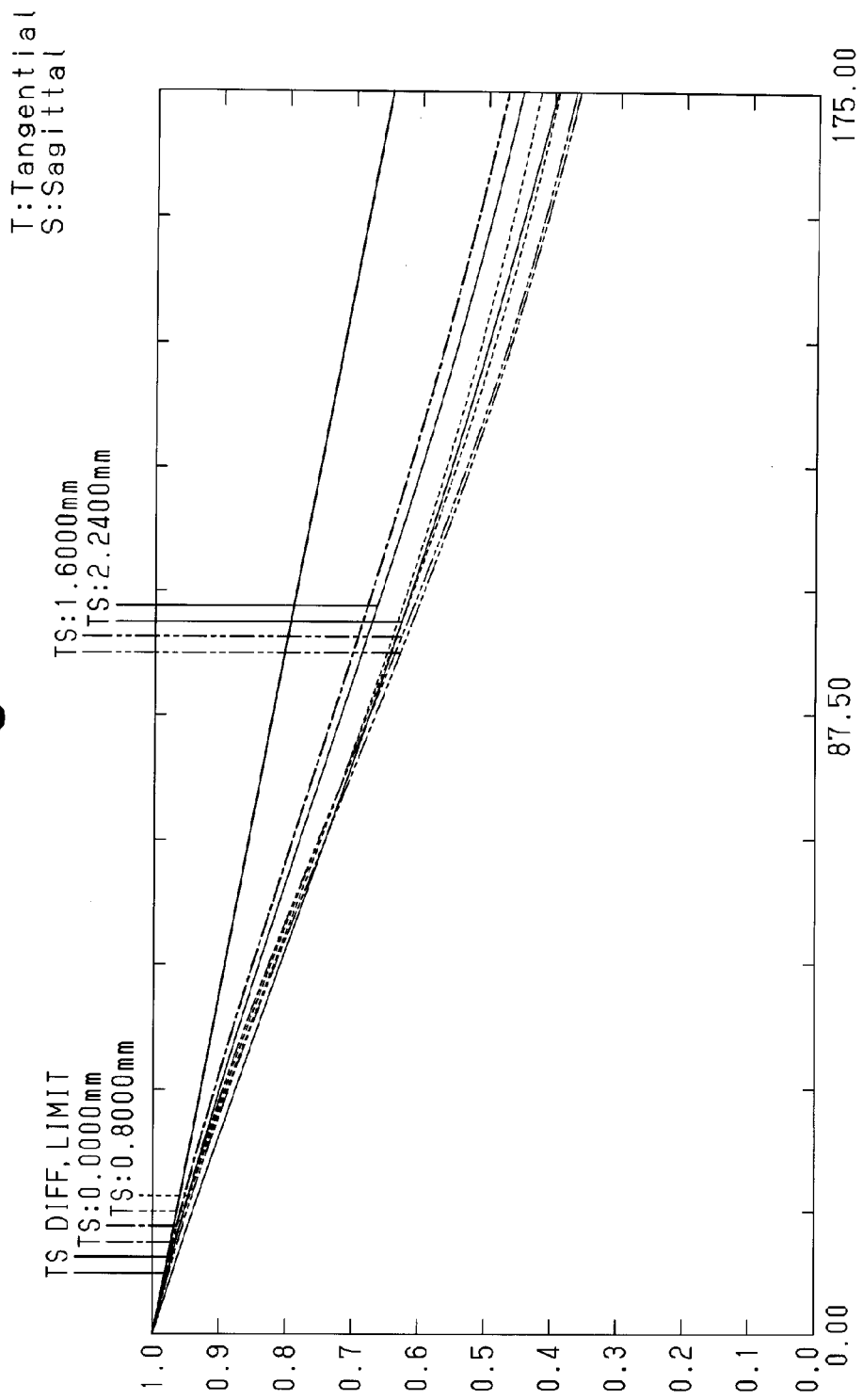

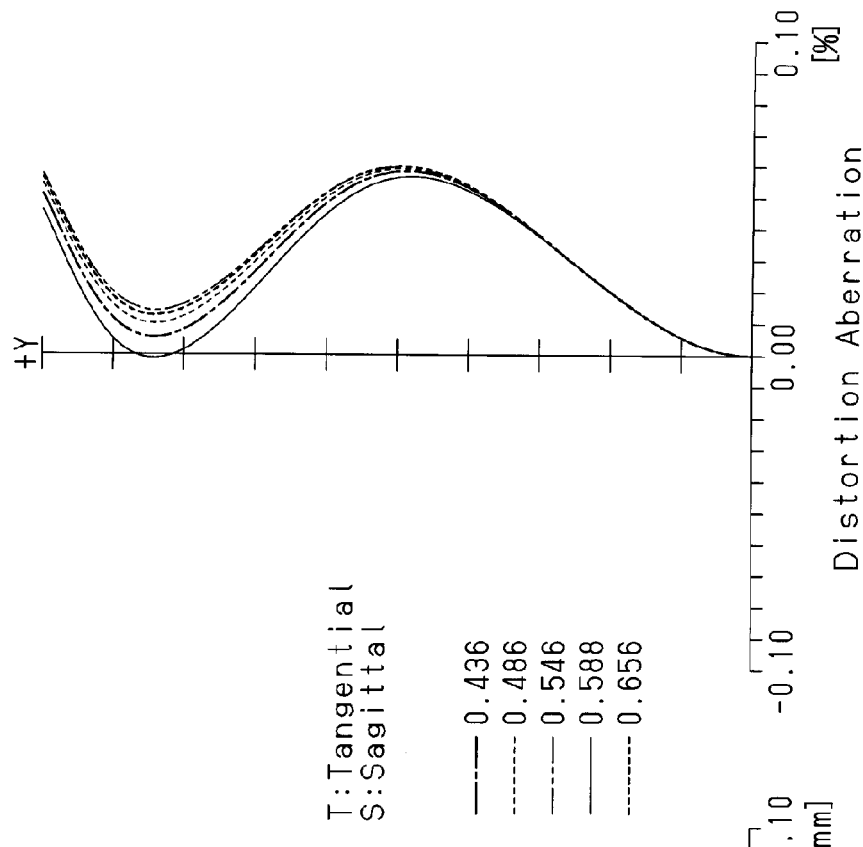
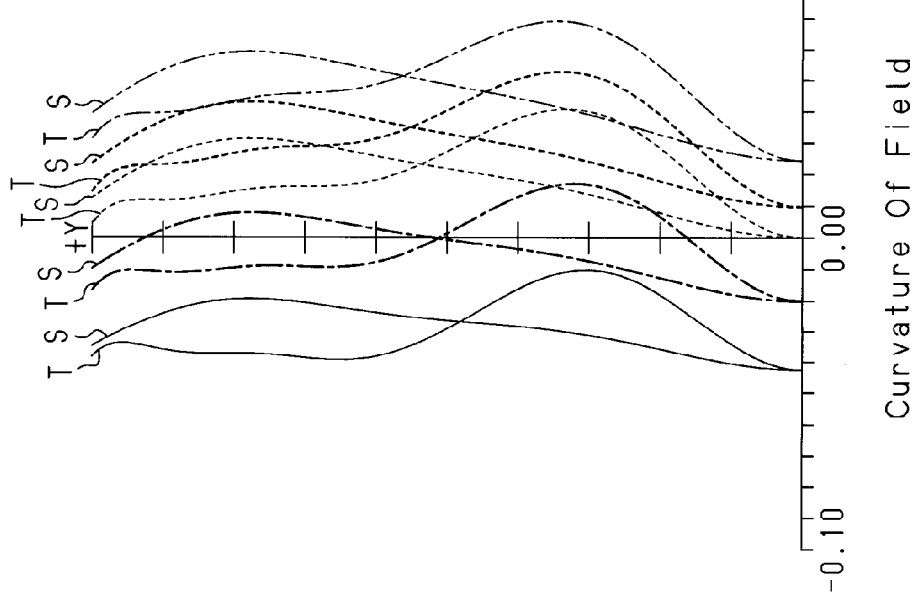

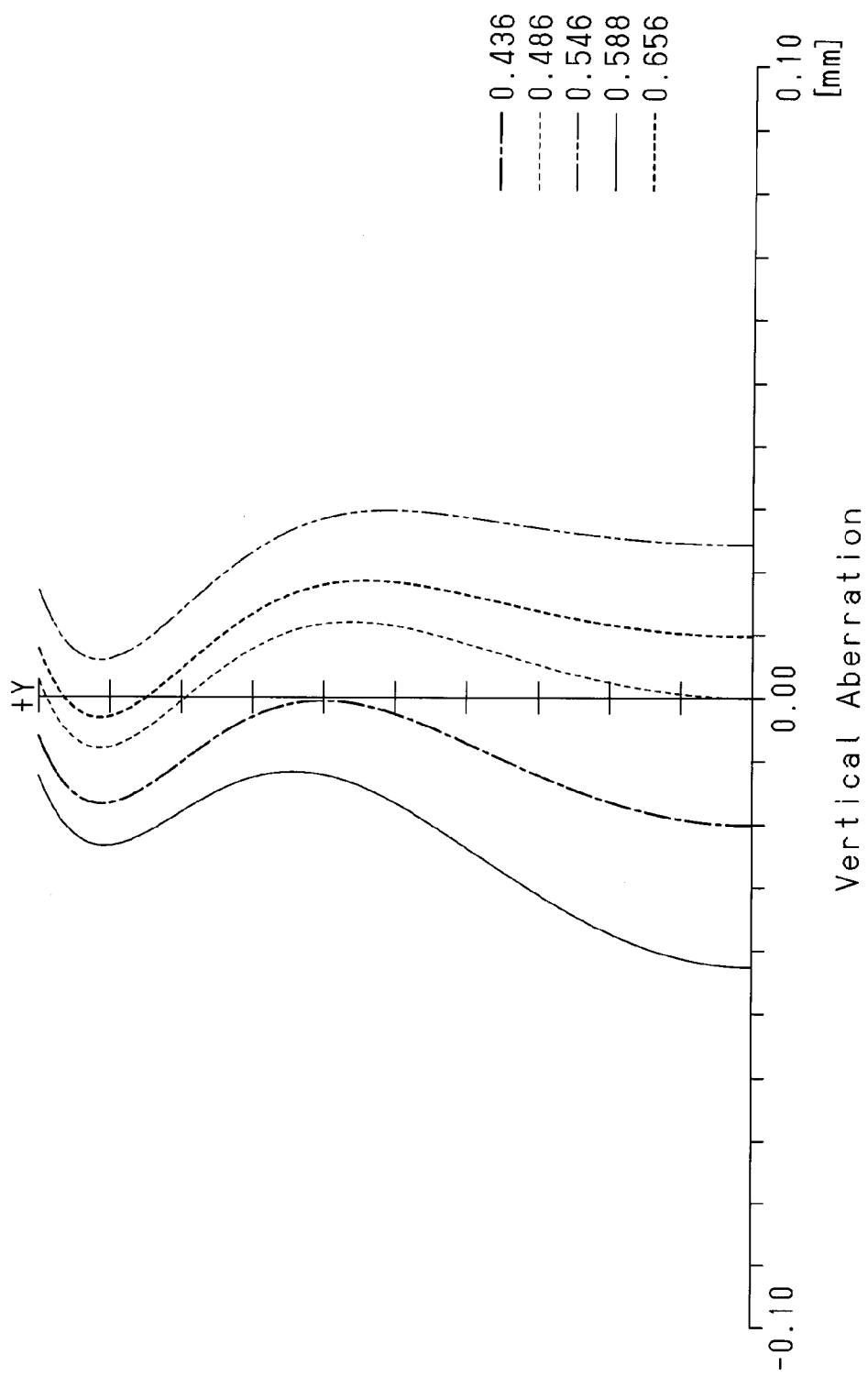

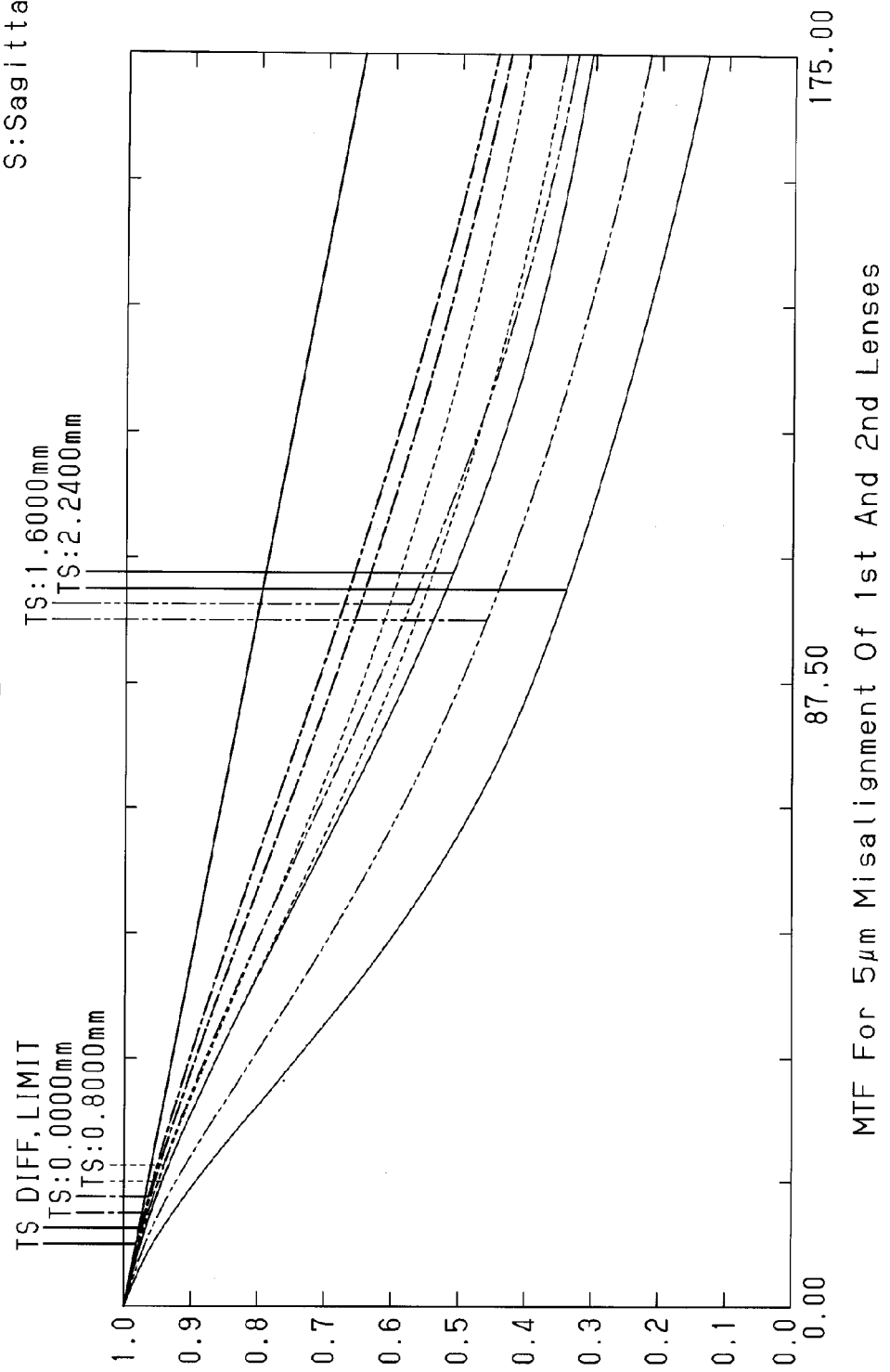

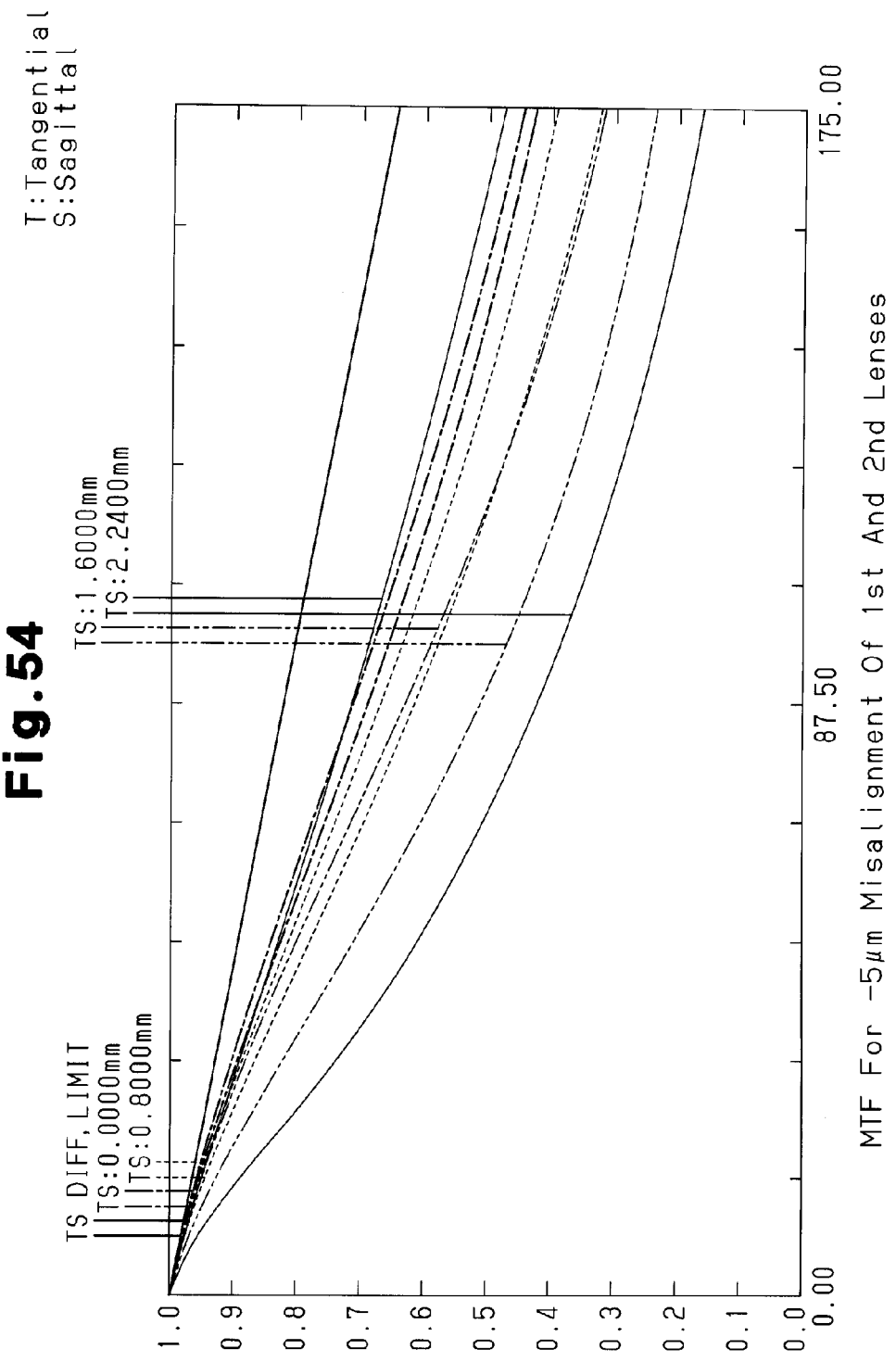

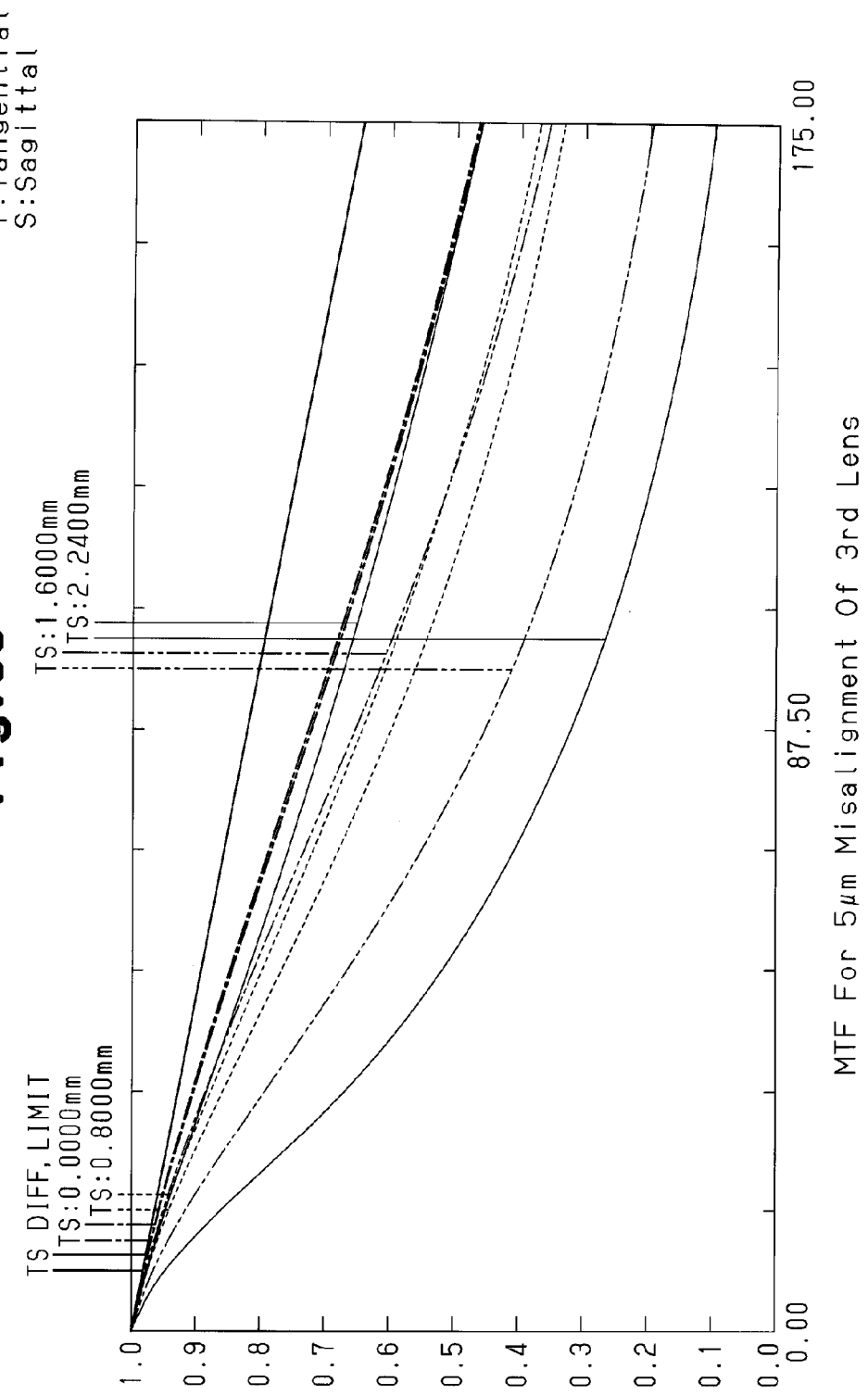

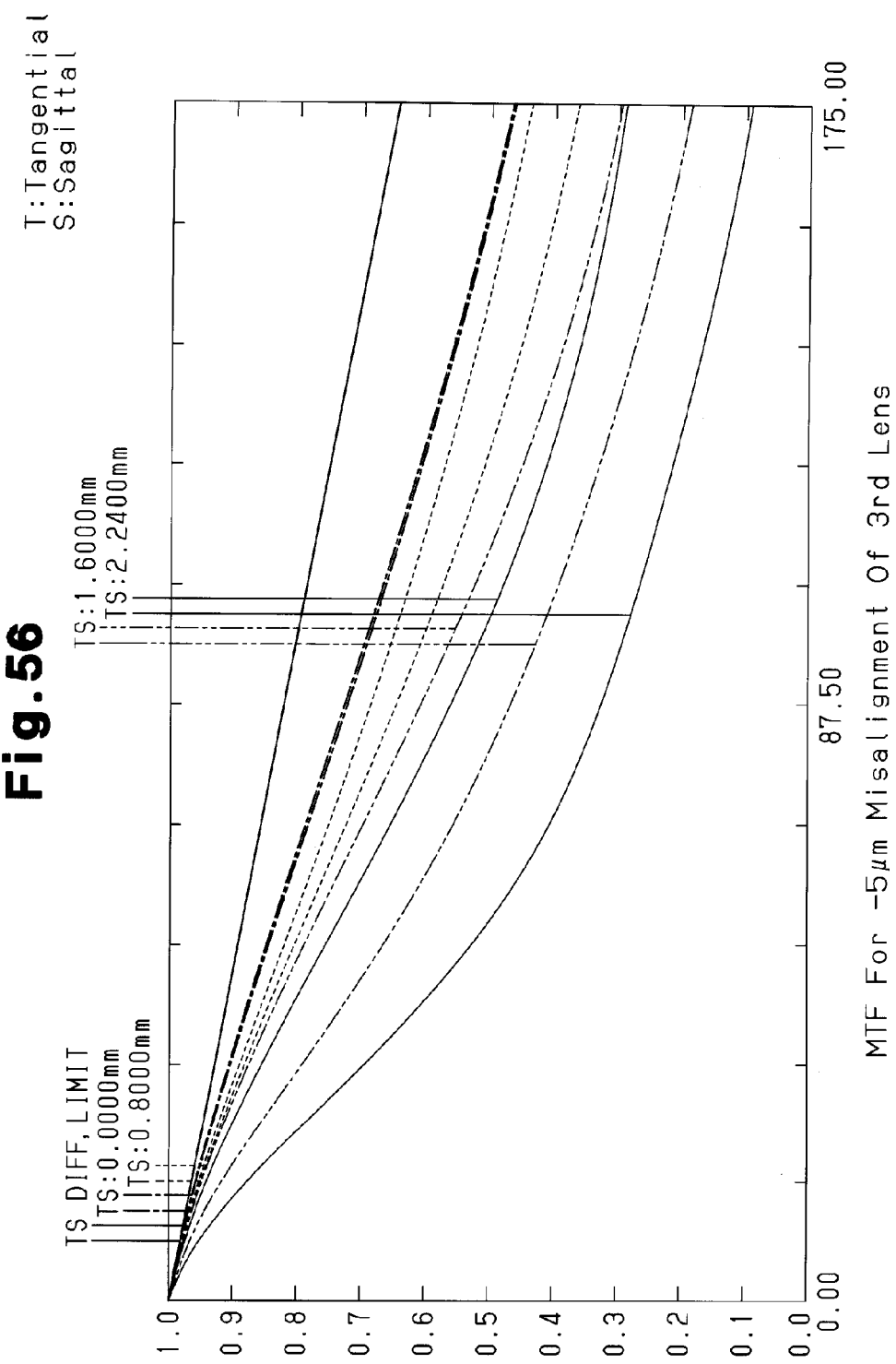

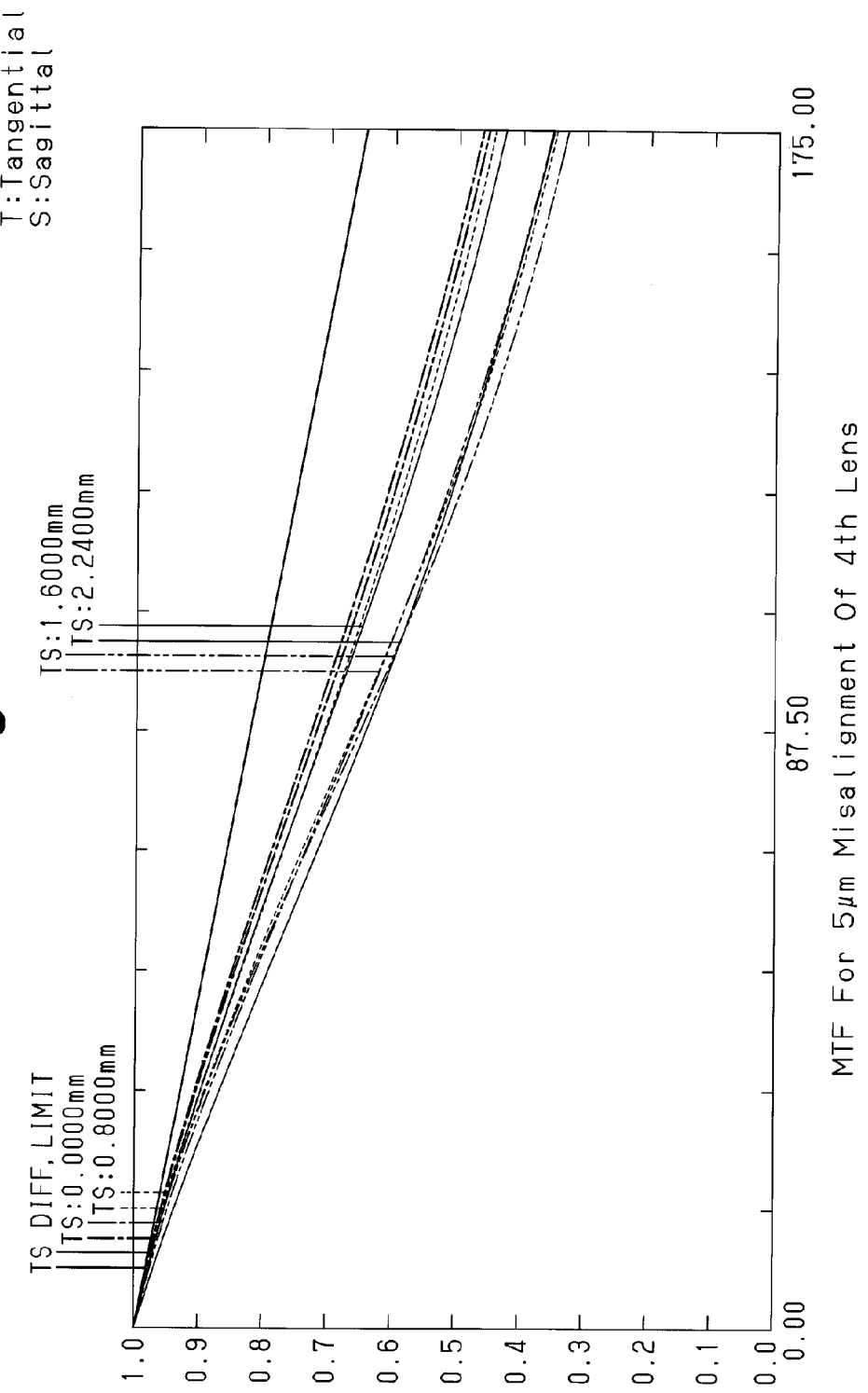

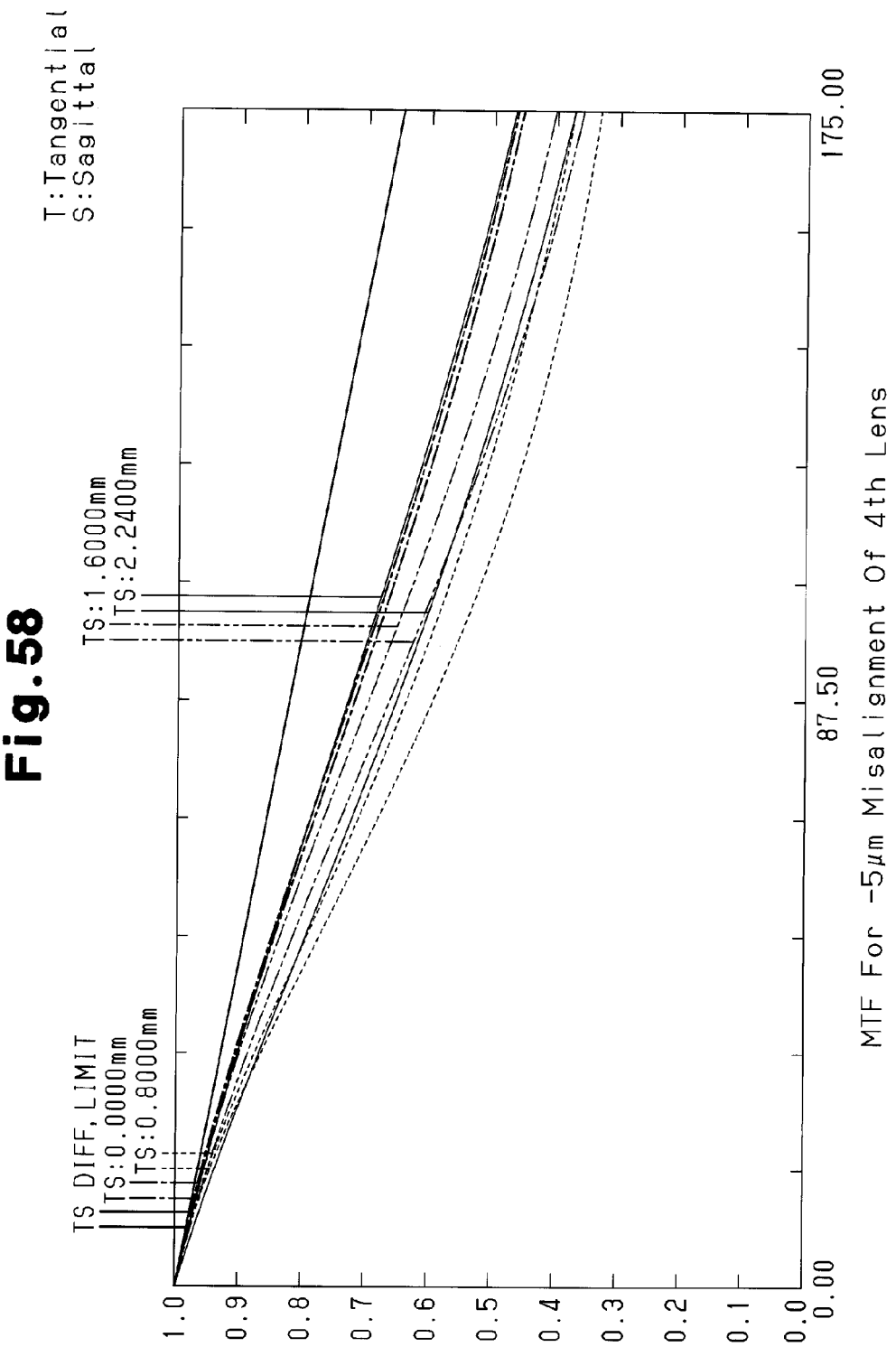

LENS UNIT AND IMAGE CAPTURING DEVICE

CROSS-REFERENCE TO RELATED APPLICATIONS

This application is based upon and claims the benefit of priority from the prior Japanese Patent Application No. 2008-214597, filed on Aug. 22, 2008, the entire contents of which are incorporated herein by reference.

BACKGROUND OF THE INVENTION

The present invention relates to a lens unit, and more particularly, to a lens unit suitable for use in a compact image capturing device. Further, the present invention relates to an image capturing device.

Most of the image capturing devices that are presently being used are digital cameras, which use charged coupled device (CCD) image sensors or complementary metal oxide semiconductor (CMOS) image sensors as image capturing elements. Thus, such an image capturing device must use a lens unit of which capacities differ from that of a so-called silver salt camera. For example, the sensitivity to diagonal incident light is lower in a CCD image sensor or CMOS image sensor than in a silver salt film. Thus, a CCD image sensor or CMOS image sensor must have a small chief ray angle (CRA), which is the incident angle of light rays entering an image capturing device. Due to the improvements made on the integration of image capturing devices, the image quality must be improved even for image capturing devices used in compact camera or mobile phones. At the same time, such an image capturing device must be reduced in size. Furthermore, an image capturing device that is compact and used in a compact camera or mobile phone must have a structure that lowers manufacturing costs so that relatively inexpensive products can be supplied.

To improve the image quality, aberrations must be lowered. Thus, instead of a lens unit having a three-lens structure, which may easily be designed to be compact, it is desirable that a lens unit having a four-lens structure be used, which more easily suppresses aberrations. Japanese Laid-Open Patent Publication Nos. 2002-228922, 2003-255222, 2005-91666, and 2006-301403 describe compact lens units having four-lens structures.

Japanese Laid-Open Patent Publication Nos. 2002-228922 and 2003-255222 each describe a so-called front stop lens system in which the stop is located further toward an image capturing side (hereinafter referred to as the "object side") from the lens located at the furthermost object side. In such a structure, it is generally known that when misalignment occurs in a lens located toward an image capturing element side (hereinafter referred to as the "image side") from the stop, the misalignment greatly affects the image quality. As a result, there is a tendency for product defects to occur due to such misalignment. This lowers the manufacturing yield of the lens unit and increases manufacturing costs.

Japanese Laid-Open Patent Publication Nos. 2005-91666 and 2006-301403 each describe a so-called middle stop lens system in which the stop is located toward the image side from the lens located at the furthermost object side. In such a structure, it is generally known that such a structure increases the CRA. However, the lens unit for a digital camera is strongly required to have a small CRA as described above. Thus, the refractive index of each lens must be adjusted to decrease the CRA. However, when increasing the thickness of each lens or the intervals of the lenses to adjust the refractive index, the entire length of the lens unit increases. This enlarges the lens unit.

SUMMARY OF THE INVENTION

The present invention provides a lens unit having a structure that prevents the chief ray angle from increasing and keeps the manufacturing costs low while enabling miniaturization from the prior art structure.

One aspect of the present invention is a lens unit including a first lens, a second lens, a third lens, and a fourth lens arranged in order from an object side toward an image side. The first lens is laminated with the second lens. An aperture stop is held between the first lens and the second lens.

A further aspect of the present invention is an image capturing device provided with a lens unit including a first lens, a second lens, a third lens, and a fourth lens arranged in order from an object side toward an image side. The first lens is laminated with the second lens. An aperture stop is held between the first lens and the second lens.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 is an external view showing the portable terminal when in use.

FIG. 4 is a schematic diagram showing the structure of a first lens and an aperture stop, FIG. 4A is a perspective view showing a stretched polyester film, in which carbon black is mixed, being fixed to the first lens, and FIG. 4B is a front view showing the stretched polyester film fixed to the first lens from an image side;

FIG. 5 is a schematic cross-sectional view showing the structure of the first lens and a second lens (resin) in the preferred embodiment in a state in which ultraviolet rays are irradiated onto an ultraviolet curing resin in a mold of which opening is closed by the first lens;

FIG. 7A is a graph showing the image surface curve, and FIG. 7B is a graph showing the distortion aberration;

FIG. 16 is a graph showing the transfer function (MTF), which indicates one of the characteristics of the lens unit in comparative example 1;

FIG. 17 shows one of the characteristics of the lens unit in comparative example 1, FIG. 17A is a graph showing the image surface curve, and FIG. 17B is a graph showing the distortion aberration;

FIG. 18 is a graph showing a vertical aberration, which indicates one of the characteristics of the lens unit in comparative example 1;

FIG. 19 is a graph showing the transfer function (MTF), which indicates one of the characteristics of the lens unit in comparative example 1, when a first lens is upwardly misaligned by 5 μm;

FIG. 20 is a graph showing the transfer function (MTF), which indicates one of the characteristics of the lens unit in comparative example 1, when the first lens is downwardly misaligned by 5 μm;

FIG. 29 shows one of the characteristics of the lens unit in comparative example 2, FIG. 29A is a graph showing the image surface curve, and FIG. 29B is a graph showing the distortion aberration;

FIG. 38 is a graph showing the transfer function (MTF), which indicates one of the characteristics of the lens unit in comparative example 3;

FIG. 39 shows one of the characteristics of the lens unit in comparative example 3, FIG. 39A is a graph showing the image surface curve, and FIG. 39B is a graph showing the distortion aberration;

FIG. 40 is a graph showing a vertical aberration, which indicates one of the characteristics of the lens unit in comparative example 3;

FIG. 41 is a graph showing the transfer function (MTF), which indicates one of the characteristics of the lens unit in comparative example 3, when a first lens is upwardly misaligned by 5 μm;

FIG. 42 is a graph showing the transfer function (MTF), which indicates one of the characteristics of the lens unit in comparative example 3, when the first lens is downwardly misaligned by 5 μm;

FIG. 43 is a graph showing the transfer function (MTF), which indicates one of the characteristics of the lens unit in comparative example 3, when a second lens is upwardly misaligned by 5 μm;

FIG. 44 is a graph showing the transfer function (MTF), which indicates one of the characteristics of the lens unit in comparative example 3, when the second lens is downwardly misaligned by 5 μm;

FIG. 45 is a graph showing the transfer function (MTF), which indicates one of the characteristics of the lens unit in comparative example 3, when a third lens is upwardly misaligned by 5 μm;

FIG. 47 is a graph showing the transfer function (MTF), which indicates one of the characteristics of the lens unit in comparative example 3, when a fourth lens is upwardly misaligned by 5 μm;

FIG. 48 is a graph showing the transfer function (MTF), which indicates one of the characteristics of the lens unit in comparative example 3, when the fourth lens is downwardly misaligned by 5 μm;

FIG. 49 is a schematic cross-sectional view showing an image capturing device of comparative example 4 taken along a plane including the optical axis;

FIG. 50 is a graph showing the transfer function (MTF), which indicates one of the characteristics of the lens unit in comparative example 4;

FIG. 51 shows one of the characteristics of the lens unit in comparative example 4, FIG. 51A is a graph showing the image surface curve, and FIG. 51B is a graph showing the distortion aberration;

FIG. 52 is a graph showing a vertical aberration, which indicates one of the characteristics of the lens unit in comparative example 4;

FIG. 53 is a graph showing the transfer function (MTF), which indicates one of the characteristics of the lens unit in comparative example 4, when a first lens is upwardly misaligned by 5 μm;

FIG. 54 is a graph showing the transfer function (MTF), which indicates one of the characteristics of the lens unit in comparative example 4, when the first lens is downwardly misaligned by 5 μm;

FIG. 55 is a graph showing the transfer function (MTF), which indicates one of the characteristics of the lens unit in comparative example 4, when a third lens is upwardly misaligned by 5 μm;

FIG. 56 is a graph showing the transfer function (MTF), which indicates one of the characteristics of the lens unit in comparative example 4, when the third lens is downwardly misaligned by 5 μm;

FIG. 57 is a graph showing the transfer function (MTF), which indicates one of the characteristics of the lens unit in comparative example 4, when a fourth lens is upwardly misaligned by 5 μm; and FIG. 58 is a graph showing the transfer function (MTF), which indicates one of the characteristics of the lens unit in comparative example 4, when the fourth lens is downwardly misaligned by 5 μm.

DETAILED DESCRIPTION OF THE PREFERRED EMBODIMENTS

Figure 1:
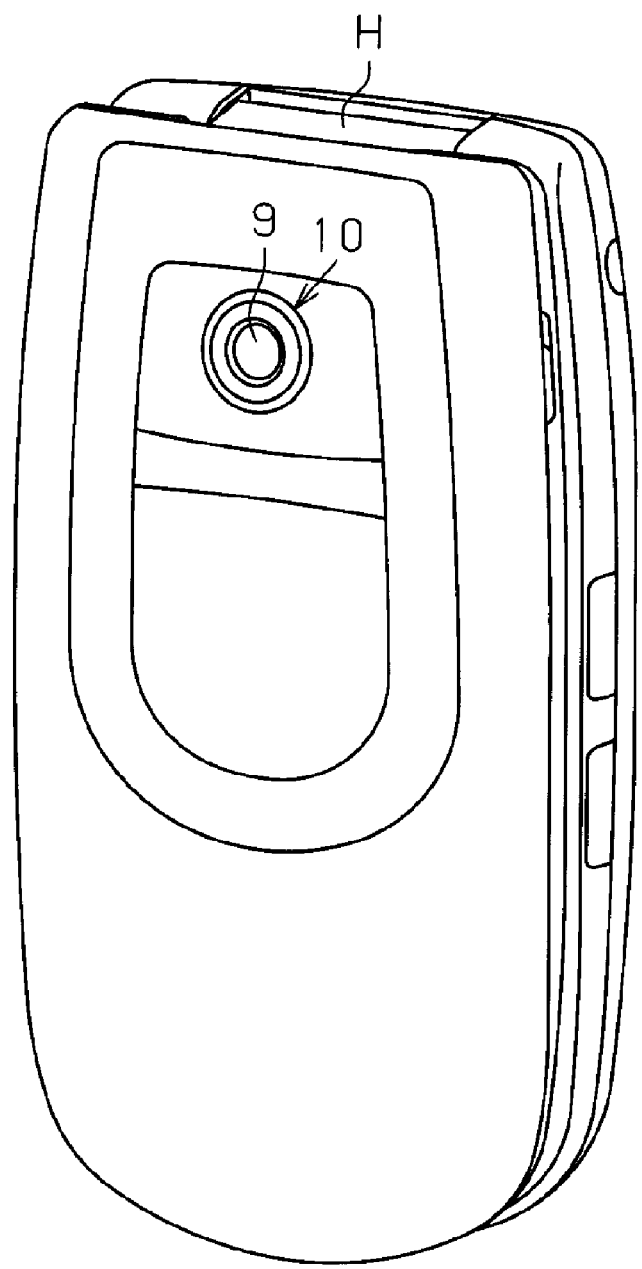
FIG. 1 is an external view showing the outer appearance of a portable terminal when not in use.

In the drawings, like numerals are used for like elements throughout.

Figure 2A:
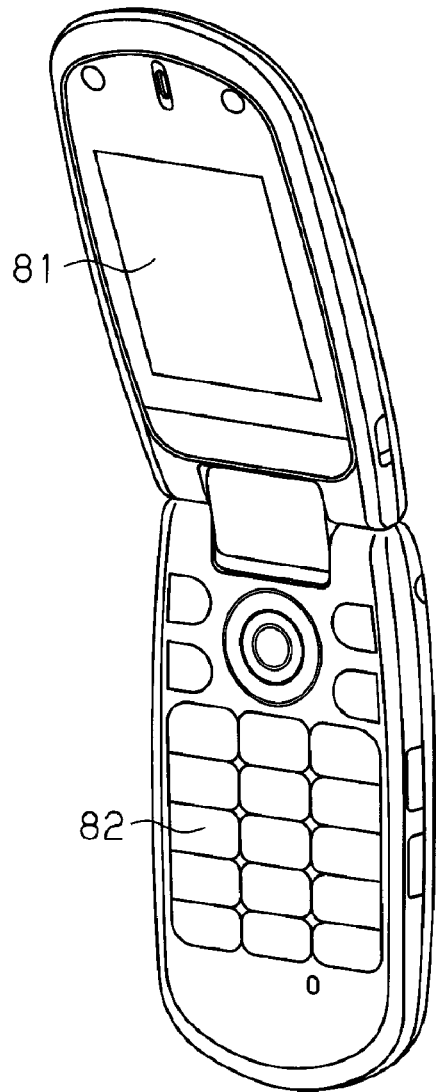
FIG. 2A is a front perspective view and FIG. 2B is a rear perspective view.
Figure 2B:
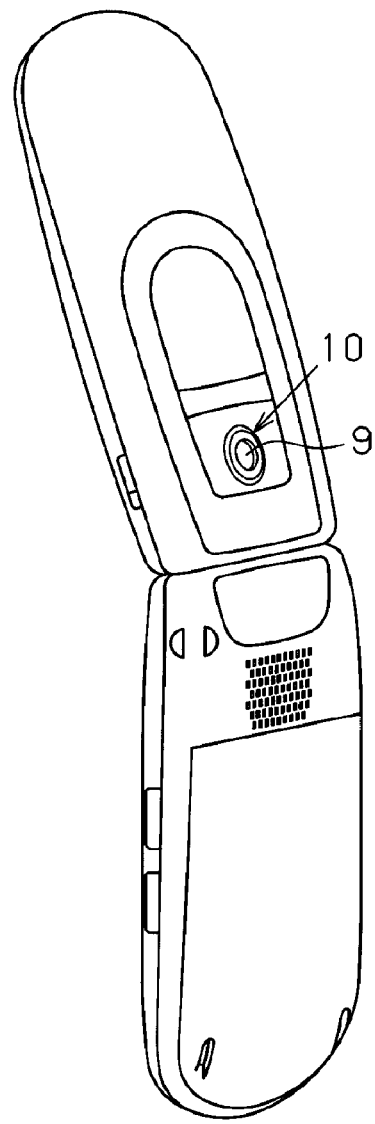

As shown in FIG. 1, a preferred embodiment of a mobile phone has a folding structure that folds about a hinge H. FIG. 1 shows the mobile phone in a folded, or closed state. A cover glass 9, which is part of a lens unit 10, is exposed from the front surface of the mobile phone. FIG. 2A shows the mobile phone in an open state. A display 81 and an operation panel 82 are arranged on the front surfaces of the mobile phone as viewed in FIG. 2A. FIG. 2B is a rear view of the mobile phone in an open state. In this state, to capture an image of an object, for example, a user opens the mobile phone and points the cover glass 9 toward the object and operates the operation panel 82 to release the shutter.

Figure 3:
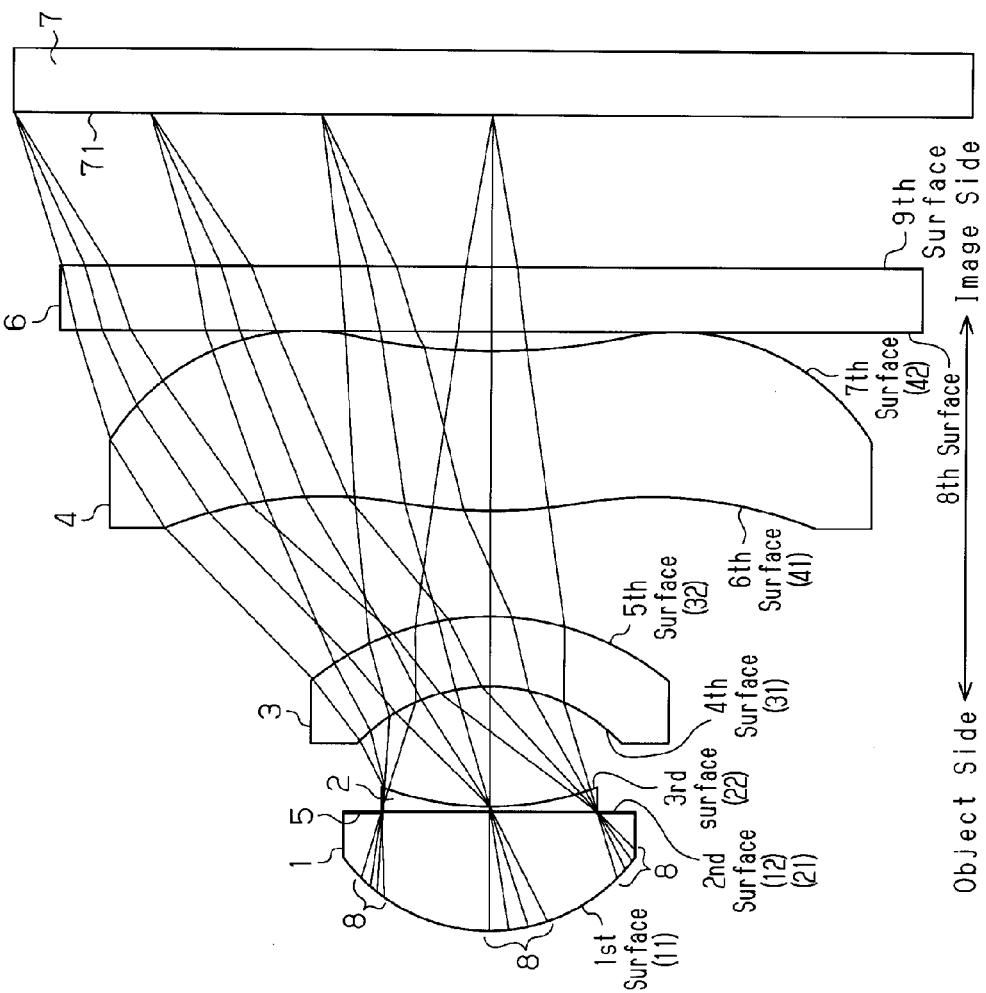
FIG. 3 is a schematic cross-sectional view of an image capturing device according to a preferred embodiment of the present invention taken along a plane which includes the optical axis of the image capturing device.

Referring to FIG. 3, the lens unit includes, in order of arrangement from the object side toward the image side, a first lens 1, an aperture stop 5, a second lens 2, a third lens 3, a fourth lens 4, and a cover glass 9. Members that particularly do not have to be described, such as the cover glass 9 and frame, are not shown in FIG. 3. FIG. 3 shows a CCD image sensor 7, which is not an element of the lens unit, to illustrate an imaging plane 71. FIG. 3 also shows incident light 8. Each of the first lens 1, third lens 3, and fourth lens 4 is a plastic lens. The second lens 2 is a plastic lens formed by injection molding an ultraviolet curing resin and irradiating the molded product with ultraviolet rays. This cures the molded product and produces the second lens 2. The aperture stop 5 is formed from a resin film in which carbon black is mixed. The structure shown in FIG. 3 will now be described in detail.

The first lens 1 has an object side surface 11 (first surface), which is curved outward at the object side, and a planar image side surface 12 (second surface). Thus, the first lens 1 is a lens having positive refractive power (hereinafter simply referred to as "positive lens"). Further, the second lens 2 has a planar object side surface 21 (second surface) and an image side surface 22 (third surface), which is curved inward at the image side. Thus, the second lens 2 is a lens having negative refractive power (hereinafter simply referred to as "negative lens"). The aperture stop 5 is held between the first lens 1 and second lens 2. The image side surface 12 of the first lens 1, which is in contact with the object side surface of the aperture stop 5, and the object side surface 21 of the second lens 2, which is in contact with the image side surface of the aperture stop 5, are both planar. This facilitates the positioning of the first lens 1, the aperture stop 5, and the second lens 2.

The first lens 1 and the second lens 2 are laminated together to form a group of laminated lenses. The manufacturing of the laminated lenses will now be discussed. Referring to FIGS. 4A and 4B, an annular, stretched polyester (PET) film in which carbon black is mixed thereinto is fixed onto the first lens 1. The film may be used as the aperture stop 5, which shields polyester from light with carbon black. Then, referring to FIG. 5, a mold 13 is filled with the necessary amount of a gel of ultraviolet curing resin 23. The opening of the mold 13 is closed by the image side surface 12 of the first lens 1 so that the gel of the ultraviolet curing resin 23 fills the cavity formed between the mold 13 and the first lens 1. Subsequently, the ultraviolet curing resin 23 is irradiated with ultraviolet rays 25. This cures the ultraviolet curing resin 23 and forms a resin layer 24. Then, the mold 13 is removed to obtain the second lens 2 shown in FIG. 3. By using the gel of ultraviolet curing resin 23, the first group of lenses, in which the aperture stop 5 is held between the first lens 1 and the second lens 2, is formed without any gaps. Thus, bubbles do not form between the first lens 1 and the second lens 2.

The third lens 3 is a negative lens including an object side surface 31, which is curved inward at the object side, and an image side surface 32, which is curved outward at the image side. Such a negative lens further reduces the aberration remaining in the rays of light that have passed through the first lens 1 and the second lens 2.

The fourth lens 4 is a positive lens including an object side surface 41, which is curved outward at the object side near the optical axis, and an image side surface 42, which is curved inward at the image side. Such a positive lens further reduces the aberration remaining in the rays of light that have passed through the first lens 1, second lens 2, and third lens 3 and allows for the entire length of the lens unit to be reduced.

Further, the fourth lens 4 is a positive lens having a peripheral portion in which the object side surface 41 is curved inward at the object side and the image side surface 42 is curved outward at the image side. This structure corrects the difference in image quality between the portion near the optical axis and the peripheral portion.

A colorless, transparent glass plate is normally used as the cover glass 6 to protect the CD image sensor 7, which is an image capturing element, from dust or the like. When necessary, a filter, such as an infrared cut filter, is used.

In the lens unit of the preferred embodiment, the first lens 1 condenses the incident light 8 entering the lens unit. The aperture stop 5 restricts the passage of the incident light 8 to an amount required for imaging. Then, the incident light 8 passes through the second lens 2, the third lens 3, and the fourth lens 4. This condenses the incident light 8 and corrects aberrations. The incident light 8 that has passed through the fourth lens 4 further passes through the cover glass 6 and is then imaged on the imaging plane 71 of the CCD image sensor 7. The CCD image sensor 7 performs an electrical conversion so as to record a photographic image when the shutter is released.

(1) In the preferred embodiment, the aperture stop 5 is held between the first lens 1 and the second lens 2 to form a middle stop type lens unit. This reduces the occurrence of defects caused by misalignments in comparison with front stop type lens units. Therefore, the lens unit is manufactured with high yield and low costs.

A middle stop type lens unit tends to have a higher CRA than a front stop type lens unit. Therefore, in a middle stop type lens, each lens must have a thickness that is greater than the lens of a front stop type lens unit in order to increase the refractive power of each lens and lower the CRA. However, the aperture stop 5 is located between the first lens 1 and the second lens 2. Thus, among the various arrangements of middle stop type lens units, the aperture stop is located closest to the object, and the increase in CRA is thus smaller than the other arrangements of middle stop type lens units. This allows for the increase in the thickness of the lenses to be smaller than the middle stop type lens units of other arrangements.

Furthermore, the first lens 1 and the second lens 2 are laminated together, with the aperture stop 5 held between the first lens 1 and the second lens 2. Thus, there is no need for a gap to be formed between the first lens 1 and the aperture stop 5 and between the aperture stop 5 and the second lens 2. This allows for the lens unit to be miniaturized.

(2) In the preferred embodiment, the laminated surface of the first lens 1 and the laminated surface of the second lens 2 are both planar. This facilitates the positioning and lamination of the first lens 1 and the second lens 2.

(3) In the preferred embodiment, the second lens 2 is formed from an ultraviolet curing resin so as to reduce bubbles that mix into the laminated surface. For example, when the first lens 1 and the second lens 2 are both either glass lenses or plastic lenses, which are injection molded, discrete and solid lenses would have to be laminated together. In such a case, fine gaps would easily form in the laminated surfaces and produce bubbles after the lamination of the lenses. This may result in a defective product and lower the manufacturing yield of the lens units. Further, since the aperture stop 5 is held between the first lens 1 and the second lens 2, in comparison with the laminated lenses of the prior art, this may further increase the formation of fine gaps in the laminated surfaces. However, in the preferred embodiment, the first lens 1 is a plastic lens and the second lens 2 is formed from an ultraviolet curing resin. This allows for the formation of a liquid-like ultraviolet curing resin layer in the shape of the second lens 2 on the laminated surface of the of the first lens with the use of a mold. The ultraviolet curing resin layer is irradiated with ultraviolet rays to form the second lens 2. Accordingly, the first lens 1 and the second lens 2 are laminated together without any gaps formed between the first lens 1 and the second lens 2.

(4) In the preferred embodiment, the first lens 1 is a positive lens having positive refractive power, and the second lens 2 is a negative lens having negative refractive power. Thus, the aberrations produced in the rays of light that have passed through the first lens 1 are corrected by the second lens 2. Accordingly, the lens unit corrects aberrations in a satisfactory manner.

(5) In the preferred embodiment, the third lens 3 is a negative lens. Thus, the aberrations remaining in the rays of light that have passed through the first lens 1 and the second lens 2 are corrected by the third lens 3. Accordingly, the lens unit corrects aberrations in a further satisfactory manner.

(6) In the preferred embodiment, the fourth lens 4 is a positive lens. Thus, the aberrations remaining in the rays of light that have passed through the first lens 1, the second lens 2, and the third lens 3 are corrected by the fourth lenses 4 in still a further satisfactory manner, while allowing reduction of the entire length of the lens unit.

(7) The lens unit of the preferred embodiment allows for a more compact size than the prior art while preventing the chief ray angle from increasing and the manufacturing costs from rising. Thus, the lens unit of the preferred embodiment is optimal for use in a mobile phone, which is an image capturing device.

EXAMPLE 1

Referring to FIG. 3, the lens unit of example 1 has a three-group, four-lens structure, which includes the laminated lenses of the first lens 1 and the second lens 2. This feature of this structure is in the aperture stop 5, which is held between the first lens 1 and the second lens 2. Numerical data for this lens unit is shown below.

Focal distance of entire system: 3.60 mm
F-number: 2.8
Entire lens length: 3.85 mm
Back focus: 1.03 mm
Chief ray angle (CRA): 25°

The lens data is shown in table 1. In table 1, a number i is allocated for each surface in order from the object side of the first lens 1, which serves as the first surface as shown in FIG. 3, toward the image side. Further, Ri represents the radius of curvature of each surface, Di represent the distance between the ith surface and the (i+1)th surface, nd represents the refractive index, and vd represents the Abbe number.

TABLE 1

| Surface No. | Ri | Di | nd | vd |
| --- | --- | --- | --- | --- |
| Object | ∞ | ∞ | | |
| 1* | 0.887 | 0.564 | 1.531 | 56.0 |
| 2 (Stop) | ∞ | 0.025 | 1.593 | 29.5 |
| 3* | 1.868 | 0.567 | | |
| 4* | −1.106 | 0.336 | 1.632 | 23.4 |
| 5* | −1.852 | 0.497 | | |
| 6* | 1.827 | 0.750 | 1.531 | 56.0 |
| 7* | 1.985 | 0.090 | | |
| 8 | ∞ | 0.300 | 1.523 | 58.6 |
| 9 | ∞ | 0.722 | | |
| Image | ∞ | — | | |

The equation shown below represents an aspherical shape.

$$z = \frac{(1/R)H^2}{1 + \sqrt{\{1 - (1+K)(H/R)^2\}}} + A4H^4 + A6H^6 + A8H^8 + A10H^{10} + A12H^{12} + A14H^{14} \quad (1)$$

In equation (1), the z axis represents the optical direction, R represents the radius of curvature, H represents the height in a direction perpendicular to the optical axis, and K represents the Korenich constant. Further, A4, A6, A8, A10, A12, and A14 respectively represent the aspherical surface coefficients for the fourth order, sixth order, eighth order, tenth order, twelfth order, and fourteenth order.

The aspherical surface coefficient of each surface is as shown below in Table 2.

TABLE 2

| Ri | K | A4 | A6 | A8 | A10 | A12 | A14 | A16 |
|---|---|---|---|---|---|---|---|---|
| 1st Surface | 4.225e−01 | −1.977e−2 | −2.360e−1 | 1.409e+0 | −5.627e+0 | 1.078e+1 | −8.829e+0 | |
| 3rd surface | 5.548e+00 | 1.011e−1 | −4.194e−1 | 5.298e+0 | −1.513e+1 | 5.889e+0 | 7.324e+1 | |
| 4th Surface | 6.534e−01 | −6.831e−1 | 3.112e+0 | −2.000e+1 | 6.645e+1 | −1.108e+2 | 6.491e+1 | |
| 5th Surface | −4.307e+00 | −7.299e−1 | 1.766e+0 | −4.486e+0 | 7.194e+0 | −5.463e+0 | 1.668e+0 | |
| 6th Surface | 3.626e−02 | −4.702e−1 | 4.094e−1 | −3.426e−1 | 2.115e−1 | −8.199e−2 | 1.742e−2 | −1.554e−3 |
| 7th Surface | 9.296e−02 | −2.902e−1 | 1.464e−1 | −7.089e−2 | 1.864e−2 | −2.118e−3 | −4.551e−5 | 1.118e−5 |

COMPARATIVE EXAMPLE 1

Figure 15:
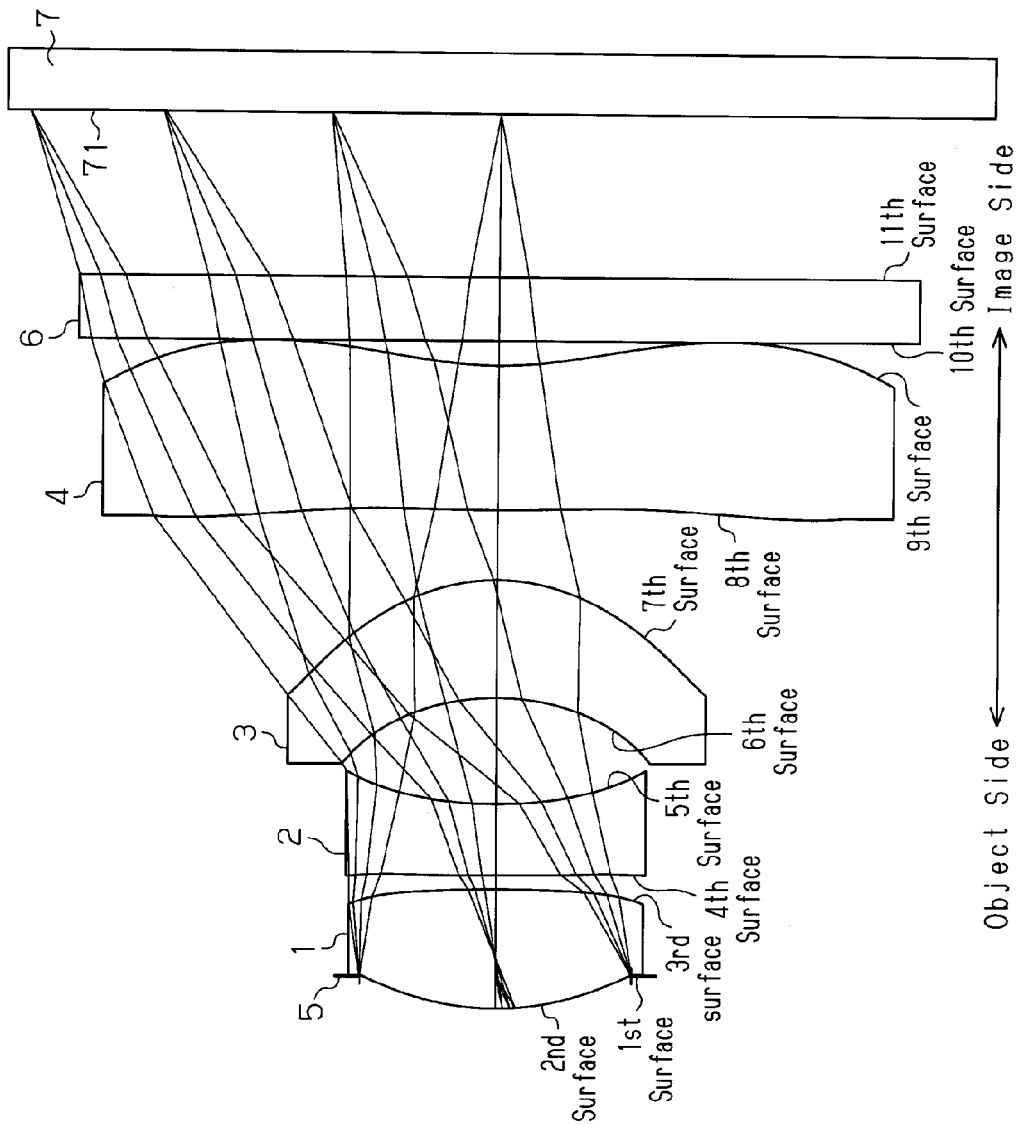
FIG. 15 is a schematic cross-sectional view showing an image capturing device of comparative example 1 taken along a plane including the optical axis.
Figure 21:
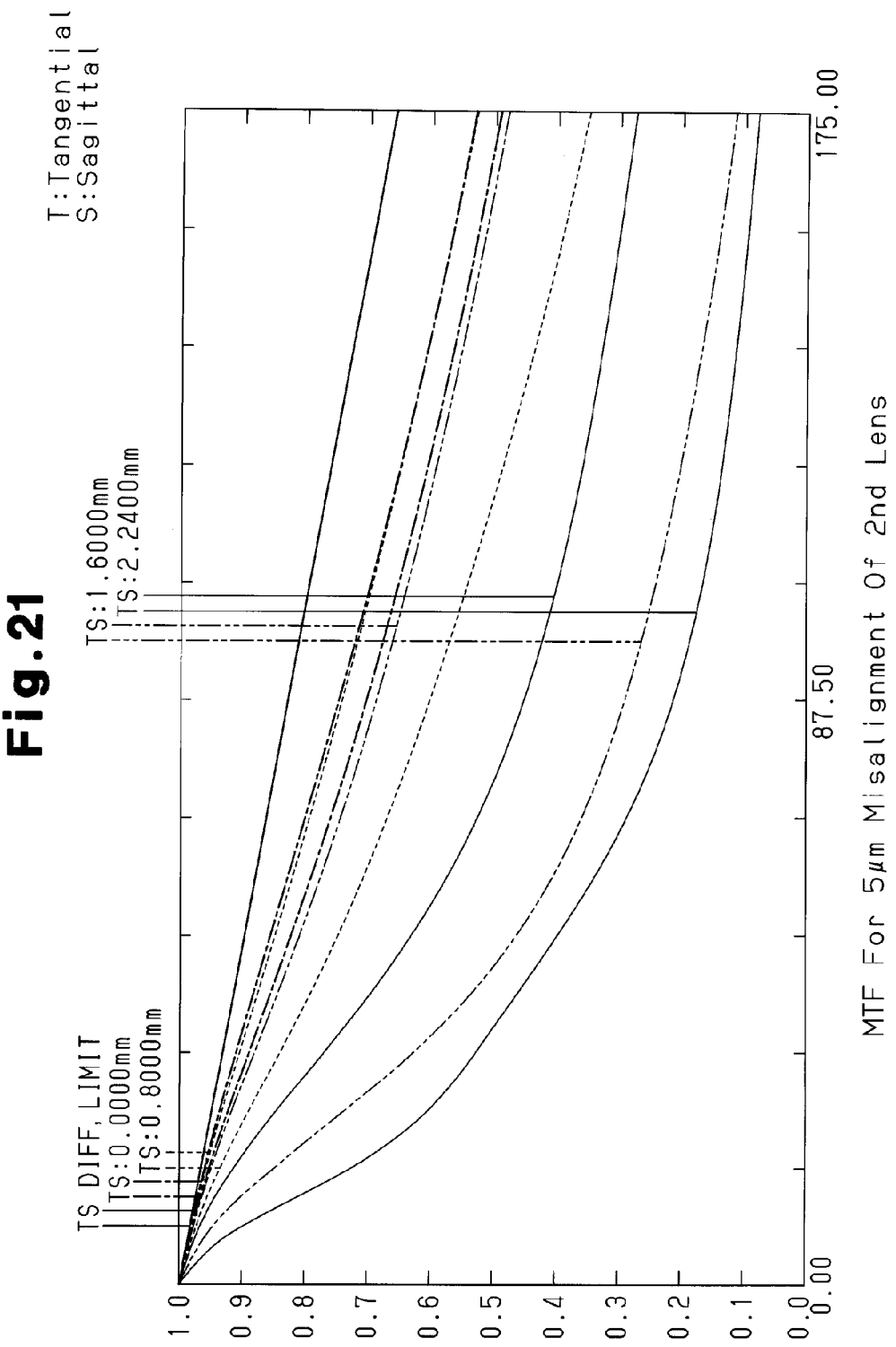
FIG. 21 is a graph showing the transfer function (MTF), which indicates one of the characteristics of the lens unit in comparative example 1, when a second lens is upwardly misaligned by 5 μm.
Figure 22:
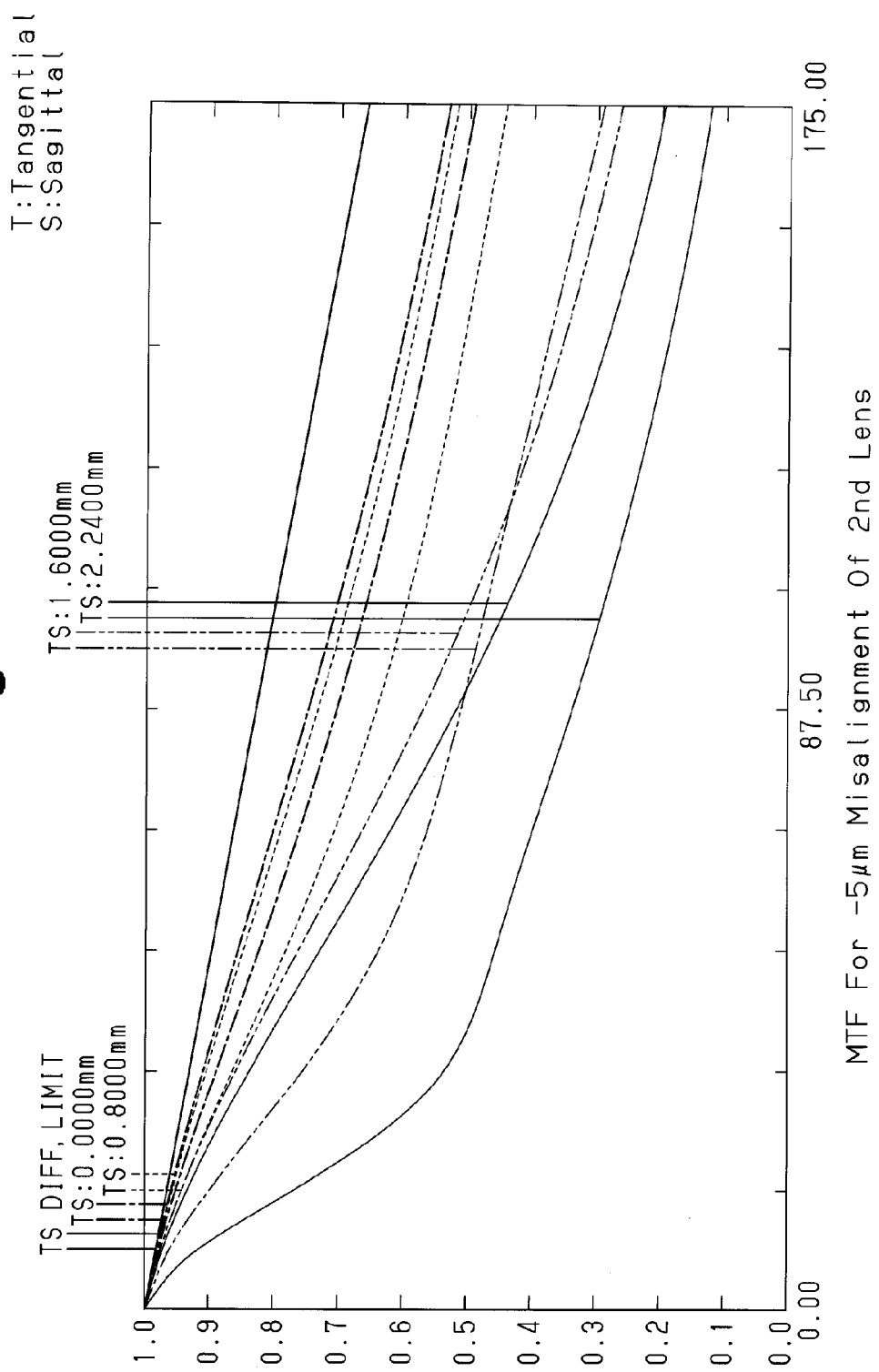
FIG. 22 is a graph showing the transfer function (MTF), which indicates one of the characteristics of the lens unit in comparative example 1, when the second lens is downwardly misaligned by 5 μm.
Figure 23:
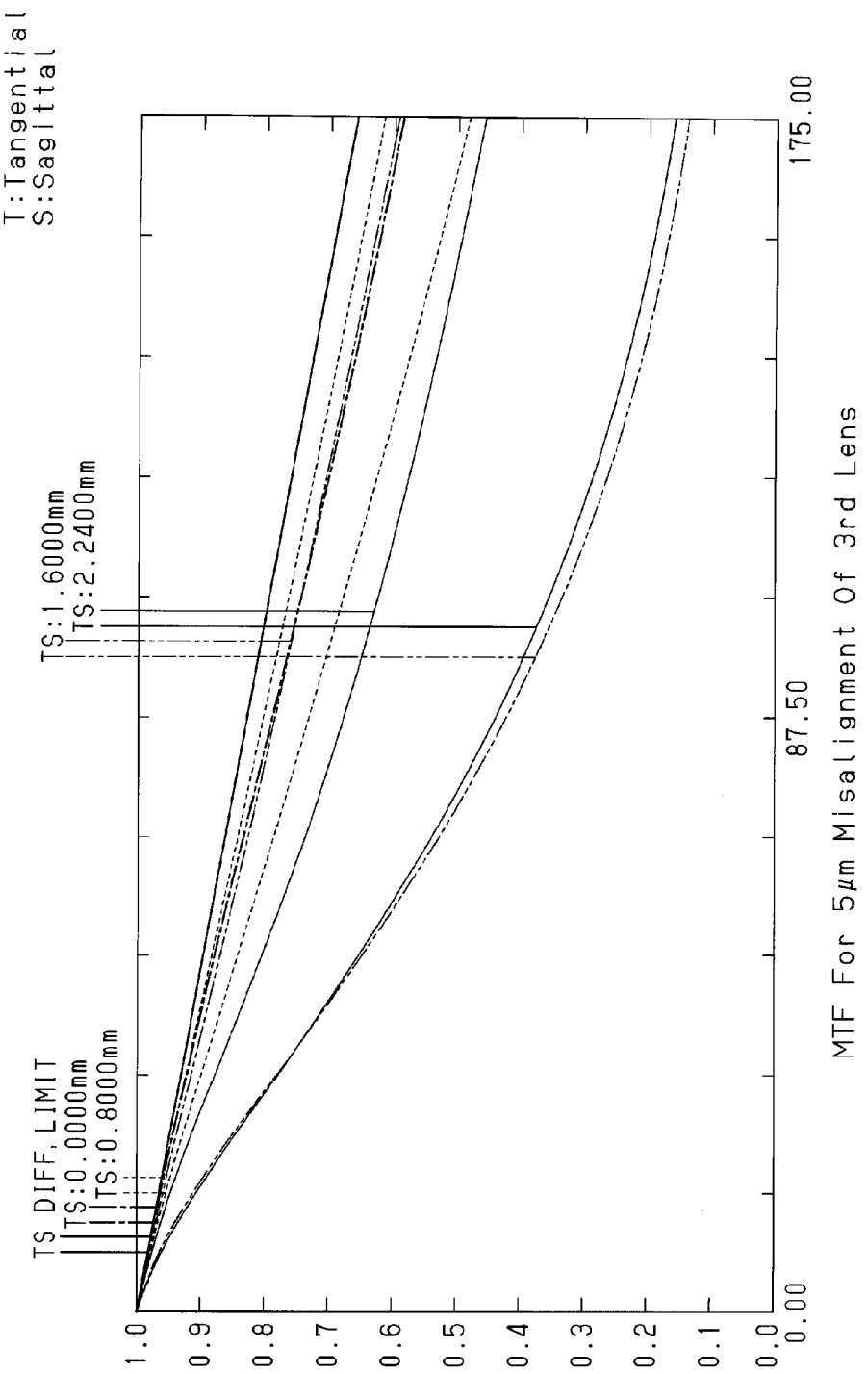
FIG. 23 is a graph showing the transfer function (MTF), which indicates one of the characteristics of the lens unit in comparative example 1, when a third lens is upwardly misaligned by 5 μm.
Figure 24:
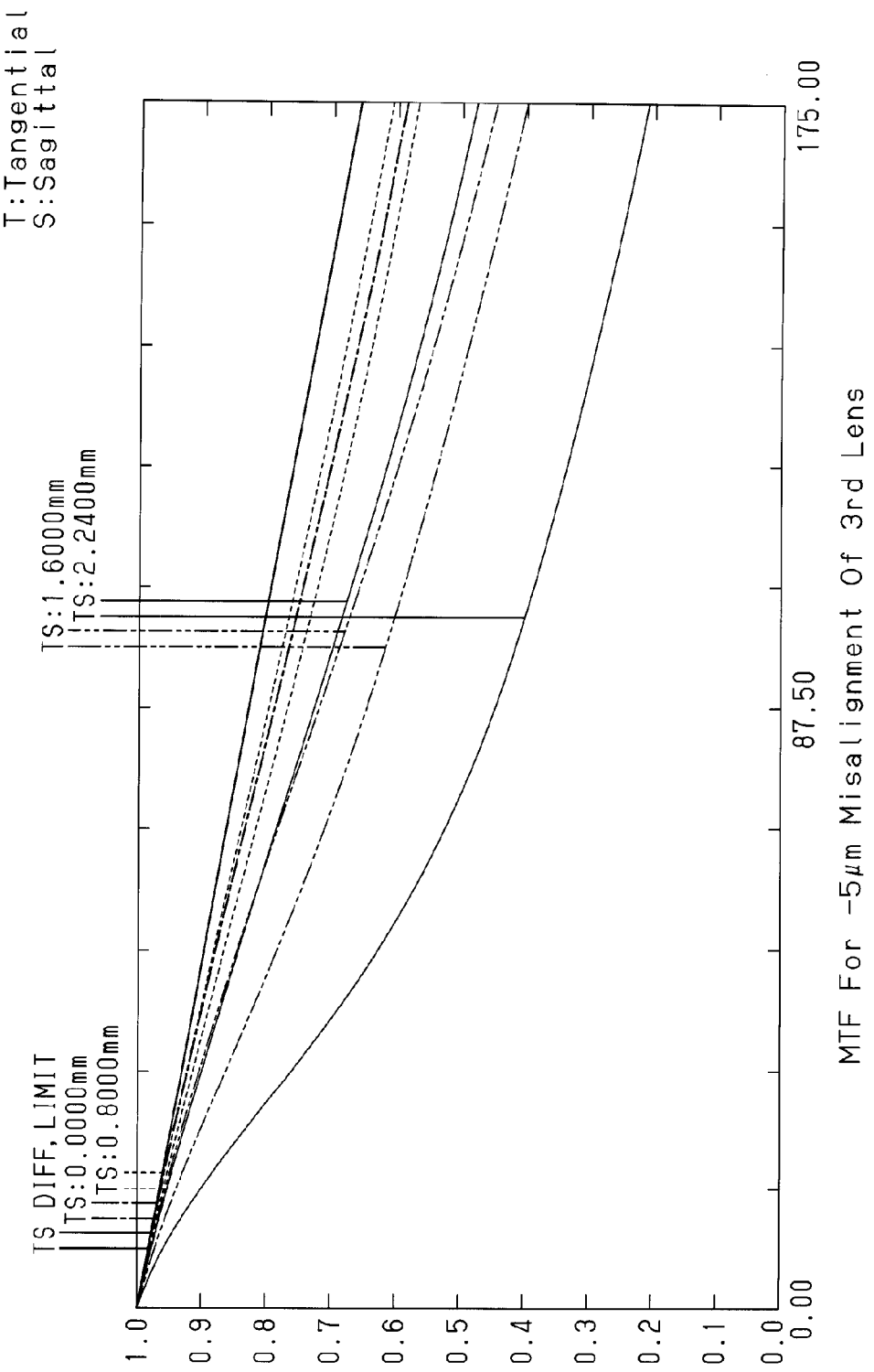
FIG. 24 is a graph showing the transfer function (MTF), which indicates one of the characteristics of the lens unit in comparative example 1, when the third lens is downwardly misaligned by 5 μm.
Figure 25:
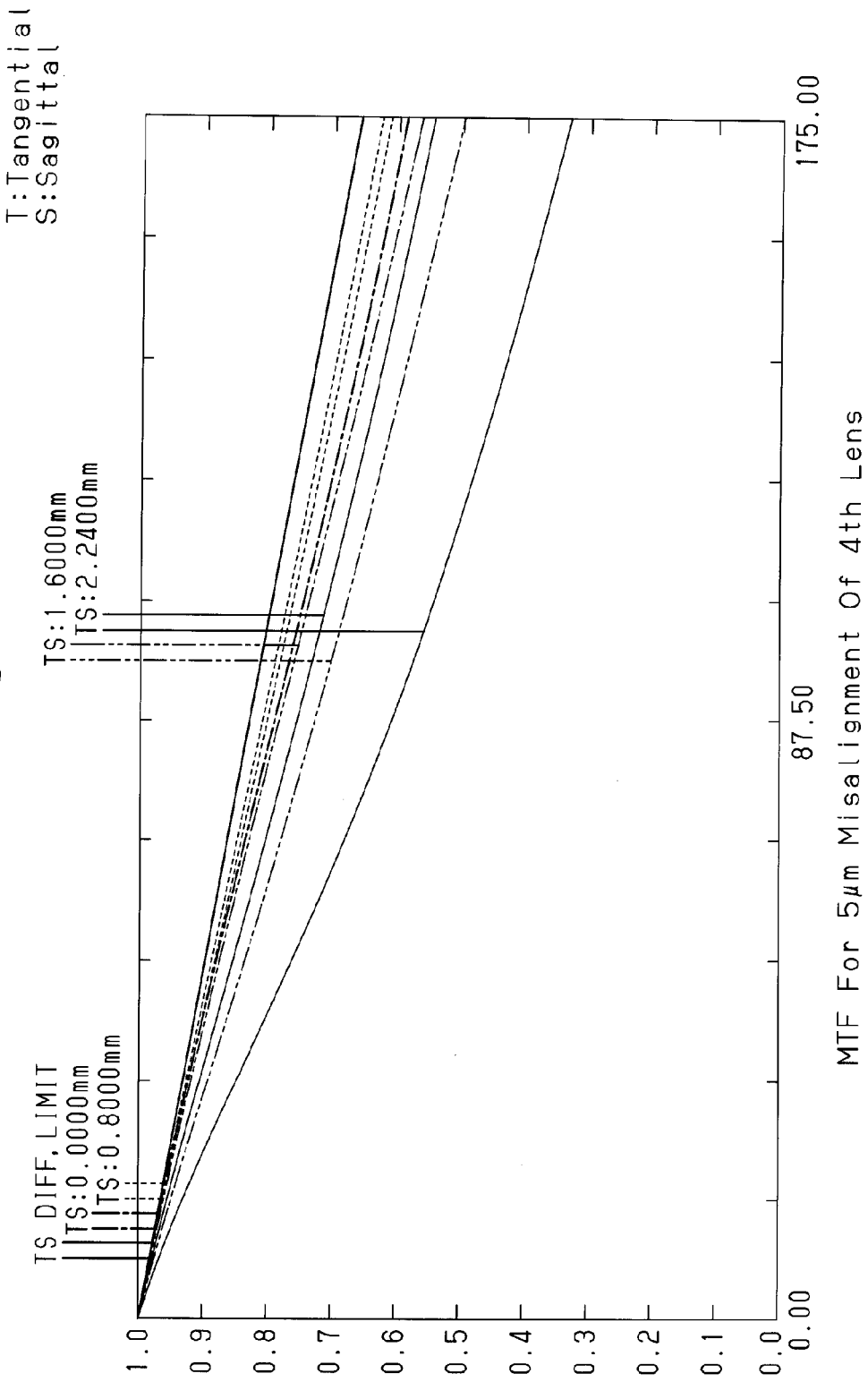
FIG. 25 is a graph showing the transfer function (MTF), which indicates one of the characteristics of the lens unit in comparative example 1, when a fourth lens is upwardly misaligned by 5 μm.
Figure 26:
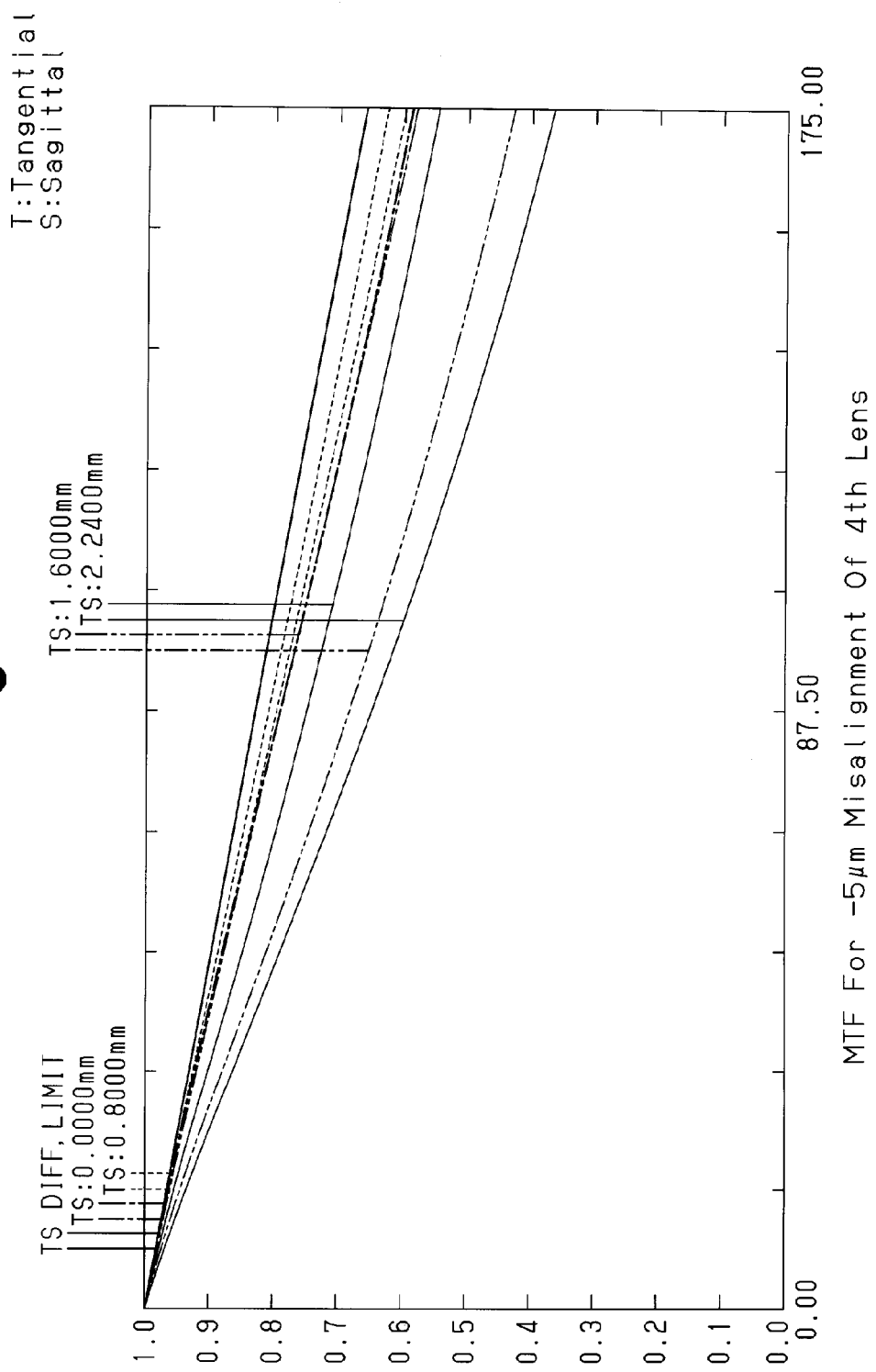
FIG. 26 is a graph showing the transfer function (MTF), which indicates one of the characteristics of the lens unit in comparative example 1, when the fourth lens is downwardly misaligned by 5 μm.

Referring to FIG. 15, the lens unit of comparative example 1 has a four-group, four-lens structure, in which the aperture stop 5 is located further outward from the first lens 1. Numerical data for this lens unit is shown below.

Focal distance of entire system: 3.60 mm
F-number: 2.8
Entire lens length: 4.26 mm
Back focus: 1.07 mm Chief ray angle (CRA): 25°

The lens data is shown in table 3. In table 3, a number i is allocated for each surface in order from the aperture stop 5, which serves as the first surface as shown in FIG. 15, toward the image side. Further, the parameters of Ri, Di, nd, and vd are the same as those of table 1.

TABLE 3

| Surface No. | Ri | Di | nd | vd |
|---|---|---|---|---|
| Object | ∞ | ∞ | | |
| 1 (Stop) | ∞ | −0.155 | | |
| 2* | 1.307 | 0.568 | 1.531 | 56.0 |
| 3* | −5.874 | 0.066 | | |
| 4* | 1511.369 | 0.340 | 1.632 | 23.4 |
| 5* | 2.170 | 0.504 | | |
| 6* | −1.157 | 0.564 | 1.531 | 56.0 |
| 7* | −0.951 | 0.338 | | |
| 8* | 8.374 | 0.690 | 1.531 | 56.0 |
| 9* | 1.937 | 0.115 | | |

TABLE 3-continued

| Surface No. | Ri | Di | nd | vd |
|---|---|---|---|---|
| 10 | | 0.300 | 1.523 | 58.6 |
| 11 | | 0.774 | | |
| Image | ∞ | — | | |

The aspherical surface coefficient for each surface is derived using equation (1) as shown in table 4.

TABLE 4

| Ri | K | A4 | A6 | A8 | A10 | A12 | A14 | A16 |
|---|---|---|---|---|---|---|---|---|
| 2nd Surface | −1.275e−01 | −2.580e−2 | 1.435e−1 | −7.776e−1 | 1.113e+0 | −4.309e−1 | −1.108e+0 | |
| 3rd surface | −1.336e+02 | 1.078e−1 | −8.363e−1 | 8.951e−1 | −7.742e−1 | 1.654e−1 | 9.512e−3 | |
| 4th Surface | 4.645e+06 | 2.644e−1 | −9.155e−1 | 7.399e−1 | 1.663e−3 | −1.798e−1 | 3.128e−1 | |
| 5th Surface | 3.594e+00 | 1.620e−1 | −4.019e−1 | 9.536e−1 | −2.168e+0 | 3.407e+0 | −2.329e+0 | 9.907e−1 |
| 6th Surface | 4.987e−02 | −1.132e−1 | 2.772e−1 | −1.703e+0 | 3.086e+0 | −2.532e+0 | 1.676e+0 | −2.965e+0 |
| 7th Surface | −4.435e−01 | −1.053e−2 | 2.449e−1 | −6.302e−1 | 8.056e−1 | −3.277e−1 | −1.033e−1 | 1.102e−1 |
| 8th Surface | −5.855e+01 | −1.273e−1 | 8.403e−2 | −2.236e−2 | 1.776e−3 | −1.702e−4 | 2.125e−4 | −3.520e−5 |
| 9th Surface | −1.010e−01 | −2.283e−1 | 8.981e−2 | −2.714e−2 | 3.861e−3 | −9.929e−5 | −3.049e−5 | −4.450e−7 |

COMPARATIVE EXAMPLE 2

Figure 27:
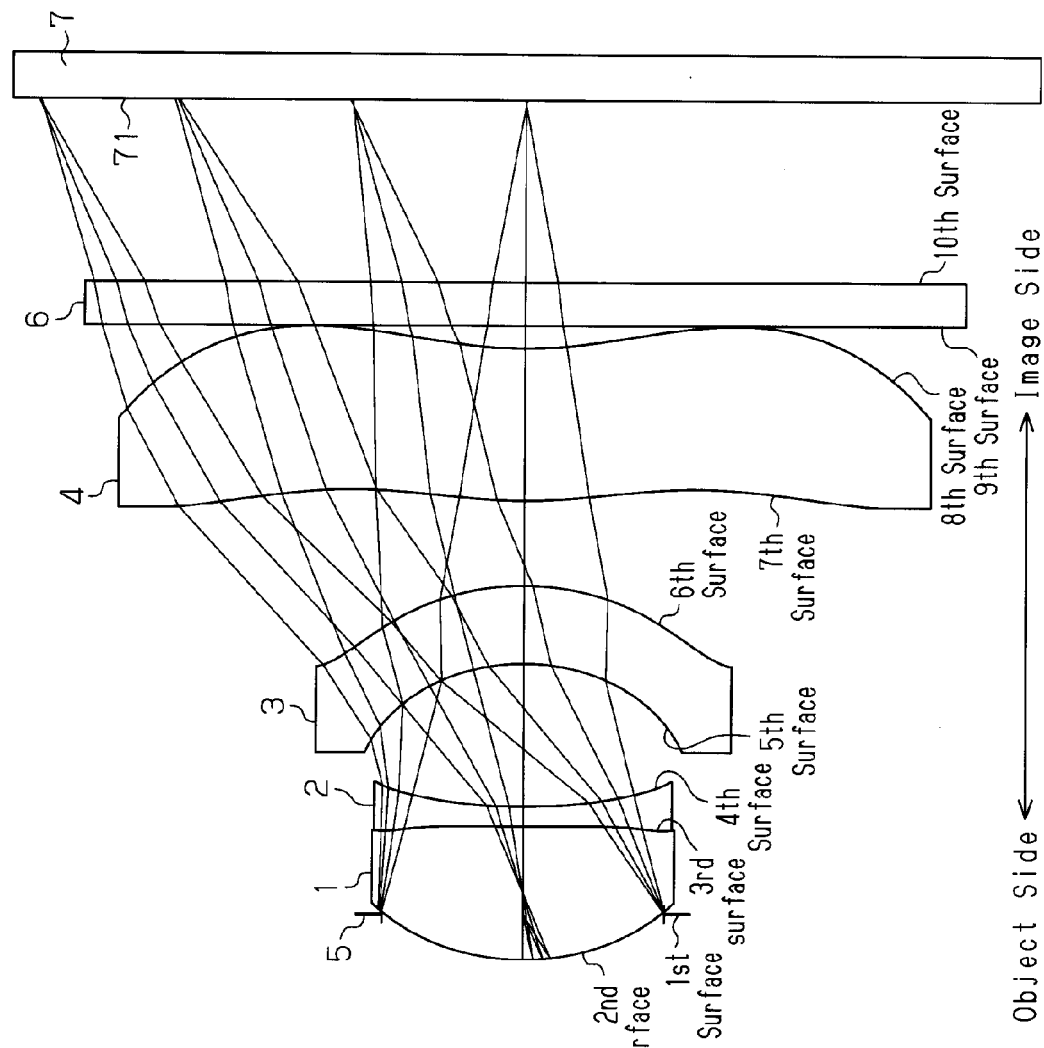
FIG. 27 is a schematic cross-sectional view showing an image capturing device of comparative example 2 taken along a plane including the optical axis.
Figure 28:
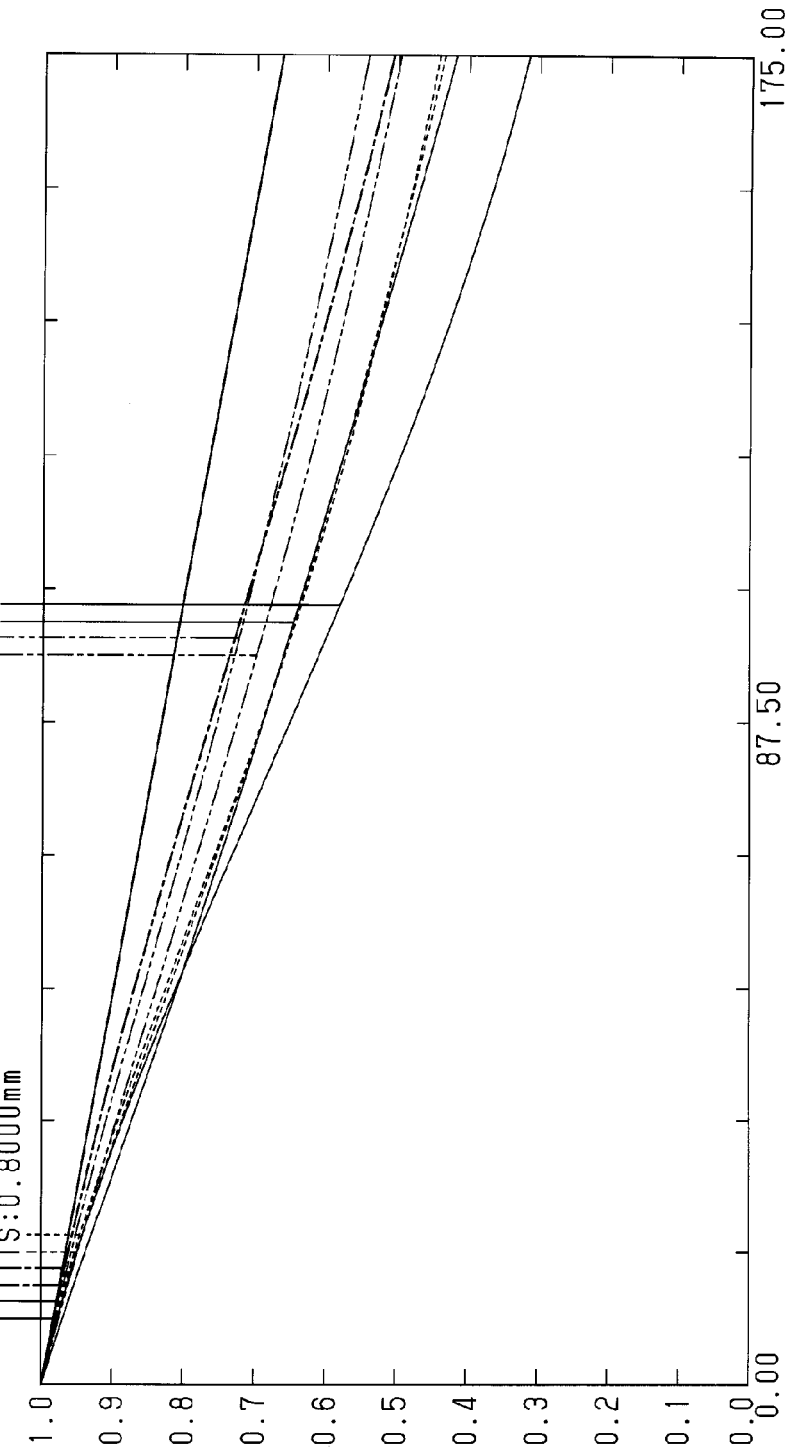
FIG. 28 is a graph showing the transfer function (MTF), which indicates one of the characteristics of the lens unit in comparative example 2.
Figure 30:
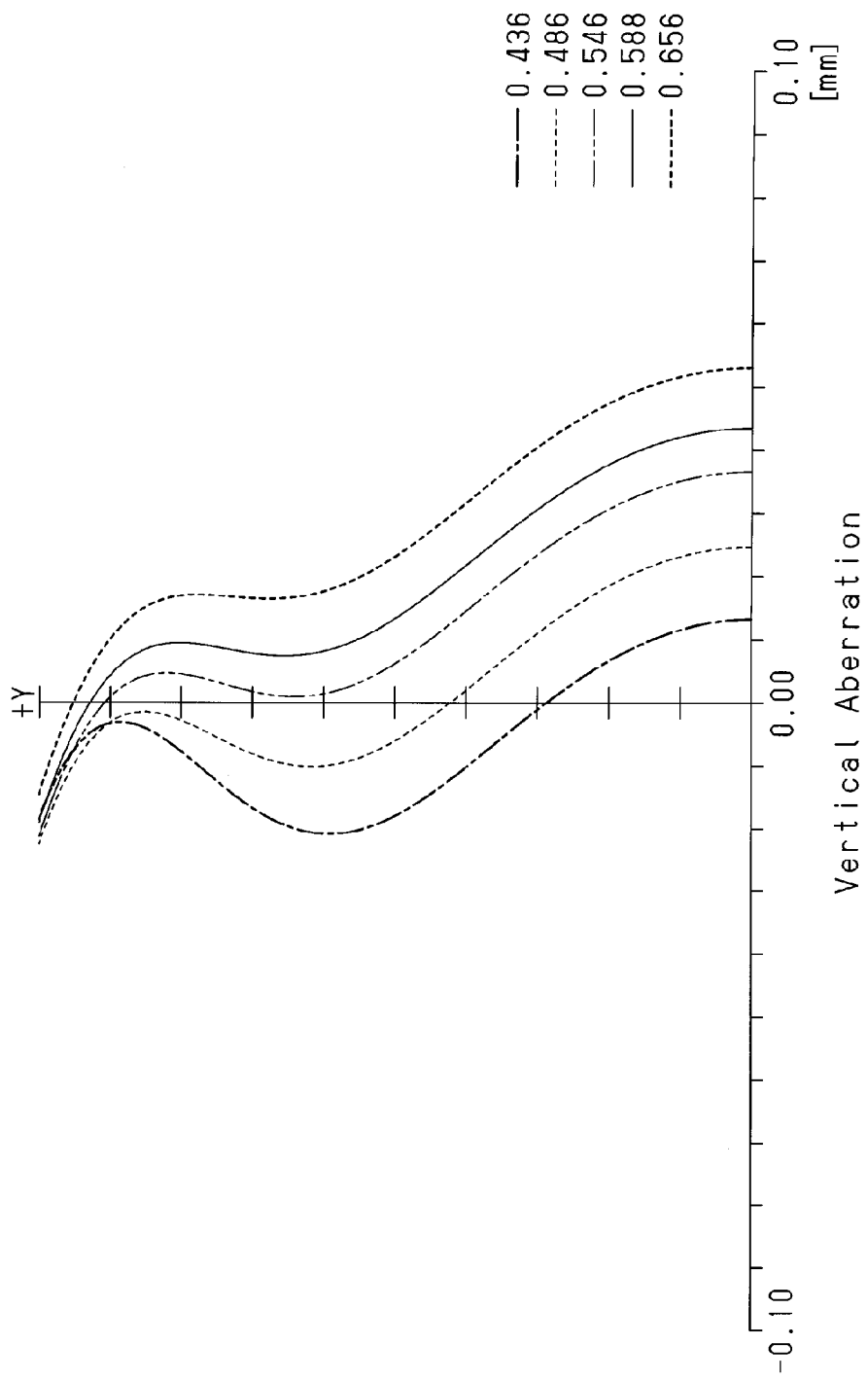
FIG. 30 is a graph showing a vertical aberration, which indicates one of the characteristics of the lens unit in comparative example 2.
Figure 31:
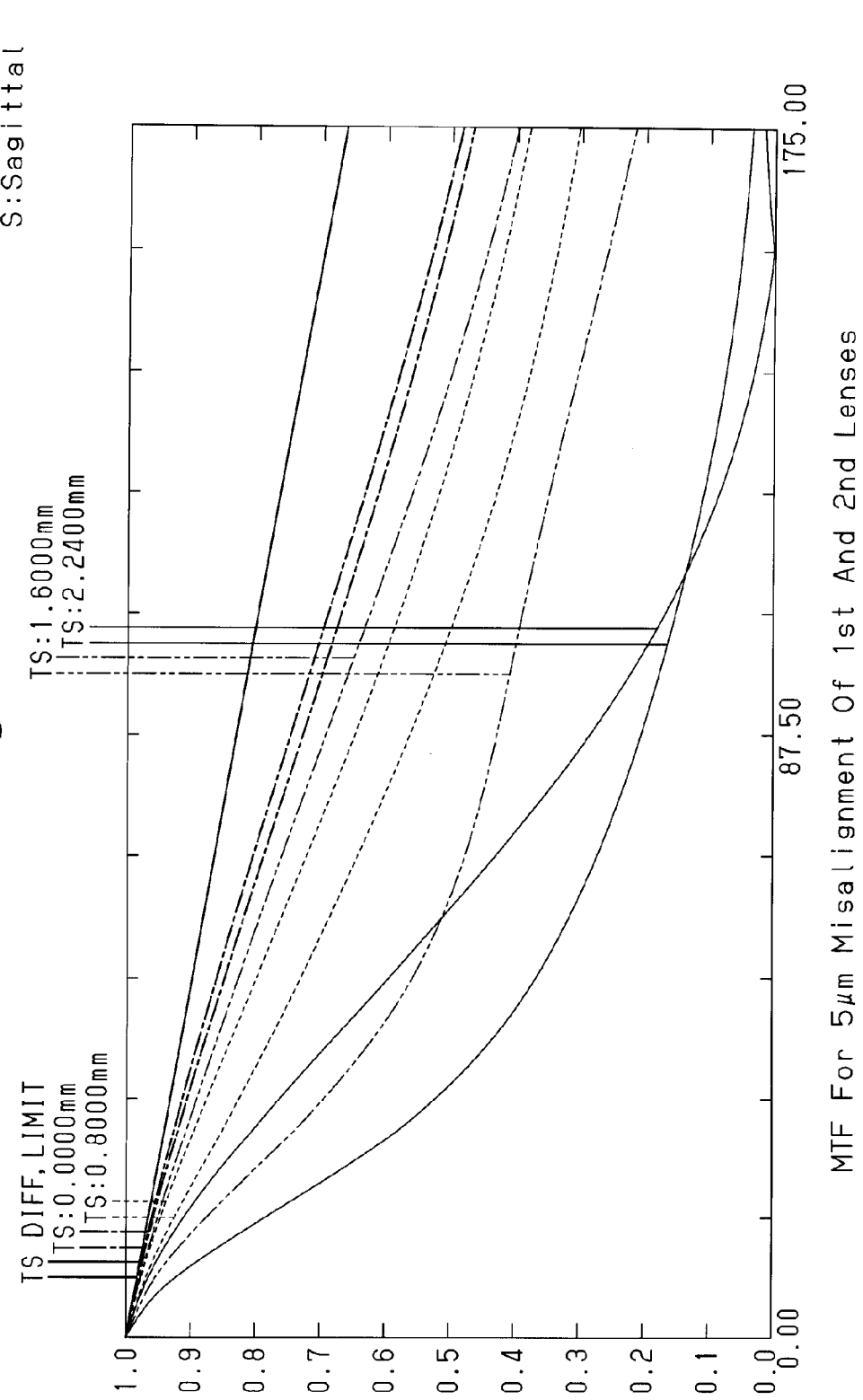
FIG. 31 is a graph showing the transfer function (MTF), which indicates one of the characteristics of the lens unit in comparative example 2, when a first lens is upwardly misaligned by 5 μm.
Figure 32:
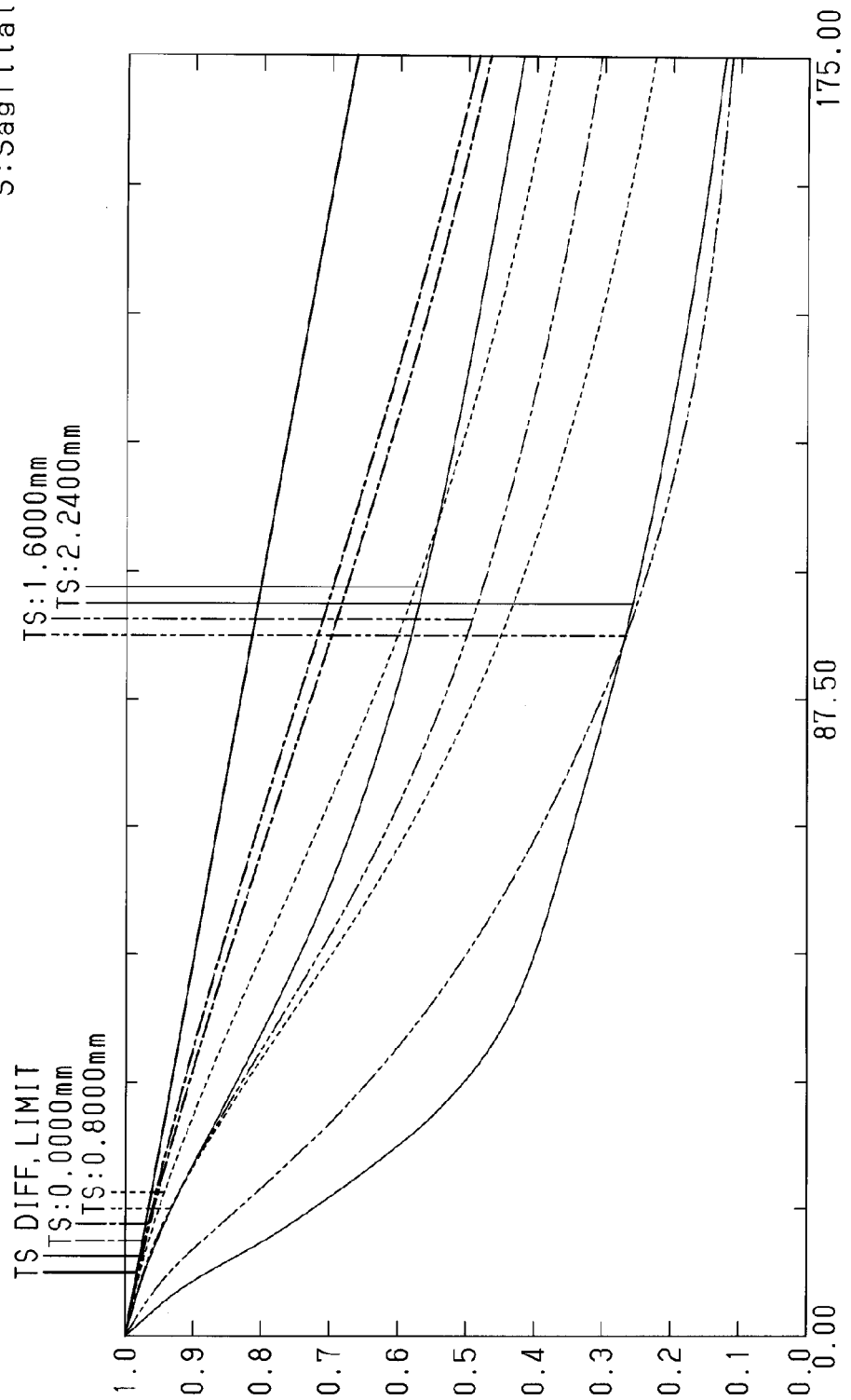
FIG. 32 is a graph showing the transfer function (MTF), which indicates one of the characteristics of the lens unit in comparative example 2, when the first lens is downwardly misaligned by 5 μm.
Figure 33:
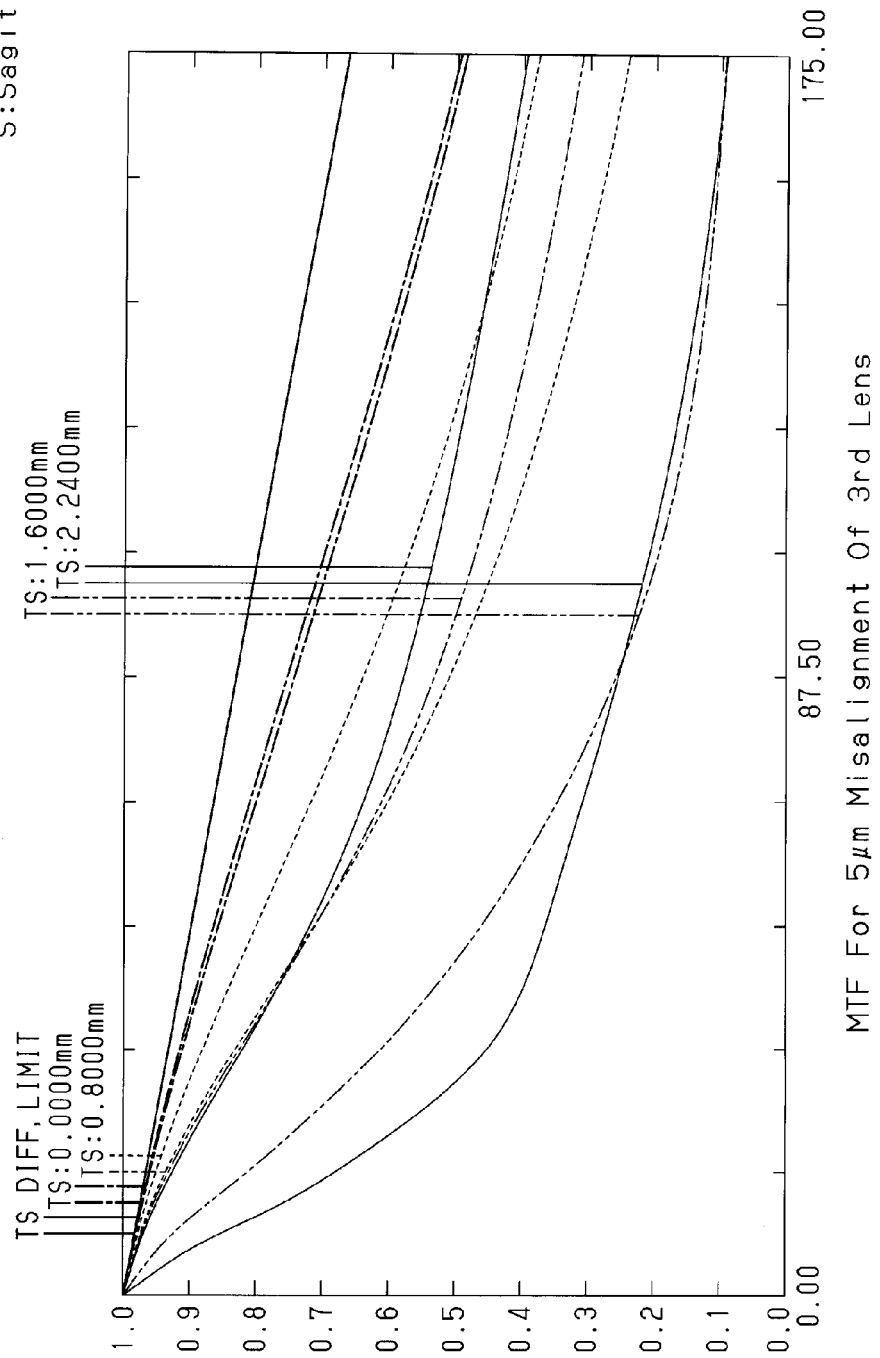
FIG. 33 is a graph showing the transfer function (MTF), which indicates one of the characteristics of the lens unit in comparative example 2, when a third lens is upwardly misaligned by 5 μm.
Figure 34:
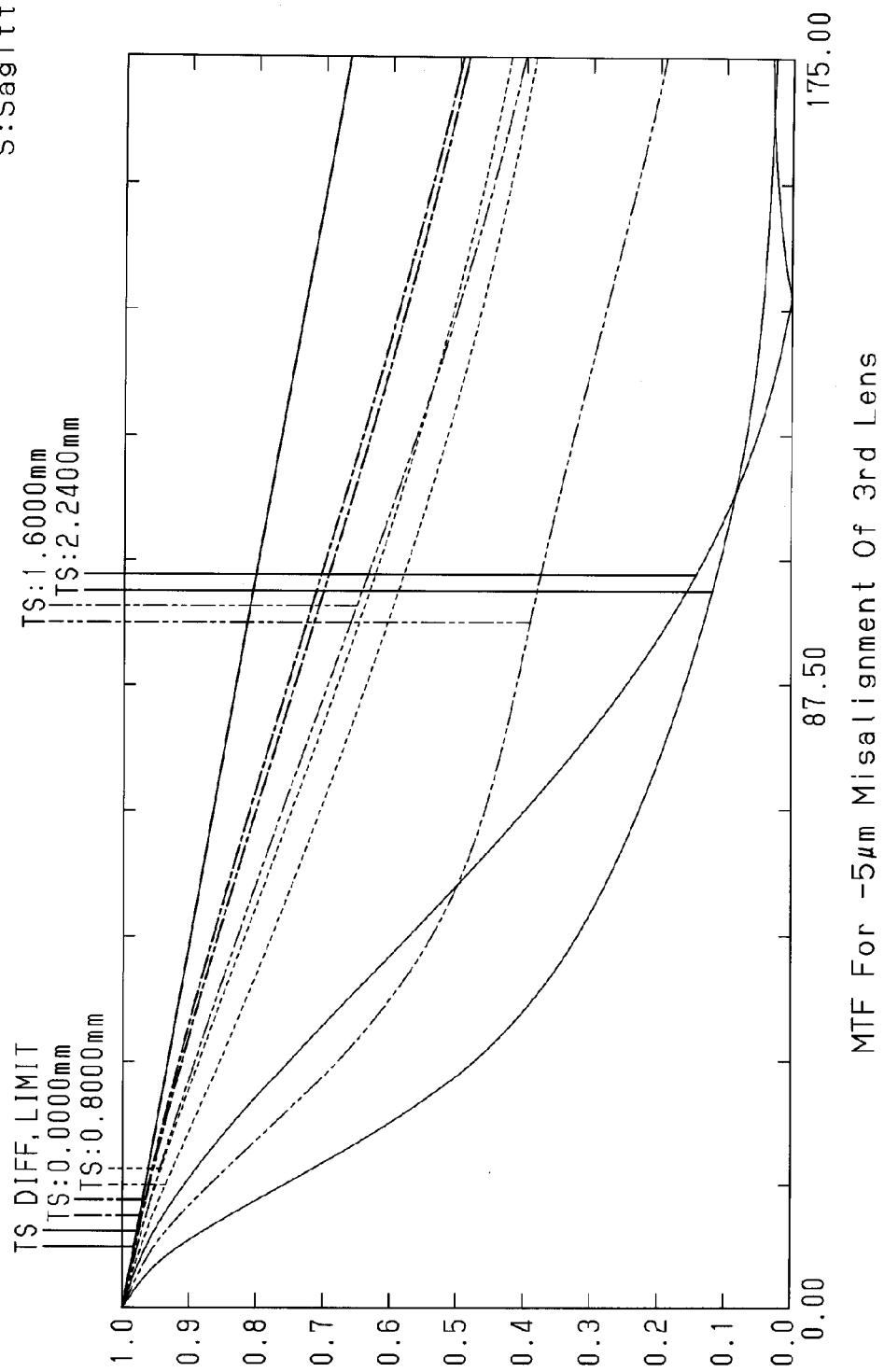
FIG. 34 is a graph showing the transfer function (MTF), which indicates one of the characteristics of the lens unit in comparative example 2, when the third lens is downwardly misaligned by 5 μm.
Figure 35:
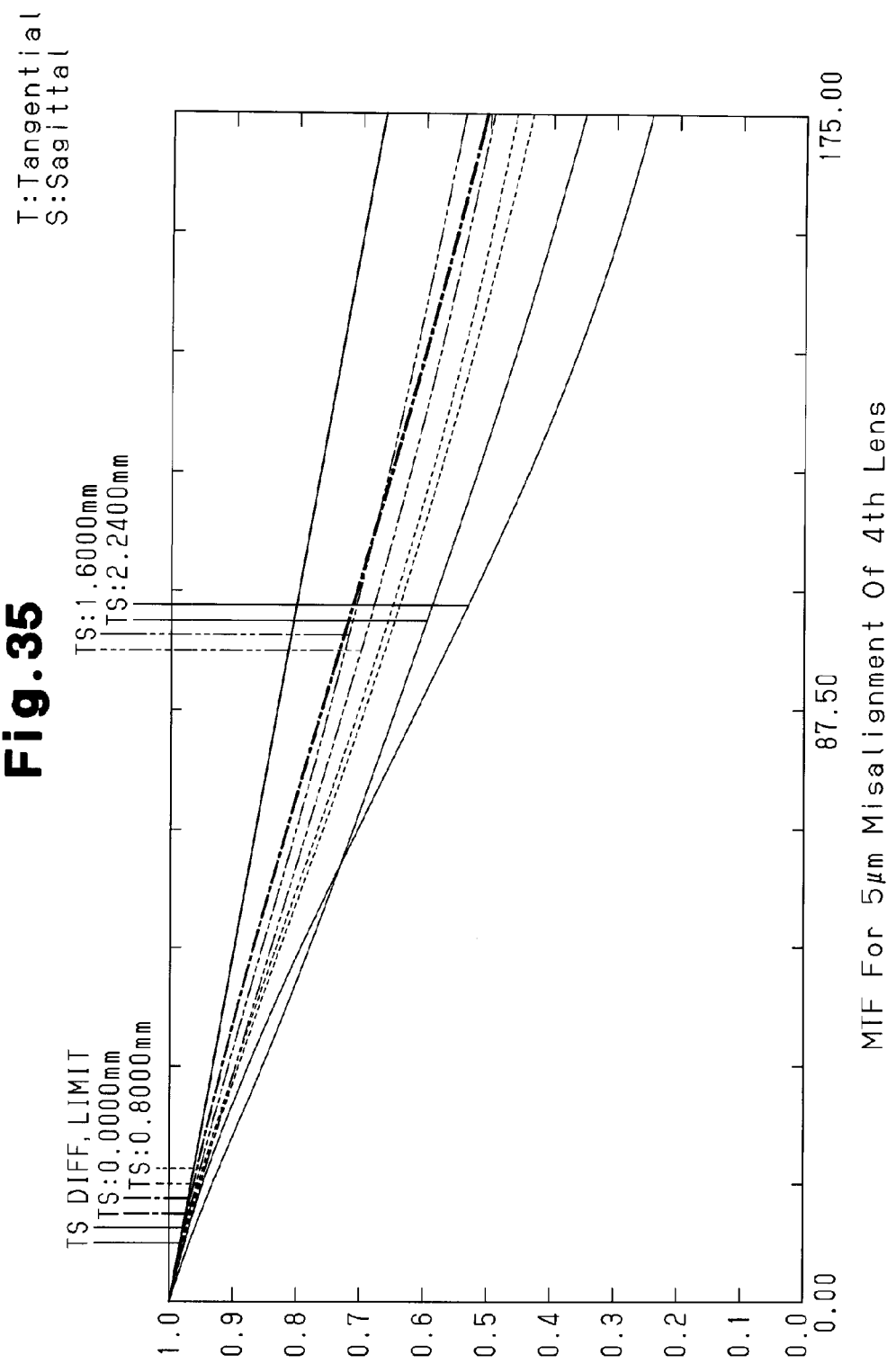
FIG. 35 is a graph showing the transfer function (MTF), which indicates one of the characteristics of the lens unit in comparative example 2, when a fourth lens is upwardly misaligned by 5 μm.
Figure 36:
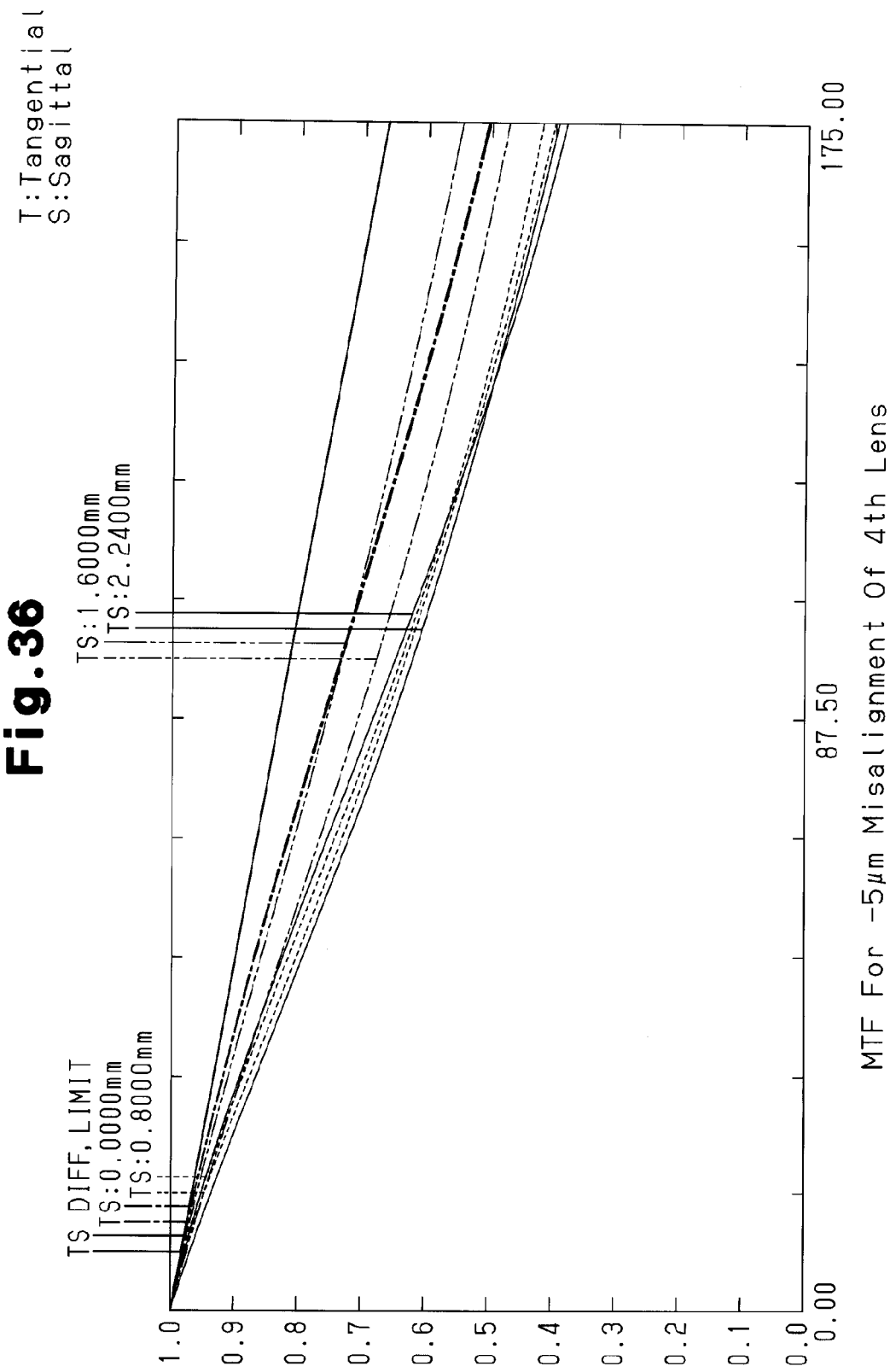
FIG. 36 is a graph showing the transfer function (MTF), which indicates one of the characteristics of the lens unit in comparative example 2, when the fourth lens is downwardly misaligned by 5 μm.

Referring to FIG. 27, the lens unit of comparative example 2 has a three-group, four-lens structure, which includes the laminated lenses of the first lens 1 and the second lens 2. Additionally, the aperture stop 5 is located further outward from the first lens 1. Thus, in comparative example 2, laminated lenses are used in the front stop type lens unit of comparative example 1 to reduce the entire lens length. Numerical data for this lens unit is shown below.

Focal distance of entire system: 3.60 mm
F-number: 2.8
Entire lens length: 3.96 mm
Back focus: 1.03 mm
Chief ray angle (CRA): 25°

The lens data is shown in table 5. In table 5, a number i is allocated for each surface in order from the aperture stop 5, which serves as the first surface as shown in FIG. 27, toward the image side. Further, the parameters of Ri, Di, nd, and vd are the same as those of table 1.

TABLE 5

| Surface No. | Ri | Di | nd | vd |
|---|---|---|---|---|
| Object | ∞ | ∞ | | |
| 1 (Stop) | ∞ | −0.210 | | |
| 2* | 1.080 | 0.617 | 1.531 | 56.0 |
| 3* | −280.883 | 0.090 | 1.593 | 29.5 |
| 4* | 2.658 | 0.654 | | |
| 5* | −0.997 | 0.360 | 1.614 | 25.6 |
| 6* | −1.219 | 0.393 | | |
| 7* | 2.506 | 0.703 | 1.531 | 56.0 |
| 8* | 1.955 | 0.105 | | |
| 9 | | 0.200 | 1.523 | 58.6 |
| 10 | | 0.833 | | |
| Image | ∞ | — | | |

The aspherical surface coefficient for each surface is derived using equation (1) as shown in table 6.

TABLE 6

| Ri | K | A4 | A6 | A8 | A10 | A12 | A14 | A16 |
|---|---|---|---|---|---|---|---|---|
| 2nd Surface | 0 | 2.529e−2 | −2.803e−2 | 1.456e−1 | −2.501e−2 | | | |
| 3rd surface | 0 | 2.473e−1 | −2.111e+0 | 2.582e+0 | 1.032e+0 | | | |
| 4th Surface | 0 | 1.082e−1 | −4.831e−1 | 2.799e+0 | −7.937e+0 | 9.567e+0 | | |
| 5th Surface | 0 | −7.138e−2 | −6.658e−2 | −2.836e+0 | 9.864e+0 | −1.110e+1 | | |
| 6th Surface | 0 | −8.956e−2 | 2.510e−1 | −1.107e+0 | 2.616e+0 | −2.331e+0 | 8.170e−1 | |
| 7th Surface | 0 | −2.623e−1 | 1.290e−1 | −5.084e−2 | 2.773e−2 | −1.312e−2 | 3.226e−3 | −2.976e−4 |
| 8th Surface | 0 | −2.358e−1 | 9.378e−2 | −3.955e−2 | 9.594e−3 | −1.029e−3 | −9.803e−6 | |

COMPARATIVE EXAMPLE 3

Figure 37:
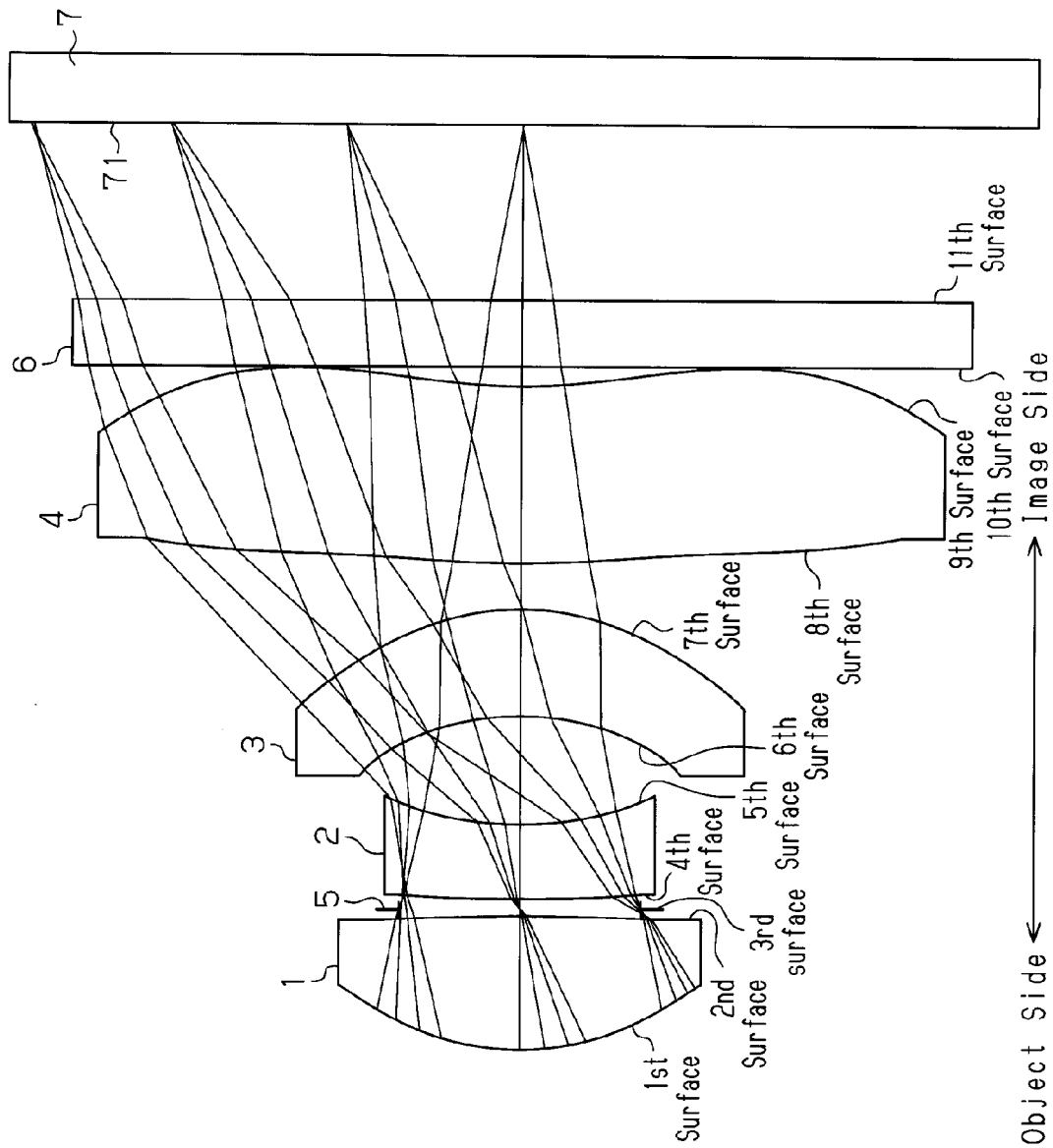
FIG. 37 is a schematic cross-sectional view showing an image capturing device of comparative example 3 taken along a plane including the optical axis.
Figure 46:
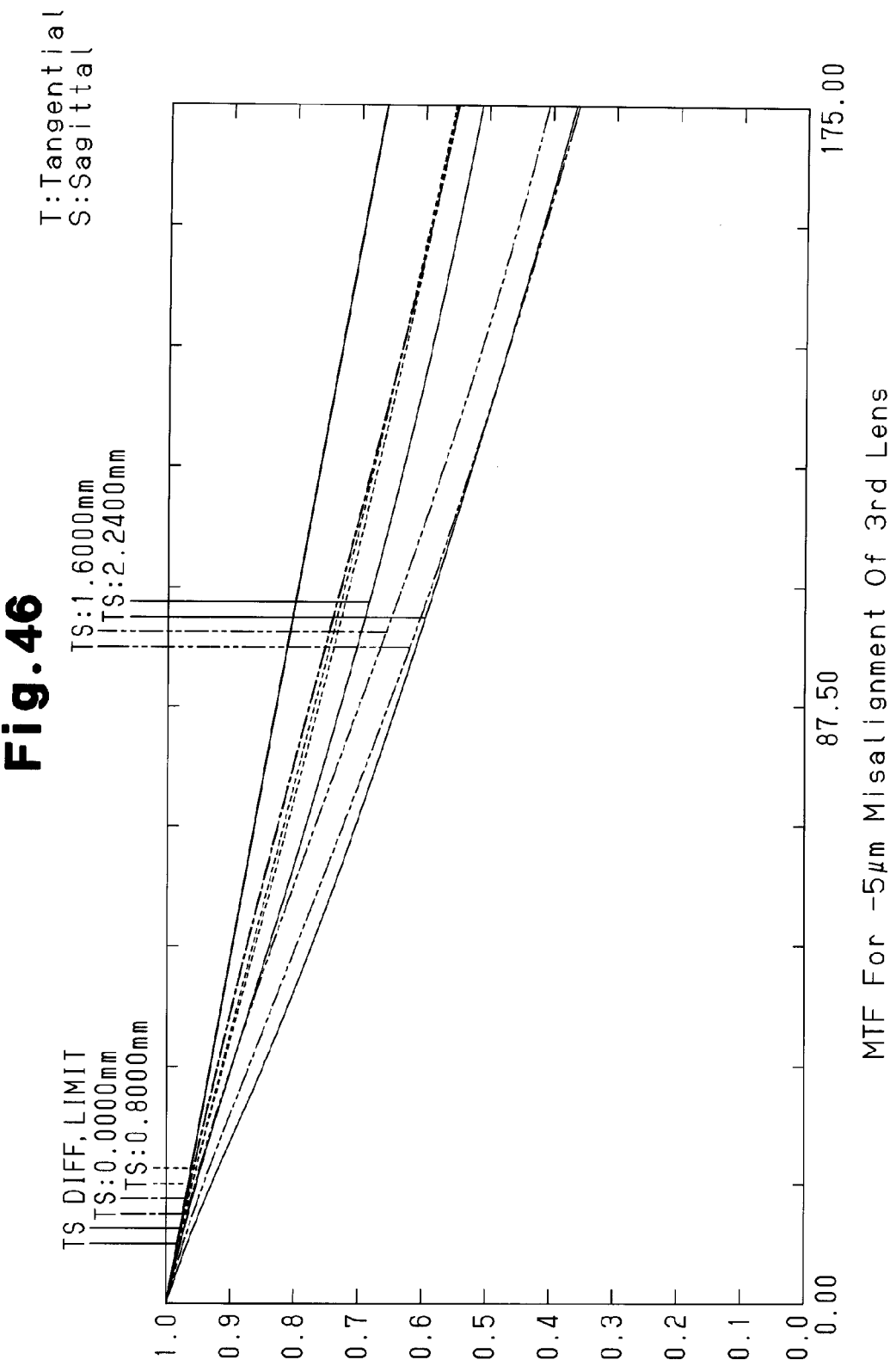
FIG. 46 is a graph showing the transfer function (MTF), which indicates one of the characteristics of the lens unit in comparative example 3, when the third lens is downwardly misaligned by 5 μm.

Referring to FIG. 37, the lens unit of comparative example 3 has a four-group, four-lens structure, in which the aperture stop 5 is located between the first lens 1 and the second lens 2. Numerical data for this lens unit is shown below.

Focal distance of entire system: 3.60 mm
F-number: 2.8
Entire lens length: 4.20 mm
Back focus: 1.10 mm
Chief ray angle (CRA): 25°

The lens data is shown in table 7. In table 7, a number i is allocated for each surface in order from the object side of the first lens 1, which serves as the first surface as shown in FIG. 37, toward the image side. Further, the parameters of Ri, Di, nd, and vd are the same as those of table 1.

TABLE 7

| Surface No. | Ri | Di | nd | vd |
|---|---|---|---|---|
| Object | ∞ | ∞ | | |
| 1* | 1.240 | 0.608 | 1.531 | 56.0 |
| 2* | −6.086 | 0.300 | | |
| 3 (Stop) | ∞ | 0.048 | | |
| 4* | 26.571 | 0.338 | 1.632 | 23.4 |
| 5* | 1.748 | 0.493 | | |
| 6* | −1.245 | 0.492 | 1.531 | 56.0 |
| 7* | −1.175 | 0.208 | | |
| 8* | 4.260 | 0.804 | 1.531 | 56.0 |
| 9* | 2.486 | 0.090 | | |
| 10 | | 0.300 | 1.523 | 58.6 |
| 11 | | 0.796 | | |
| Image | ∞ | — | | |

The aspherical surface coefficient for each surface is derived using equation (1) as shown in table 8.

TABLE 8

| Ri | K | A4 | A6 | A8 | A10 | A12 | A14 | A16 |
|---|---|---|---|---|---|---|---|---|
| 1st Surface | −1.035e−01 | −2.736e−2 | 2.412e−1 | −7.952e−1 | 1.145e+0 | −5.001e−1 | −3.733e−1 | |
| 2nd Surface | −1.926e+02 | 2.104e−1 | −6.289e−1 | 9.161e−1 | −1.383e+0 | 7.915e−1 | | |
| 4th Surface | 2.229e+03 | 3.487e−1 | −1.023e+0 | 6.632e−1 | 1.260e+0 | 1.766e+0 | −1.745e+1 | |
| 5th Surface | 1.553e+00 | 1.786e−1 | −5.296e−1 | 1.352e+0 | −2.281e+0 | 1.991e+0 | −3.620e−1 | |
| 6th Surface | −2.380e−01 | 3.853e−2 | −8.318e−2 | −1.284e+0 | 2.781e+0 | −2.385e+0 | 5.245e+0 | −1.010e+1 |
| 7th Surface | −2.945e−01 | 1.873e−2 | 2.138e−1 | −6.361e−1 | 7.678e−1 | −2.792e−1 | −1.369e−2 | −1.294e−2 |

TABLE 8-continued

| Ri | K | A4 | A6 | A8 | A10 | A12 | A14 | A16 |
|---|---|---|---|---|---|---|---|---|
| 8th Surface | 5.969e−01 | −1.227e−1 | 6.436e−2 | −1.483e−2 | 1.007e−3 | 1.095e−4 | −4.323e−7 | −2.915e−6 |
| 9th Surface | 2.324e−02 | −1.705e−1 | 6.259e−2 | −2.086e−2 | 4.005e−3 | −3.380e−4 | 2.225e−6 | 2.761e−7 |

COMPARATIVE EXAMPLE 4

Referring to FIG. 49, the lens unit of comparative example 4 has a three-group, four-lens structure, which includes the laminated lenses of the first lens 1 and the second lens 2. Additionally, the aperture stop 5 is located between the second lens 2 and the third lens 3. Thus, in comparative example 4, laminated lenses are used in the middle stop type lens unit of comparative example 3 to reduce the entire lens length. The laminated lenses of the first lens 1 and the second lens 2 move the position of the aperture stop 5 further closer to the image that comparison example 3. Numerical data for this lens unit is shown below.

Focal distance of entire system: 3.60 mm
F-number: 2.8
Entire lens length: 4.07 mm
Back focus: 1.08 mm
Chief ray angle (CRA): 25°

The lens data is shown in table 9. In table 9, a number i is allocated for each surface in order from the object side of the first lens 1, which serves as the first surface as shown in FIG. 49, toward the image side. Further, the parameters of Ri, Di, nd, and vd are the same as those of table 1.

TABLE 9

| Surface No. | Ri | Di | nd | vd |
|---|---|---|---|---|
| Object | ∞ | ∞ | | |
| 1* | 1.077 | 0.693 | 1.531 | 56.0 |
| 2* | 2.335 | 0.031 | 1.593 | 29.5 |
| 3* | 2.445 | 0.089 | | |
| 4 (Stop) | ∞ | 0.510 | | |
| 5* | −1.055 | 0.362 | 1.632 | 23.4 |
| 6* | −1.655 | 0.390 | | |
| 7* | 1.687 | 0.812 | 1.531 | 56.0 |
| 8* | 1.920 | 0.110 | | |
| 9 | | 0.300 | 1.523 | 58.6 |
| 10 | | 0.777 | | |
| Image | ∞ | — | | |

The aspherical surface coefficient for each surface is derived using equation (1) as shown in table 10.

TABLE 10

| Ri | K | A4 | A6 | A8 | A10 | A12 | A14 |
|---|---|---|---|---|---|---|---|
| 1st Surface | −5.246e−02 | 1.559e−2 | 4.515e−2 | −3.202e−2 | 4.393e−2 | 4.484e−2 | |
| 2nd Surface | 3.045e+00 | −1.302e+0 | 4.192e+0 | −1.011e+1 | 1.223e+1 | −7.447e−1 | |
| 3rd surface | −4.586e−01 | −1.308e−1 | 9.247e−1 | −3.326e+0 | 4.954e+0 | 0.000e+0 | |
| 5th Surface | −2.699e+00 | −8.257e−1 | 2.022e+0 | −1.129e+1 | 2.844e+1 | −3.072e+1 | |
| 6th Surface | 4.205e−03 | −5.438e−1 | 1.057e+0 | −1.897e+0 | 2.122e+0 | −7.912e−1 | |
| 7th Surface | −1.434e+01 | −2.041e−1 | 1.178e−1 | −3.644e−2 | 7.802e−3 | −1.277e−3 | 1.904e−4 |
| 8th Surface | −1.040e+01 | −1.060e−1 | 2.440e−2 | −3.268e−3 | −1.343e−3 | 6.305e−4 | −7.734e−5 |

COMPARISON OF EXAMPLE WITH COMPARATIVE EXAMPLES 1 TO 4

The lens units of comparative examples 1 to 4 are designed so that the focal distance of the entire system, the F-number, and the CRA are the same as the lens unit of example 1. The lens units of comparative examples 1 to 4 will now be compared with the lens unit of example 1.

1. Optical Characteristics

Figure 6:
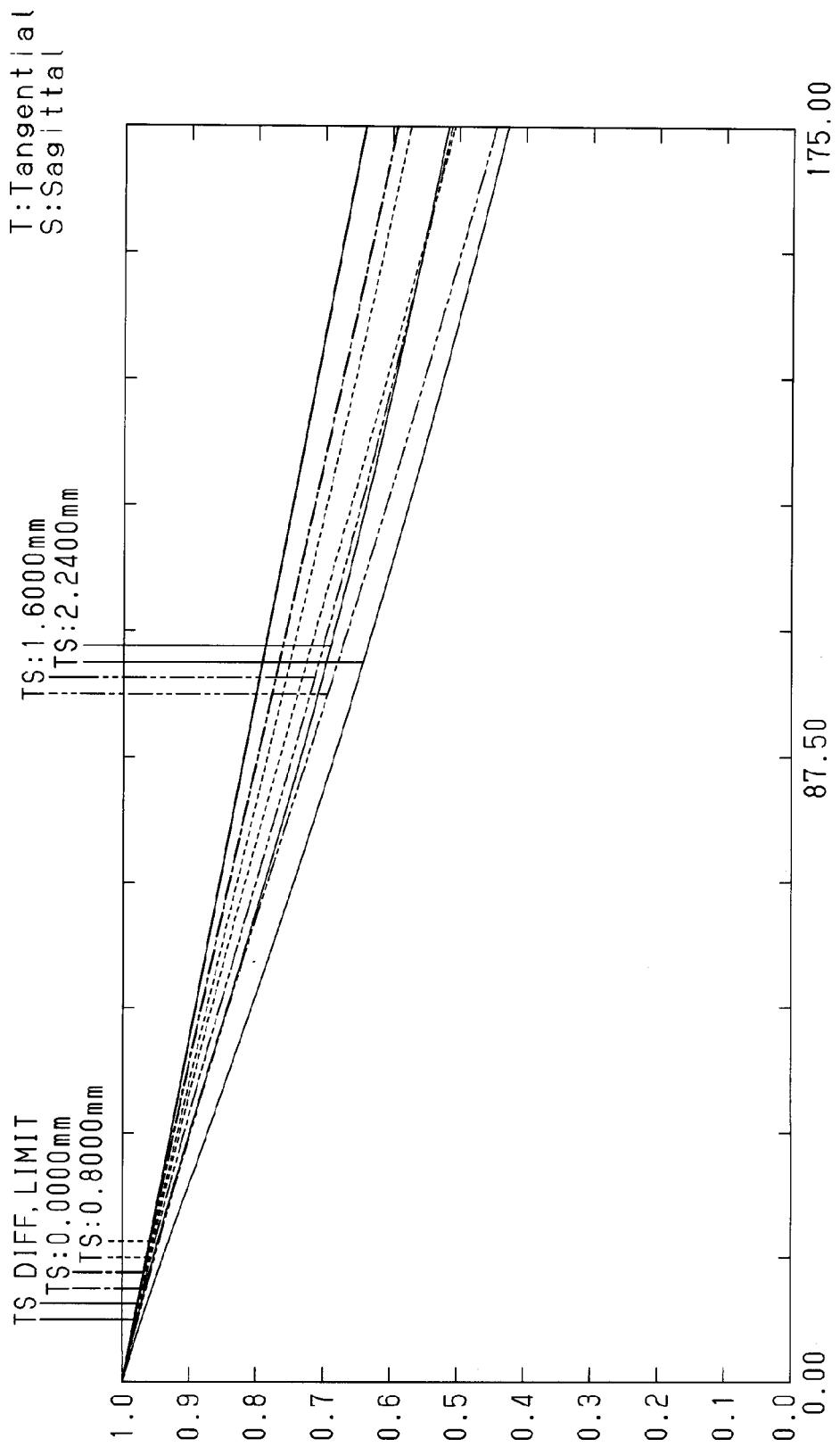
FIG. 6 is a graph showing a transfer function (MTF), which indicates one of the characteristics of a lens unit in an example.

The graph of FIG. 6 showing the transfer function (MTF) for the lens unit of example 1 will now be compared with the graphs of FIGS. 16, 28, 38, and 50 respectively showing the transfer functions (MTF) for the lens units of comparative examples 1, 2, 3, and 4. The value of the transfer function for example 1 is greater than that for each of comparative examples 1 to 4 throughout the spatial frequency region at any position on the imaging surface and any of the tangential and sagittal directions. It is thus apparent that the image formation performance of the lens unit in example 1 is higher than that of the lens unit in each of comparative examples 1 to 4.

Figure 7:
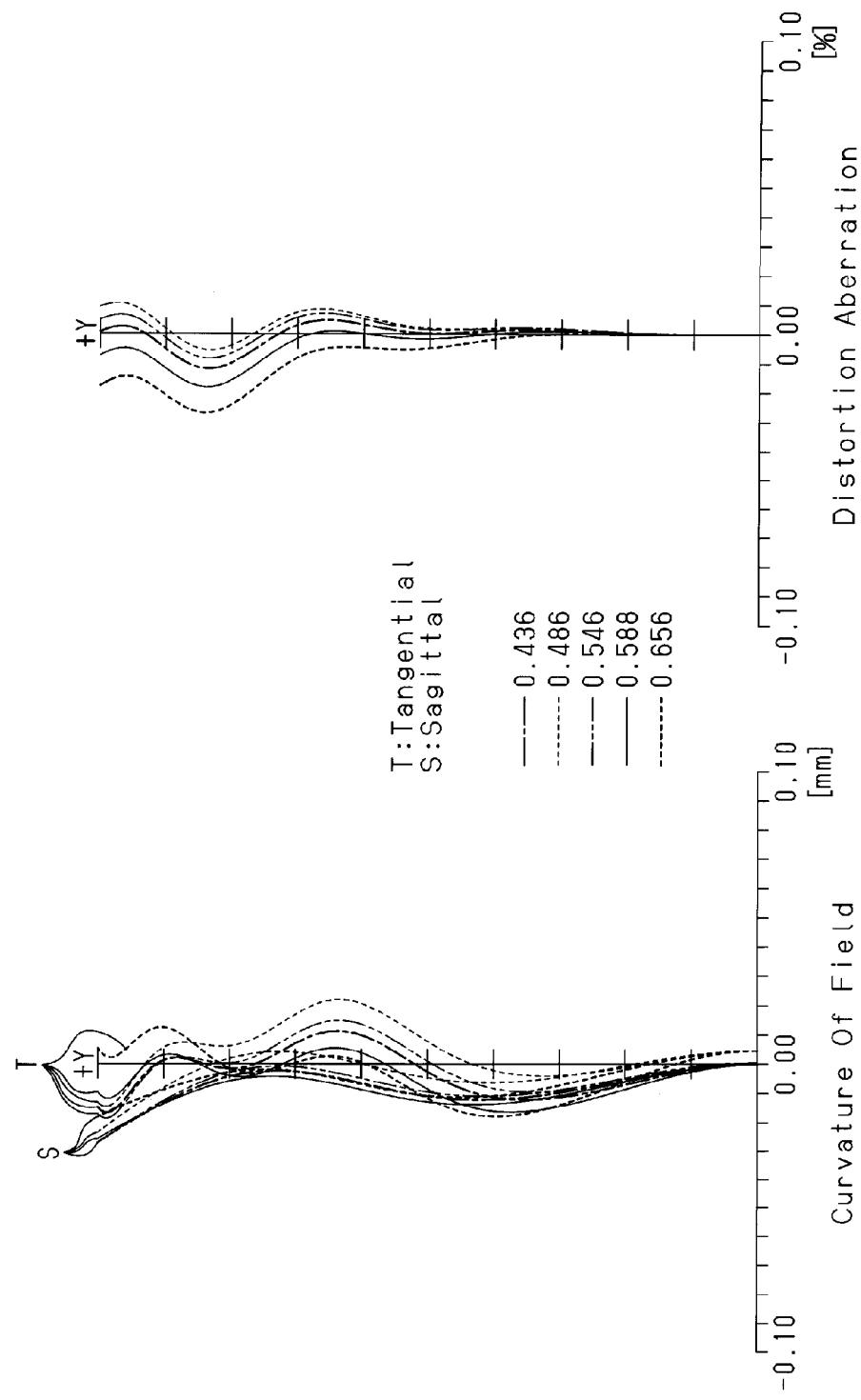
FIG. 7 shows one of the characteristics of the lens unit in the example.

The graph of FIG. 7A showing the curvature of field in the lens unit of example 1 will now be compared with the graphs of FIGS. 17A, 29A, 39A, and 51A respectively showing the curvatures of field in the lens units of comparative examples 1, 2, 3, and 4. Although the graphs show different shapes, the curvature of field in example 1 is smaller in its entirety than comparative examples 1 to 4 in both the sagittal and tangential directions.

The graph of FIG. 7B showing the distortion aberration in the lens unit of example 1 will now be compared with the graphs of FIGS. 17B, 29B, 39B, and 51B respectively showing the distortion aberration in the lens units of comparative examples 1, 2, 3, and 4. Although the graphs show different shapes, the distortion aberration in example 1 is smaller in its entirety than comparative examples 1 to 4 in both sagittal and tangential directions.

Figure 8:
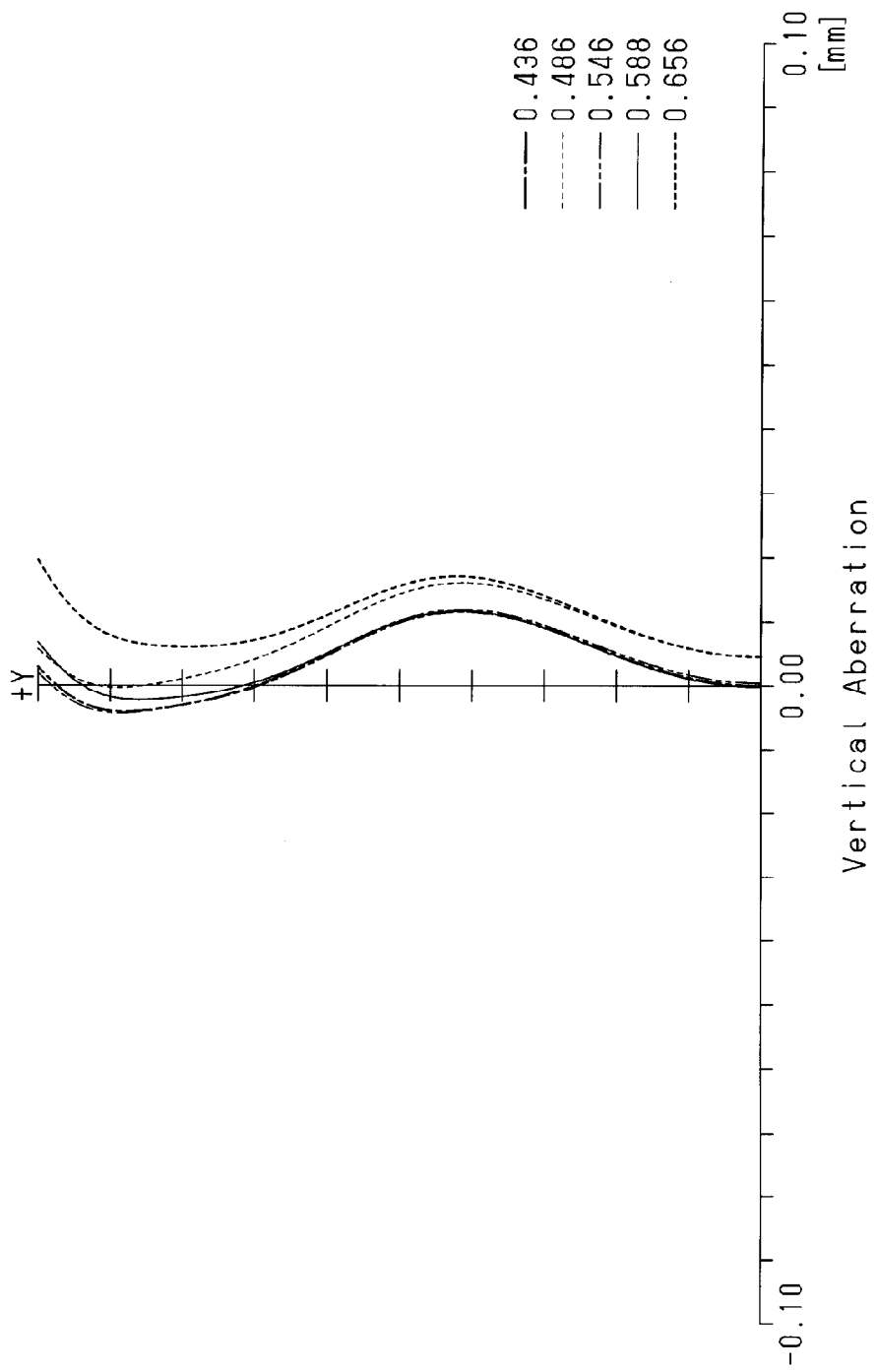
FIG. 8 is a graph showing a vertical aberration, which indicates one of the characteristics of the lens unit in the example.
Figure 9:
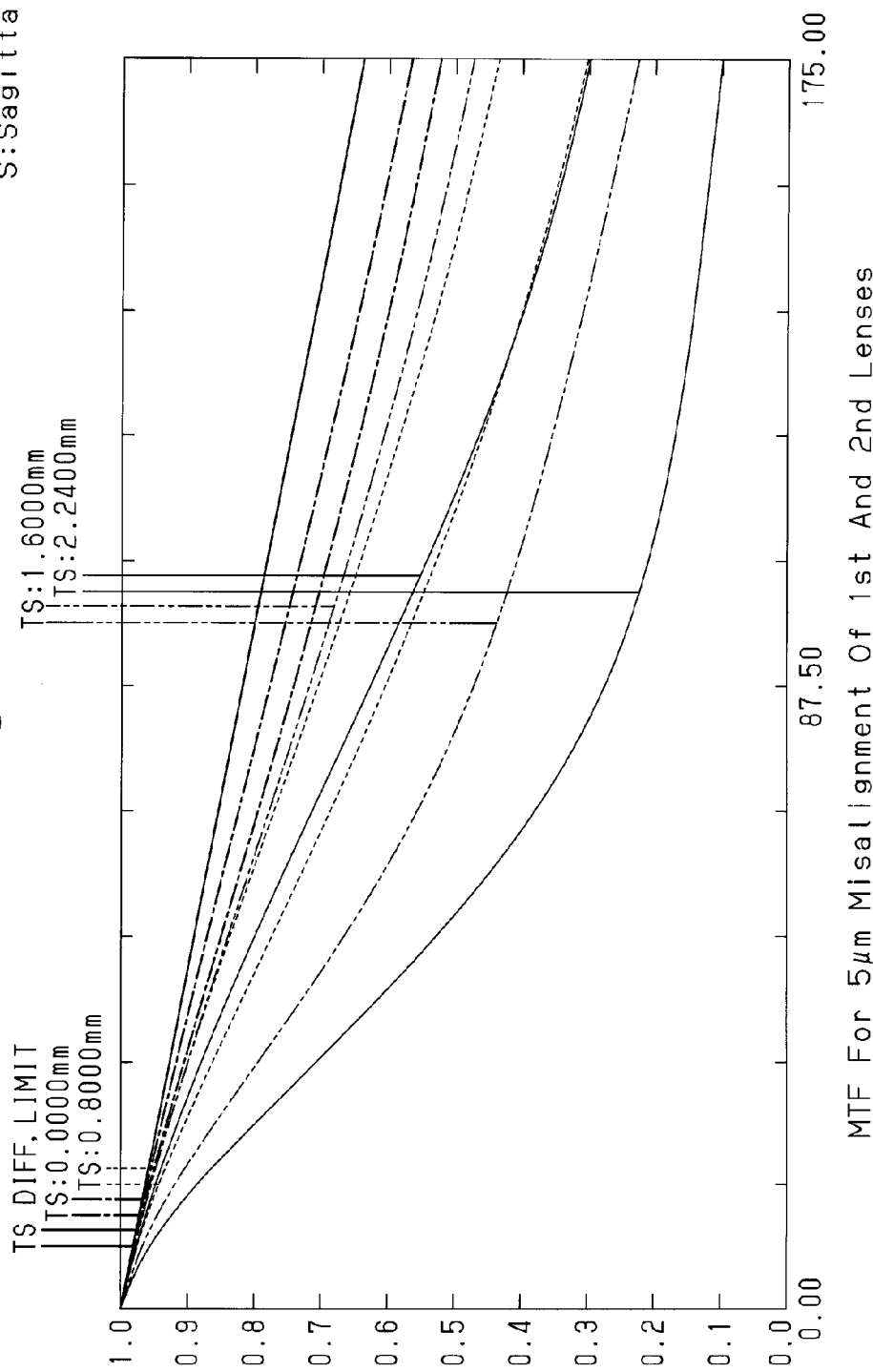
FIG. 9 is a graph showing the transfer function (MTF), which indicates one of the characteristics of the lens unit in the example, when the first lens is upwardly misaligned by 5 μm.
Figure 10:
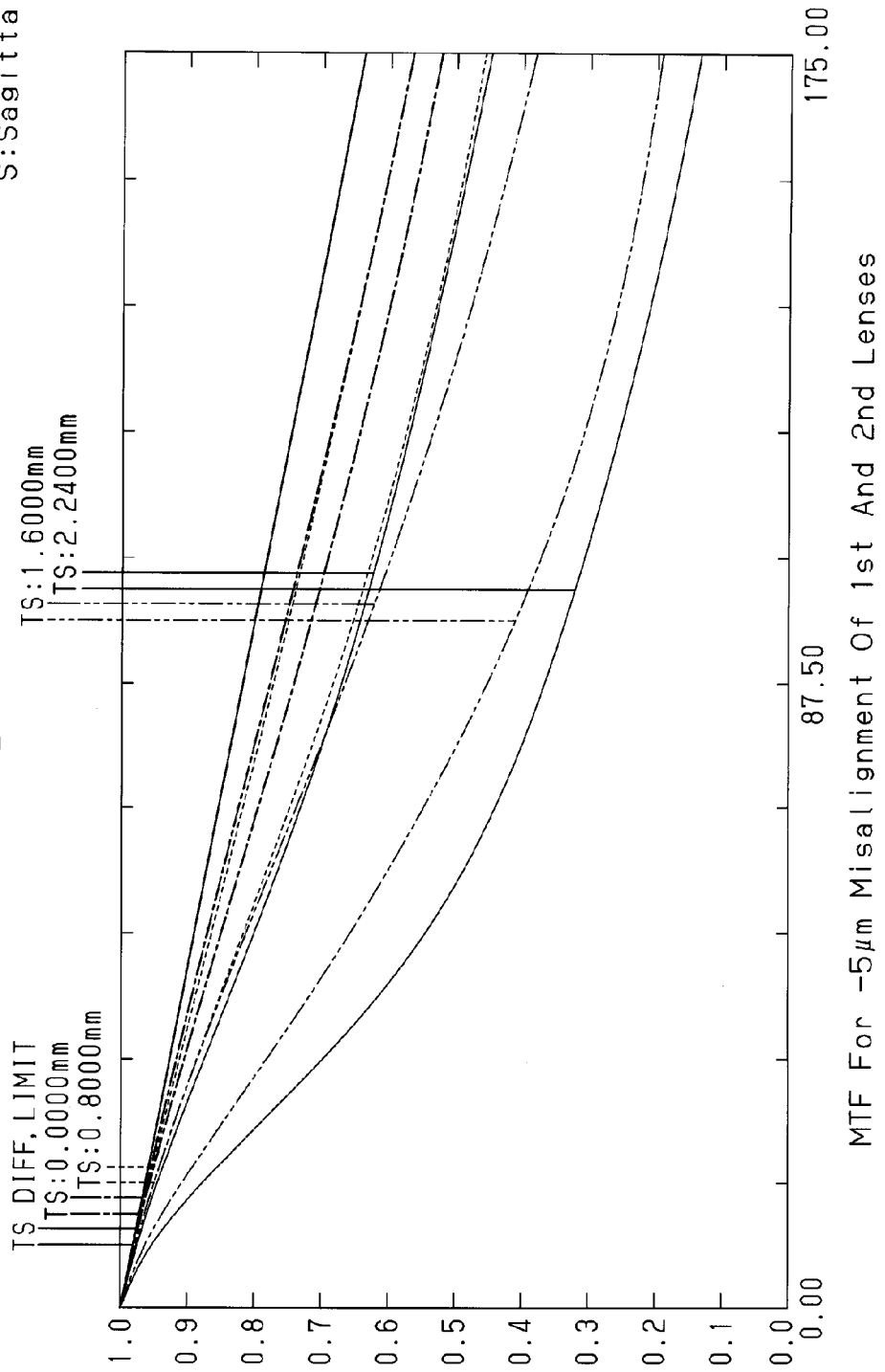
FIG. 10 is a graph showing the transfer function (MTF), which indicates one of the characteristics of the lens unit in the example, when the first lens is downwardly misaligned by 5 μm.
Figure 11:
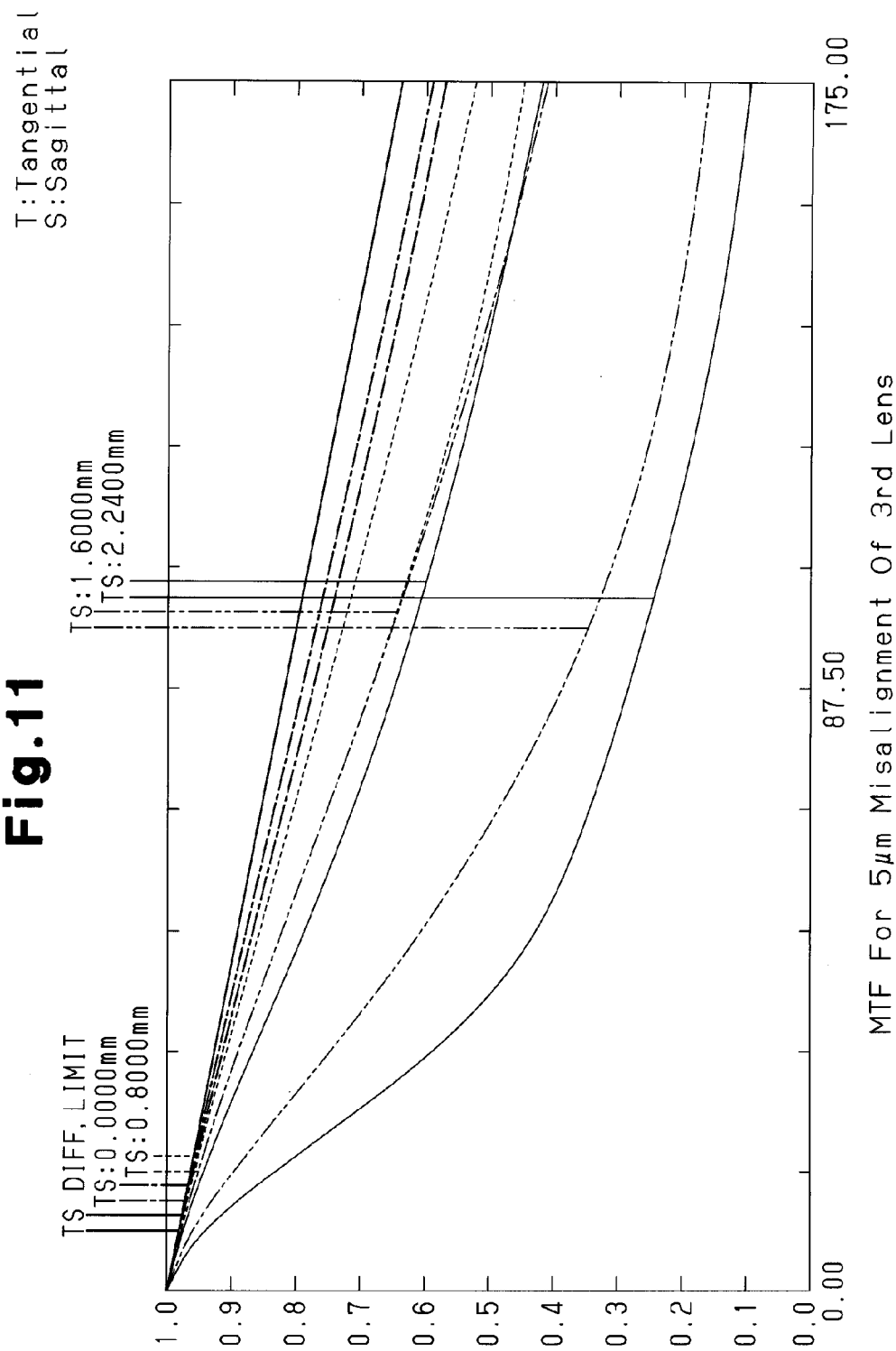
FIG. 11 is a graph showing the transfer function (MTF), which indicates one of the characteristics of the lens unit in the example, when a third lens is upwardly misaligned by 5 μm.
Figure 12:
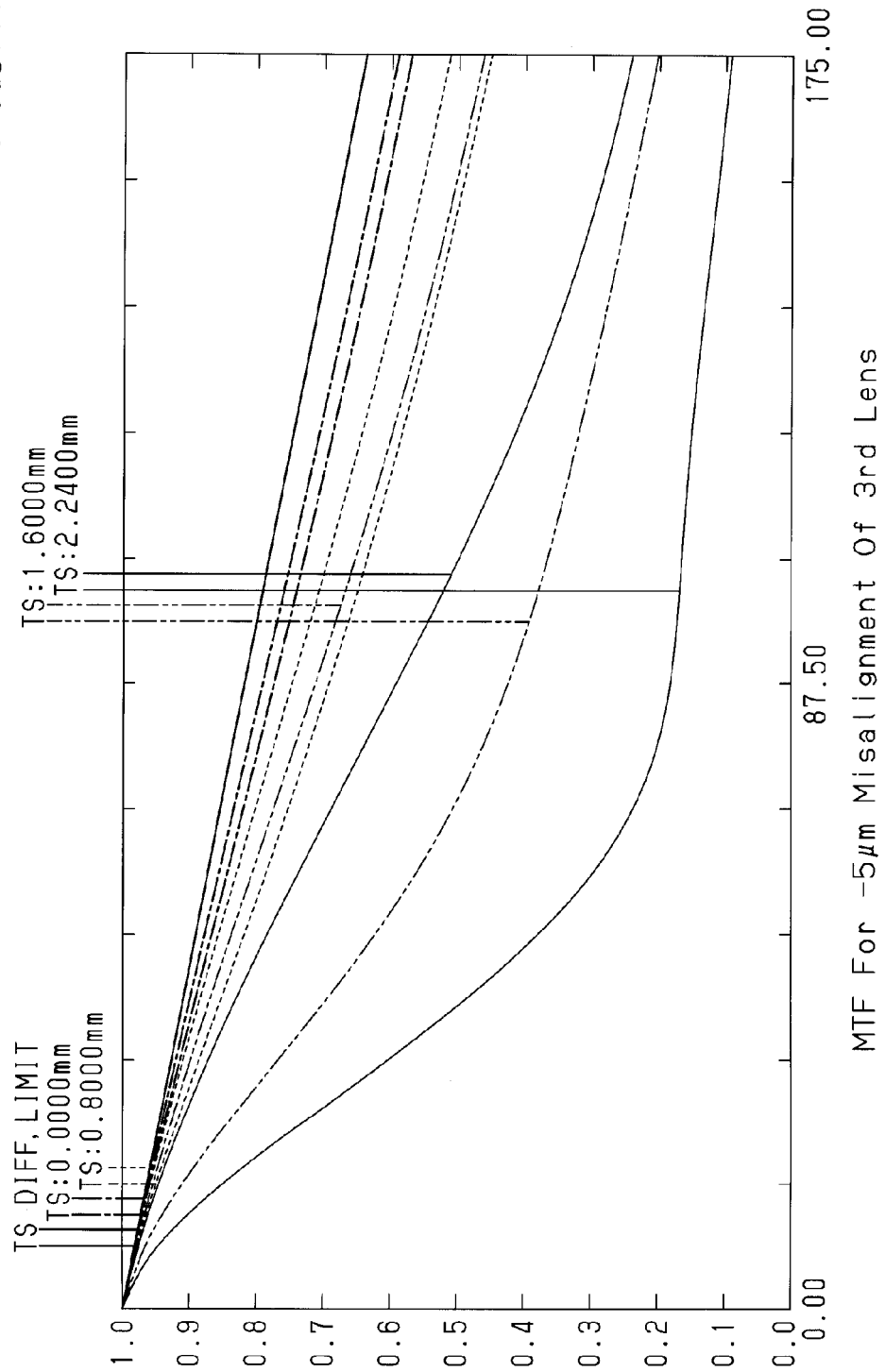
FIG. 12 is a graph showing the transfer function (MTF), which indicates one of the characteristics of the lens unit in the example, when the third lens is downwardly misaligned by 5 μm.
Figure 13:
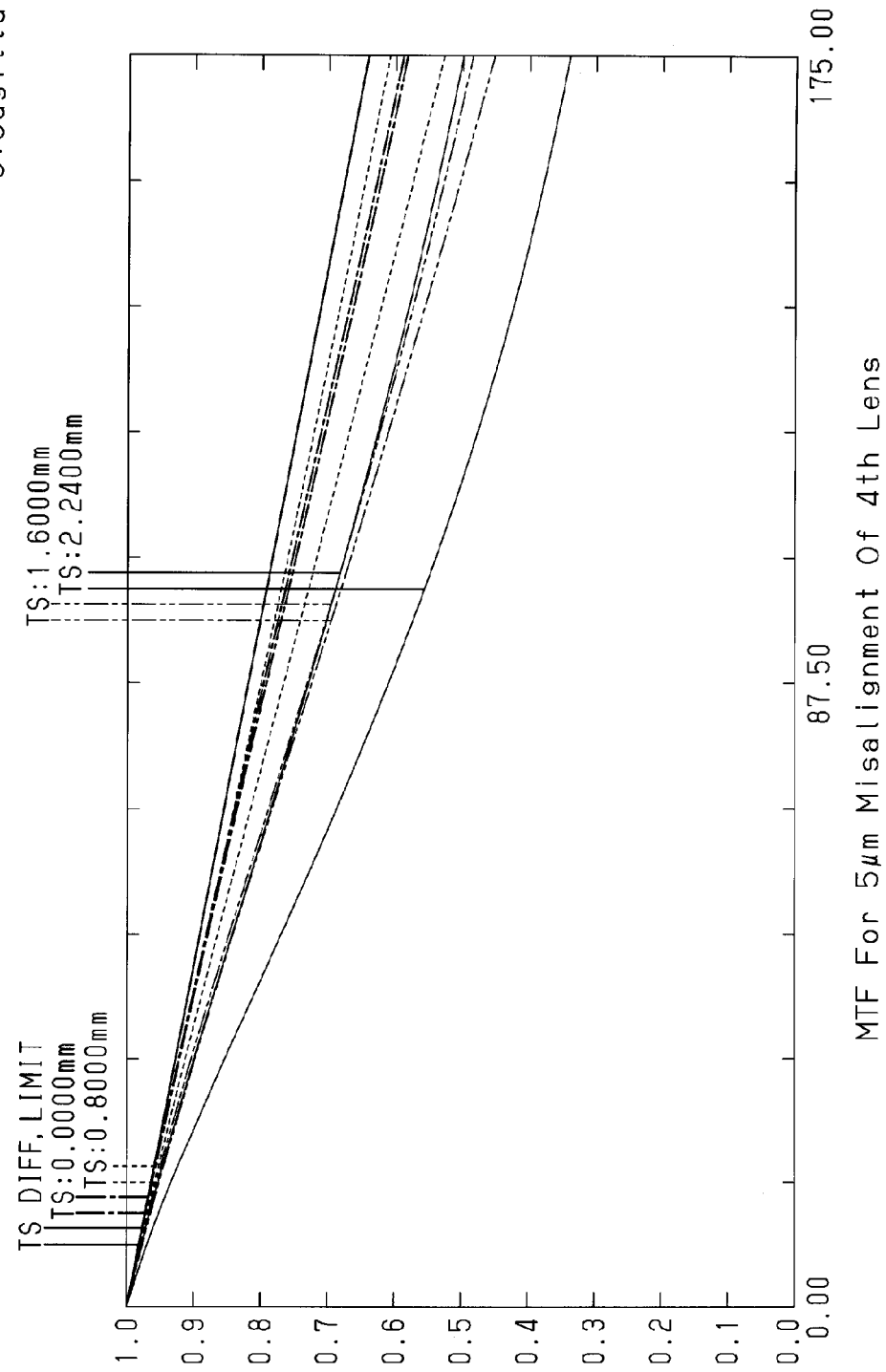
FIG. 13 is a graph showing the transfer function (MTF), which indicates one of the characteristics of the lens unit in the example, when a fourth lens is upwardly misaligned by 5 μm.
Figure 14:
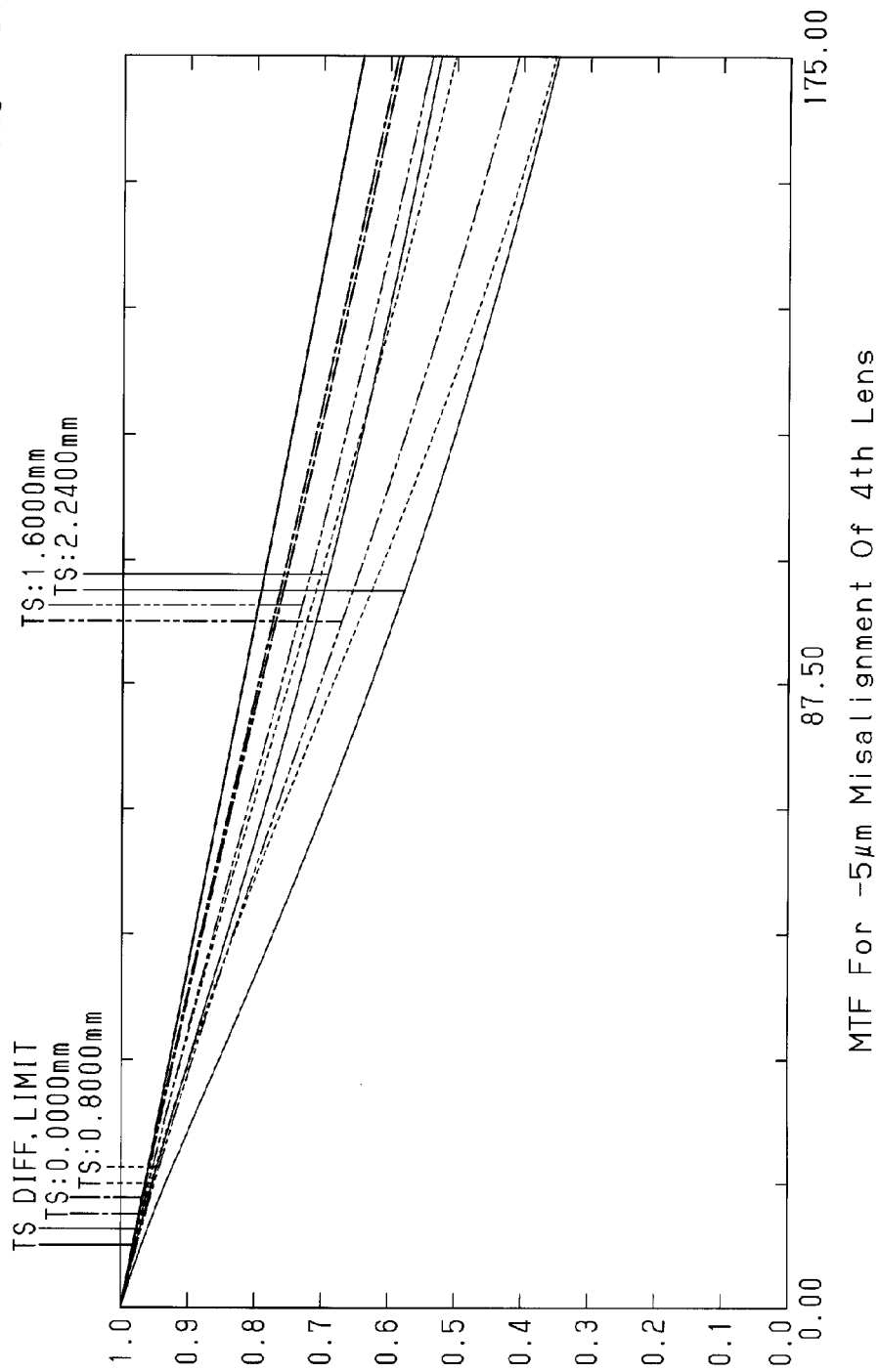
FIG. 14 is a graph showing the transfer function (MTF), which indicates one of the characteristics of the lens unit in the example, when the fourth lens is downwardly misaligned by 5 μm.

The graph of FIG. 8 showing the vertical aberration in the lens unit of example 1 will now be compared with the graphs of FIGS. 18, 30, 40, and 52 respectively showing the vertical aberration in the lens units of comparative examples 1, 2, 3, and 4. Although the graphs show different shapes, the vertical aberration in example 1 is smaller in its entirety than comparative examples 1 to 4 regardless of the wavelength.

As described above, it may be determined that the optical characteristics of the lens unit in example 1 is superior to the optical characteristics of the lens units in comparative examples 1 to 4 with regard to every one of the items including the transfer function (MTF), curvature of field, distortion aberration, and vertical aberration.

2. Manufacturing Cost

There is no significant difference between example 1 and comparative examples 1 to 4 in the types and quantity of the components used in the lens units. In such a case, the manufacturing yield greatly affects costs. As described above, as the tolerable range becomes narrower for misalignments of the first to fourth lenses 1 to 4, the occurrence rate of defective products increases and lowers the manufacturing yield. The level of influence of such a misalignment will now be evaluated from changes in the transfer function (MTF).

The graphs of FIGS. 9 to 14 show the transfer function (MTF) in a state in which the lenses of the lens unit in example 1 are misaligned by 5 µm in an upward direction (hereinafter described as "5 µm") as viewed in FIG. 3 or misaligned by 5 µm in a downward direction (hereinafter described as "−5 µm") as viewed in FIG. 3. The graphs of FIGS. 19 to 26 show the transfer function (MTF) in a state in which the lenses of the lens unit in comparative example 1 are misaligned by 5 µm or −5 µm. The graphs of FIGS. 31 to 36 show the transfer function (MTF) in a state in which the lenses of the lens unit in comparative example 2 are misaligned by 5 µm or −5 µm. The graphs of FIGS. 41 to 48 show the transfer function (MTF) in a state in which the lenses of the lens unit in comparative example 3 are misaligned by 5 µm or −5 µm. The graphs of FIGS. 53 to 58 show the transfer function (MTF) in a state in which the lenses of the lens unit in comparative example 4 are misaligned by 5 µm or −5 µm.

Comparative example 1, which is of a front stop type and has a four-group, four-lens structure, will now be compared with comparative example 3, which is of a middle stop type and also has a four-group, four-lens structure. More specifically, when comparing FIGS. 19 to 26 with FIGS. 41 to 48, regardless of which one of the lenses is misaligned, the deterioration in the MTF of the lens unit in comparative example 1 is greater than the deterioration in the MTF of the lens unit in comparative example 3. Further, comparative example 2, which is of a front stop type and has a three-group, four-lens structure, will be compared with comparative example 4, which is of a middle stop type and also has a three-group, four-lens structure. More specifically, when comparing FIGS. 31 to 36 with FIGS. 53 to 58, regardless of which one of the lenses is misaligned, the deterioration in the MTF of the lens unit in comparative example 2 is greater than the deterioration in the MTF of the lens unit in comparative example 4. Accordingly, if the lens structures are the same, deterioration in the MTF caused by misalignment is greater for a front stop type lens unit.

Example 1, which has a three-group, four-lens structure, will be compared with comparative example 2, which is of a front stop type and also has a three-group, four-lens structure. More specifically, when comparing FIGS. 9 to 4 with FIGS. 31 to 36 and FIGS. 53 to 58, the deterioration in the MTF of the lens unit in example 1 is smaller than the deterioration in the MTF of the lens unit in comparative example 2 and about the same as the deterioration in the MTF of the lens unit in comparative example 4. Accordingly, if the lens structures are the same, the lens unit of example 1 has a wider tolerable range for misalignments. That is, when comparing the lens unit of example 1 with the lens units of comparative examples 2 and 4, which all have the same three-group, four-lens structure, the probability of the occurrence of defective products caused by misalignments of the lenses is smaller in example 1. Thus, the manufacturing cost for example 1 is low.

3. Miniaturization

The entire length of the lens unit in example 1 is 3.85 mm and thus smaller than any of the lens units in examples 1 to 4. This allows for the lens unit of example 1 to be more miniaturized that the lens units of comparative examples 1 to 4. Compared with the lens units of comparative examples 1 and 3, which do not use laminated lenses and have a four-group, four-lens structure, the lens unit of example 1 uses laminated lenses and has a three-group, four-lens structure. This allows for the entire length to be shortened. The lens units of comparative examples 2 and 4 have the same three-group, three-lens structure as example 1. However, in the lens unit of example 1, the first lens 1 and the second lens 2 are laminated together. Further, the aperture stop 5 is held between the first lens 1 and the second lens 2. Thus, there is no need for a gap to be formed between the first lens 1 and the aperture stop 5 and between the aperture stop 5 and the second lens 2. This allows for the entire length to be shortened.

The present invention is related to a lens unit optimal for use in a compact image capturing device. Thus, the present invention is industrially applicable to a lens unit for a compact camera or a mobile phone incorporating a camera.

It should be apparent to those skilled in the art that the present invention may be embodied in many other specific forms without departing from the spirit or scope of the invention. Particularly, it should be understood that the present invention may be embodied in the following forms.

In the above-described embodiment, each of the first lens 1, third lens 3, and fourth lens 4 is a plastic lens but may each be replaced by a glass lens as long as the same optical characteristics can be maintained. The use of glass lenses increases heat resistance. Further, thermal volume changes are smaller in glass than plastic. This suppresses image deterioration caused by the lens shape that changes in accordance with the temperature.

In the above-described embodiment, the first lens 1 is a plastic lens, and the second lens 2 is a plastic lens formed from an ultraviolet curing resin. However, these lenses may have different structures. For example, the first lens 1 may be a plastic lens formed from an ultraviolet curing resin, and the second lens 2 may be a glass lens. In other words, it is only required that one of the two lenses 1 and 2 be a plastic lens formed from an ultraviolet curing resin. In this case, by forming a lens from a gel of an ultraviolet curing resin on the other one of the lenses, a group of laminated lenses that is free from bubbles can be produced.

In the preferred embodiment, the CCD image sensor 7 is used as an image capturing element. However, other structures may be used as the image capturing element. For example, an optical film may be used as the image capturing element in an image capturing device for silver salt photographs.

In the preferred embodiment, the image capturing device is used in a portable terminal but may also be used in a normal camera or personal computer. Further, the image capturing device may be used not only for capturing still images but also for capturing moving pictures.

The present examples and embodiments are to be considered as illustrative and not restrictive, and the invention is not to be limited to the details given herein, but may be modified within the scope and equivalence of the appended claims.

What is claimed is:

1. A lens unit comprising:
a first lens, a second lens, a third lens, and a fourth lens arranged in order from an object side toward an image side, in which the first lens is laminated with the second lens; and
an aperture stop held between the first lens and the second lens;
wherein the lenses are arranged in a configuration in which the first lens is a positive lens, and the second lens is a negative lens.

2. The lens unit of claim 1, wherein the first lens and the second lens each have a planar laminated surface.

3. The lens unit of claim 1, wherein at least one of the first lens and the second lens is formed from an ultraviolet curing resin.

4. The lens unit of claim 1, wherein the third lens is a negative lens, and wherein the fourth lens is a positive lens.

5. An image capturing device comprising:
a lens unit including:
a first lens, a second lens, a third lens, and a fourth lens arranged in order from an object side toward an image side, in which the first lens is laminated with the second lens; and
an aperture stop held between the first lens and the second lens;
wherein the lenses are arranged in a configuration selected from the group consisting of
a first configuration in which the first lens is a positive lens, and the second lens is a negative lens
a second configuration in which the third lens is a negative lens, and
a third configuration in which the fourth lens is a positive lens.

6. The image capturing device of claim 5, wherein the first lens and the second lens each have a planar laminated surface.

7. The image capturing device of claim 5, wherein at least one of the first lens and the second lens is formed from an ultraviolet curing resin.

8. A lens unit comprising:
a first lens, a second lens, a third lens, and a fourth lens arranged in order from an object side toward an image side, in which the first lens is laminated with the second lens; and
an aperture stop held between the first lens and the second lens;
wherein the lenses are arranged in a configuration which the third lens is a negative lens.

9. The lens unit of claim 8, wherein the first lens and the second lens each have a planar laminated surface.

10. The lens unit of claim 8, wherein at least one of the first lens and the second lens is formed from an ultraviolet curing resin.

11. A lens unit comprising:
a first lens, a second lens, a third lens, and a fourth lens arranged in order from an object side toward an image side, in which the first lens is laminated with the second lens; and
an aperture stop held between the first lens and the second lens;
wherein the lenses are arranged in a configuration in which the fourth lens is a positive lens.

12. The lens unit of claim 11, wherein the first lens and the second lens each have a planar laminated surface.

13. The lens unit of claim 11, wherein at least one of the first lens and the second lens is formed from an ultraviolet curing resin.

* * * * *